United States Patent
Bitto et al.

(10) Patent No.: US 11,530,967 B2
(45) Date of Patent: Dec. 20, 2022

(54) TRANSDUCER FOR A VIBRONIC MEASURING SYSTEM AND VIBRONIC MEASURING SYSTEM FORMED THEREWITH

(71) Applicant: Endress+Hauser Flowtec AG, Reinach (CH)

(72) Inventors: Ennio Bitto, Aesch (CH); Alfred Rieder, Landshut (DE); Yaoying Lin, Freising (DE); Martin Josef Anklin, Dornach (CH)

(73) Assignee: Endress+Hauser Flowtec AG, Reinach (CH)

( * ) Notice: Subject to any disclaimer, the term of this patent is extended or adjusted under 35 U.S.C. 154(b) by 213 days.

(21) Appl. No.: 16/754,107

(22) PCT Filed: Sep. 27, 2018

(86) PCT No.: PCT/EP2018/076280
§ 371 (c)(1),
(2) Date: Apr. 6, 2020

(87) PCT Pub. No.: WO2019/068553
PCT Pub. Date: Apr. 11, 2019

(65) Prior Publication Data
US 2020/0333229 A1    Oct. 22, 2020

(30) Foreign Application Priority Data

Oct. 5, 2017 (DE) .................... 10 2017 123 130.7
Feb. 8, 2018 (DE) .................... 10 2018 102 831.8

(51) Int. Cl.
*G01N 9/00* (2006.01)
*G01F 1/84* (2006.01)
(Continued)

(52) U.S. Cl.
CPC ........... *G01N 9/002* (2013.01); *G01F 1/8413* (2013.01); *G01F 1/8422* (2013.01);
(Continued)

(58) Field of Classification Search
CPC .......... G01N 9/002; G01N 9/32; G01N 11/04; G01F 1/8413; G01F 1/8422; G01F 1/8427; G01F 1/8459
(Continued)

(56) References Cited

U.S. PATENT DOCUMENTS 4,420,983 A    12/1983  Langdon
5,392,656 A     2/1995  Lew et al.
(Continued)

FOREIGN PATENT DOCUMENTS

EP         564682 B1    10/1994
EP        1698880 A1     9/2006
(Continued)

*Primary Examiner* — John Fitzgerald
*Assistant Examiner* — Rodney T Frank
(74) *Attorney, Agent, or Firm* — Christopher R. Powers; Endress+Hauser (USA) Holding Inc.

(57) ABSTRACT

The present disclosure relates to a transducer comprising a tube, a converter unit, an electromechanical exciter arrangement for stimulating and sustaining forced mechanical vibrations of the converter unit, and a sensor arrangement for detecting mechanical vibrations of the converter unit and for generating a vibration signal representing mechanical vibrations of the converter unit. The converter unit includes two connection elements connected to a displacer element and is inserted into the tube and connected thereto. The converter unit is configured as to be contacted by a fluid flowing through the tube and enabled to vibrate such that the connection elements and the displacer elements are proportionately elastically deformed. The transducer can be a constituent of a measuring system adapted to measure and/or (Continued)

monitor a flow parameter of the flowing fluid and further includes an electronic measuring and operating system coupled to the exciter arrangement and the sensor arrangement of the transducer.

34 Claims, 33 Drawing Sheets

(51) Int. Cl.
  *G01N 9/32* (2006.01)
  *G01N 11/04* (2006.01)
(52) U.S. Cl.
  CPC .......... *G01F 1/8427* (2013.01); *G01F 1/8459* (2013.01); *G01N 9/32* (2013.01); *G01N 11/04* (2013.01)
(58) Field of Classification Search
  USPC ....................................................... 73/24.05
  See application file for complete search history.

(56) References Cited

U.S. PATENT DOCUMENTS

| | | |
|---|---|---|
| 2009/0120168 A1 | 5/2009 | Harrison et al. |
| 2013/0276518 A1 | 10/2013 | Dagalakis et al. |
| 2016/0187176 A1 | 11/2016 | Cage et al. |
| 2016/0334316 A1 | 11/2016 | Cage et al. |

FOREIGN PATENT DOCUMENTS

| | | |
|---|---|---|
| EP | 1804048 A1 | 7/2007 |
| GB | 2236591 A | 4/1991 |
| WO | 9529386 A1 | 11/1995 |

C-C

E-E

F-F

H-H

J-J ature, filed on Oct. 5, 2017 and 10 2018 102 831.8, filed
TRANSDUCER FOR A VIBRONIC MEASURING SYSTEM AND VIBRONIC MEASURING SYSTEM FORMED THEREWITH

CROSS-REFERENCE TO RELATED APPLICATIONS

The present application is related to and claims the priority benefit of German Patent Application Nos. 10 2017 123 130.7, filed on Oct. 5, 2017 and 10 2018 102 831.8, filed on Feb. 8, 2018, and International Patent Application No. PCT/EP2018/076280 filed on Sep. 27, 2018, the entire contents of which are incorporated herein by reference.

TECHNICAL FIELD

The invention relates to a transducer comprising a tube, in particular one which can be inserted into a pipeline passage, and a fluidic-mechanical converter unit placed within its lumen, and a vibronic measuring system formed with such a transducer.

BACKGROUND

In EP-B 564 682, U.S. Pat. No. 4,420,983, US-A 2016/0187176, US-A 2016/0334316 or WO-A 95/29386, vibronic measuring systems suitable for measuring and/or monitoring, in particular, at least one time-varying, flow parameter, for example a mass flow rate, a volume flow rate and/or a flow velocity, and/or at least one, in particular time-varying, substance parameter, for example a density and/or a viscosity of flowing fluids are shown in each case. Each of the measuring systems comprises an electronic measuring and operating system and a transducer coupled thereto, respectively.

Each of the transducers—here also designed as transducers of the vibration type—comprises a tube which has a lumen surrounded by a wall, extends from a first end on the inlet side to a second end on the outlet side and is adapted to be traversed by a fluid medium, for example a gas or a liquid, in a flow direction, namely starting from the first end on the inlet side towards the second end on the outlet side. Said tube is also in particular designed to be inserted into the pipeline passage containing the fluid to be measured. The wall of the tube is typically metallic and, at least in the region of the displacer element, hollow-cylindrical in shape. Furthermore, each of the two ends of the tube can also be held by a connection flange, which is compatible with any connection flange provided in the aforementioned pipeline. The respective transducer also comprises a fluidic-mechanical converter unit that has at least one essentially cylindrical displacer element and at least one connection element mechanically connected thereto, an electromechanical exciter arrangement for stimulating and sustaining forced mechanical vibrations of the converter unit, in particular resonance vibrations, and a sensor arrangement for detecting mechanical vibrations of the converter unit, namely mechanical vibrations of the displacer element and for generating vibration signals representing mechanical vibrations of the displacer element. The converter unit is inserted into the tube and mechanically connected thereto in such a way that the displacer element thereof is placed inside the lumen of the tube and the connection element thereof and the respective connection element is also mechanically connected to the wall of said tube. In the case of the transducers shown in EP-B 564 682, U.S. Pat. No. 4,420,983 and WO-A 95/29386, the measuring systems formed therewith are each in the form of a hollow cylinder closed at one or both sides and aligned coaxially with the tube, and the respective connection element is in the form of a sleeve or a rod, whereas in the case of the transducer shown in US-A 2016/0334316, the displacer element is formed by means of a comparatively thin-walled hollow cylinder aligned coaxially with the tube, and the connection elements are each formed by means of equally thin, flexible retaining clamps.

Each of the aforementioned converter units is designed so as to be contacted by fluid located in the lumen of the tube, in particular by the fluid flowing around it, and meanwhile allowed to vibrate in such a way that the respective displacer element thereof is respectively at least proportionally elastically deformed. The respective exciter arrangement, in turn, is configured to convert supplied electrical power into mechanical power and to excite or sustain induced mechanical vibrations of the converter unit or of the transducer formed therewith in a drive or use mode with a usable vibration frequency, namely a predeterminable vibration frequency corresponding to an instantaneous resonance frequency of the converter unit by converting electrical power into mechanical power and stimulating or sustaining these vibrations, whereby corresponding movement forces are imparted to the contacting fluid, which in turn has an effect on the converter unit in a manner that elastically deforms the converter unit. A natural vibration mode inherent in the transducer serves as the use mode in each of the aforementioned transducers or the measuring system formed therewith, in which the displacer element at least partially executes radial vibrations (also bell or Hoope mode vibrations) about a respective imaginary radial vibration axis of the respective converter unit in the flow direction. The usable vibrations in turn, in particular the radial vibrations of the respective displacer element in use mode, are particularly suitable for inducing Coriolis forces in the fluid flowing through the tube, which are dependent on a mass flow rate of said fluid. The Coriolis forces in turn bring about Coriolis vibrations, namely mechanical vibrations of the transducer which deviate from their radial vibrations in the use mode or are coupled thereto in a Coriolis mode, whereby the displacer element executes additional radial vibrations about the imaginary radial vibration axis of the converter unit running in the flow direction, which deviate at least partially from the radial vibrations thereof in the use mode, but are nevertheless coupled to or have the same radial vibration frequency in the use mode in such a way that, as a result, there is a phase difference between vibrations on the inlet side of the displacer element with a usable vibration frequency and vibrations on the outlet side of the displacer element with a usable vibration frequency dependent on the respective mass flow rate of the fluid. The exciter arrangement can, as shown in U.S. Pat. No. 4,420,983, EP-B 564 682, US-A 2016/0187176 and/or WO-A 95/29386, therefore be formed, for example, by piezoelectric, electromagnetic or electrodynamic vibration exciters arranged inside the tube, namely in its lumen, or by means of vibration exciters arranged outside the tube, but nevertheless in the vicinity of the displacer element, or as proposed in US-A 2016/0334316, by means of electromagnetic vibration exciters placed outside the displacer element, but also inside the tube; accordingly, the respective sensor arrangement can be formed by two spaced apart vibration sensors inside the displacer element or by two spaced apart vibration sensors outside the tube—piezoelectric or electrodynamic—or by electromagnetic vibration sensors placed outside the displacer element.

The electronic measuring and operating system of the aforementioned measuring systems is connected to both the respective exciter arrangement and the respective sensor arrangement by means of electrical feed lines and designed to receive and to process the generated vibration signals by means of the respective transducer, namely, based on the vibration signals to determine at least a flow parameter value representing one flow parameter, for example a mass flow value representing a mass flow rate of the fluid and/or a substance parameter value representing at least one substance parameter, for example a density value representing density of the fluid and/or a viscosity value representing viscosity of fluid. In addition, the electronic measuring and operating system is also configured to feed at least the electrical power forcing the usable vibrations into the exciter arrangement by means of at least one electrical exciter signal.

The positioning of the at least one vibration exciter and/or the vibration sensors within the lumen of the tube proposed in US-A 2016/0334316 has, for example, the disadvantage that hermetically sealed, technically complex or expensive line feed-throughs in the respective tube—whether in the wall or in the region of one of the aforementioned connection flanges—have to be provided for the electrical connecting lines. In addition, the vibration exciter and the vibration sensors must also be configured to be permanently immersed in the fluid to be measured during operation. In the measuring system shown in U.S. Pat. No. 4,420,983, the positioning of the vibration exciters and sensors thereof outside the tube has, in particularly, the disadvantage that both the electromagnetic fields required for stimulating the usable vibrations and the electromagnetic fields required for detecting them must penetrate the tube wall and the fluid to be measured, accompanied by a corresponding damping that may also depend on the fluid to be measured and/or its temperature. In addition, only materials that are sufficiently magnetically conductive but not ferromagnetic can be used to produce the wall of the tube, and therefore only a limited number of materials can be used. Even if the measuring systems shown in EP-B 564 682 or in WO-A 95/29386 do not exhibit the aforementioned disadvantages, these kinds of measuring systems have not yet been established in industrial measuring technology; not least because of the comparatively complex mechanical structure on the one hand and the comparatively significant transverse sensitivity to pressures and Reynolds numbers prevailing in the flowing fluid and its density and viscosity on the other hand, accompanied by a correspondingly low measuring accuracy.

SUMMARY

Based on the aforementioned prior art, it is the objective of the invention to specify a transducer suitable for a vibronic measuring system of the aforementioned type and which, on the one hand, has a relatively simple mechanical construction and that enables the placement of the at least one vibration exciter and at least one vibration sensor outside the tube, i.e. not in its lumen, and which, on the other hand, in spite of the simple mechanical construction, can achieve a high measuring accuracy, in particular, of the flow and/or substance parameters of flowing fluid in the measurement of one or more flow and/or substance parameters of flowing fluid with a correspondingly small measuring error, namely less than 0.5% of the respective measured value.

In order to solve the object, the invention consists in a transducer for a vibronic measuring system, which transducer comprises:
 a tube comprising a lumen enveloped by a wall and extending from a first inlet-side end to a second outlet-side end, which tube is designed to be traversed by a fluid, for example, by a gas, a liquid or a dispersion, in a flow direction, namely starting from the first inlet-side end in the direction of the second outlet-side end;
 a first converter unit;
 an electro-mechanical exciter arrangement for stimulating and sustaining induced mechanical vibrations of the first converter unit, for example resonance vibrations;
 and a sensor arrangement for detecting mechanical vibrations of the first converter unit and for generating at least one first vibration signal representing mechanical vibrations of at least the first converter unit.

The first converter unit of the transducer in accordance with the invention has, for example, at least a partially plate-shaped and/or metallic displacer element, for example, at least a partially sleeve-shaped and/or at least partially rod-shaped and/or at least partially shell-shaped and/or at least partially plate-shaped and/or at least partially circular-cylindrical and/or metallic first connection element serving as a torsion spring, and at least one, for example, partially sleeve-shaped and/or at least partially rod-shaped and/or at least partially shell-shaped and/or at least partially plate-shaped and/or at least partially circular-cylindrical and/or metallic second connection element serving as a torsion spring and/or identical in construction to the first connection element, wherein the first connection element of the first converter unit is mechanically connected to the displacer element of the first converter unit and wherein the second connection element of the first converter unit is mechanically connected to the displacer element of the first converter unit at a distance from the first connection element of the first converter unit in the direction of an imaginary longitudinal axis of said displacer element.

The first converter unit of the transducer in accordance with the invention is also inserted in its tube and mechanically connected to it in such a way that its displacer element is placed within the lumen of said tube and that each of its first and second connection elements is placed at least partially within the wall of said and mechanically connected thereto in such a way that the second connection element of the first converter unit is mechanically connected to the wall of the tube in the direction of an imaginary longitudinal axis of the tube and/or an imaginary envelope line of the wall of the tube at a distance from the first connection element of the first converter unit and/or is arranged downstream of the first connection element in the flow direction.

The first converter unit of the transducer in accordance with the invention is also configured to be contacted by fluid located in the lumen of the tube and in the meantime allowed to vibrate in such a way that both, each of the first and second connection elements thereof and the displacer element thereof, are respectively at least proportionately elastically deformed.

In addition, the invention also consists in a vibronic measuring system formed by means of a transducer for measuring and/or monitoring, in particular, at least one time-varying flow parameter, for example, a mass flow rate, a volume flow rate and/or a flow velocity, and/or for measuring and/or monitoring at least one time-varying flow parameter, for example, a mass flow rate and/or for measuring and/or monitoring, in particular, at least one time-varying substance parameter, for example a density and/or a viscosity of a flowing fluid, for example a gas, a liquid or a dispersion, and comprising, in addition to the transducer, an electronic measuring and operating unit which is electrically coupled both to the exciter arrangement thereof and the sensor arrangement thereof, for example by means of electrical connecting lines, and which are formed, for example, by means of at least one microprocessor and/or by means of at least one digital signal processor.

In addition, the invention also consists in using said transducer or measuring system formed therefrom for measuring and/or monitoring a fluid flowing in a pipeline, for example, having a nominal width of more than 100 mm, and having, for example, a temperature of more than 100° C. and/or a static pressure of more than 100 bar, such as gas flowing at a mass flow rate of more than 500 t/h.

According to a first design of the transducer of the invention, the first converter unit of the transducer according to the invention is arranged to be contacted by fluid located in the lumen of the tube and, in the meantime, to be vibrated in such a way, in that both, each of its first and second connection elements and its displacer element, are each at least proportionately elastically deformed in that each of the first and second connection elements is at least proportionately rotated about a respective imaginary main axis of inertia and/or in that the displacer element of the first converter unit is at least proportionally bent out of a static rest position in the direction of a diameter of the tube perpendicular to an imaginary main axis of inertia of the first connection element of the first converter unit and/or an imaginary main axis of inertia of the second connection element of the first converter unit. In a further development of this design of the invention, it is further provided that said main axis of inertia of the first connection element of the first converter unit and said imaginary main axis of inertia of the second connection element of the first converter unit are parallel to one another.

According to a second design of the transducer of the invention, it is further provided that an imaginary main axis of inertia of the first connection element of the first converter unit and an imaginary main axis of inertia of the second connection element of the first converter unit are parallel to one another.

According to a third design of the transducer of the invention, it is further provided that the first converter unit is axis-symmetrical or mirror-symmetrical at least with respect to an associated imaginary main axis of inertia parallel, for example, to an imaginary main axis of inertia of the first connection element of the first converter unit and/or to an imaginary main axis of inertia of the second connection element of the first converter unit.

According to a fourth design of the transducer of the invention, it is further provided that the first connection element of the first converter unit consists at least partially, for example, predominantly or completely, of a metal, for example stainless steel or a nickel-based alloy According to a fifth design of the transducer of the invention, it is further provided that the second connection element of the first converter unit consists at least partially, for example, predominantly or completely, of a metal, for example stainless steel or a nickel-based alloy.

According to a sixth design of the transducer of the invention, it is further provided that the displacer element of the first converter unit consists at least partially, for example, predominantly or completely, of a metal, for example stainless steel or a nickel-based alloy.

According to a seventh design of the transducer of the invention, it is further provided that the first connection element of the first converter unit and the displacer element of the first converter unit consist of the same material.

According to an eighth design of the transducer of the invention, it is further provided that the second connection element of the first converter unit and the displacer element of the first converter unit consist of the same material.

According to a ninth design of the transducer of the invention, it is further provided that the first connection element of the first converter unit and the second connection element of the first converter unit consist of the same material.

According to a tenth design of the transducer of the invention, it is further provided that the first connection element of the first converter unit is at least partially cylindrical, in particular partially hollow-cylindrical.

According to an eleventh design of the transducer of the invention, it is further provided that the second connection element of the first converter unit is at least partially cylindrical, in particular partially hollow-cylindrical.

According to a twelfth design of the transducer of the invention, it is further provided that the first connection element of the first converter unit and the second connection element of the first converter unit are structurally identical.

According to a thirteenth design of the transducer of the invention, it is further provided that the first converter unit, for example its first connection element and/or its second connection element, is produced at least partially by an additive production method, for example a free-space method and/or a powder bed method, for example by selective laser melting (SLM) selective laser sintering (SLS) and/or electron beam melting (EBM).

According to a fourteenth design of the transducer of the invention, it is further provided that the first connection element comprises a first surface and a second surface opposite thereto, for example at least partially parallel to the first surface thereof, and that the first converter unit is inserted into the tube and thus mechanically connected to it in such a way, that the respective first surface of each of the first and second connection elements each faces the lumen of the tube and the respective second surface of each of the first and second connection elements respectively faces away from the lumen of the tube.

According to a fifteenth design of the transducer of the invention, it is further provided that the first connection element of the first converter unit comprises a first subsegment (for example, a first surface of the first connection element facing the lumen of the tube and a second surface of the first connection element opposite thereof and/or facing away from the lumen of the tube, which in each case at least partially forms and/or is at least partially sleeve-shaped and/or at least partially shell-shaped and/or at least partially disc-shaped and/or at least partially hollow-cylindrical).

In a further development of this design of the invention, the first connection element of the first converter unit further comprises a second subsegment, forming, for example, at least partially, a first surface of the first connection element extending from a first end adjoining the first subsegment to a second end remote therefrom and adjoining the displacer element, being for example, at least partially cylindrical and/or bar-shaped or rod-shaped. The second subsegment of the first connection element and the displacer element can, for example, be firmly bonded together, for example welded or soldered together.

Furthermore, the first connection element of the first converter unit may have a cylindrical (for example at least partially circular-cylindrical and/or rod-shaped) third subsegment that is forming, for example, at least partially, a second surface of the first connection element facing away from the lumen of the tube and extending from a first end adjacent to the second subsegment (for example namely its first end) (namely through the at least partially hollow cylindrical first subsegment) to a second end remote from said first end. In a further development of this design of the invention, a subsegment is designed to transmit a rotational movement of the second subsegment of the first connection element about an associated imaginary main axis of inertia to the sensor arrangement and/or to transmit a rotational movement of said subsegment caused by the exciter arrangement about an associated imaginary main axis of inertia to the second subsegment of the first connection element. Accordingly, the second subsegment of the first connection element can be configured to transmit a rotational movement of the third subsegment of the first connection element about an associated imaginary main axis of inertia to the displacer element and/or to the first subsegment, for example to convert said rotational movement of the third subsegment into a twisting of a subsegment of the displacer element adjoining the second end of the second connection element and/or into a twisting of the first subsegment, which twisting effects a bending of the displacer element. The first and third subsegments of the first connection element can, for example, be arranged coaxially to one another. Alternatively, or in addition, the aforementioned first, second and third subsegments of the first connection element can be components of one and the same monolithic molded part produced, for example, by an additive production method.

Furthermore, the first connection element of the first converter unit can also have a fourth subsegment, for example forming a lever arm and/or at least partially rod-shaped and/or at least partially plate-shaped, adjoining the third subsegment, for example namely its second end, positioned outside the tube, extending for example at least in sections parallel to the wall of the tube and/or connected to the third subsegment by material bonding. The third and fourth subsegments may, for example, be welded together or soldered to one another. However, the fourth subsegment may also be, for example, a component of a monolithic molding which also comprises the first, second and third subsegments produced, for example, by an additive production method.

In addition, the first connection element of the first converter unit may also comprise an annular disk-shaped fifth subsegment, forming, for example, at least partially, both, a first surface of the first connection element facing the lumen of the tube and a second surface of the first connection element facing away from the lumen of the tube, and extending from a first edge adjoining the first subsegment, for example its first end, to a second edge remote therefrom and adjoining the tube wall. Said fifth subsegment may, for example, be a component of a monolithic molding which also comprises the first, second and third subsegments produced, for example, by an additive production method.

The aforementioned first subsegment of the first connection element may, in particular be designed to be elastically deformed at least proportionately, for example, to be twisted about an associated imaginary main axis of inertia parallel to or coinciding with the first imaginary torsional vibration axis of the first converter unit. Not least for this purpose, the first subsegment may also be at least partially hollow-cylindrical, for example, in such a way that a wall thickness of a first subsegment is less than 2 mm and/or is less than a wall thickness of the wall of the tube. Furthermore, the first subsegment may be connected mechanically, but nevertheless thermally conductively, to a temperature sensor which is used to detect the temperature of the converter unit and/or of fluid which is in contact with this converter unit, for example on the second surface of the connection element facing away from the lumen of the tube or arranged within the first subsegment.

The aforementioned second subsegment of the first connection element may in turn be designed in particular to transmit a rotational movement of a first subsegment of the displacer element adjacent to the second end of the first connection element about the first imaginary torsional vibration axis to the first subsegment and/or the aforementioned third subsegment of the first connection element, for example, to convert said rotational movement of the first subsegment of the displacer element into a twisting of the first subsegment of the first connection element about the first imaginary torsional vibration axis and/or a rotational movement of the third subsegment about the first imaginary torsional vibration axis.

According to the sixteenth design of the transducer of the invention, it is also provided that the second connection element of the first converter unit comprises:

- a first subsegment (for example, respectively forming, at least partially, a first surface of the second connection element facing the lumen of the tube and a second surface of the second connection element facing away from the lumen of the tube, and/or serving as a torsion spring and/or being at least partially sleeve-shaped and/or at least partially shell-shaped and/or at least partially disk-shaped and/or at least partially hollow-cylindrical),
- a second cylindrical (for example at least partially circular-cylindrical and/or rod-shaped) subsegment (for example at least partially forming a first surface of the second connection element facing the lumen of the tube) extending from a first end adjoining the first subsegment to a second end remote therefrom adjoining the displacer element,
- a cylindrical, for example at least partially circular-cylindrical and/or rod-shaped, third subsegment extending from a first end adjoining the second subsegment, for example namely its first end, to a second end remote therefrom (for example forming at least partially a second surface of the second connection element facing away from the lumen of the tube),
- and a fourth subsegment (for example, forming a lever arm and/or at least partially rod-shaped and/or at least partially plate-shaped) adjoining the third subsegment, for example namely its second end, positioned outside the tube, for example extending at least in sections parallel to the wall of the tube. In the further development of this design of the invention, it is further provided that the second connection element of the first converter unit comprises an annular disk-shaped fifth segment (for example, at least partially forming both a first surface of the second connection element facing the lumen of the tube and a second surface of the second connection element facing away from the lumen of the tube) extending from a first edge adjacent to the first segment, for example, the first end thereof, to a second edge remote therefrom and adjoining the wall of the tube, and/or that at least the fourth subsegment of the second connection element of the first converter unit and a (fourth) subsegment of the first connection element of the first converter unit are components of one and the same monolithic mold part.

According to a seventeenth design of the transducer of the invention, it is further provided that the wall of the tube has a smallest wall thickness which is more than 2 mm, for example, more than 5 mm.

According to the eighteenth design of the transducer of the invention, the wall of the tube is metallic.

According to a nineteenth design of the transducer of the invention, it is provided that the tube wall consists at least partially, in particular predominantly or completely of steel, in particular high-strength stainless steel and/or a nickel-based alloy.

According to a twentieth design of the transducer of the invention, the wall of the tube is hollow-cylindrical.

According to a twenty-first design of the transducer of the invention, the tube is straight at least in sections.

According to a twenty-second design of the transducer of the invention, it is further provided that the tube has a length measured as a smallest distance between its first end and its second end, which is smaller than a caliber of said tube.

According to a twenty-third design of the transducer of the invention, the tube has a caliber of more than 10 mm, for example more than 50 mm.

According to a twenty-fourth design of the transducer of the invention, the tube has a caliber of more than 100 mm, for example more than 500 mm.

According to a twenty-fifth design of the transducer of the invention, the tube can be inserted into the passage of a pipeline.

According to a twenty-sixth design of the transducer of the invention, the first inlet-side end of the tube is held by an attachment flange.

According to a twenty-seventh design of the transducer of the invention, the second outlet-side end of the tube is held by an attachment flange.

According to a twenty-eighth design of the transducer of the invention, the sensor arrangement is configured to detect mechanical vibrations of the first connection element and/or mechanical vibrations of the second connection element.

According to a twenty-ninth design of the transducer of the invention, the sensor arrangement is configured to generate the first vibration signal in such a way that it represents at least torsional vibrations of the first connection element of the first converter unit or at least torsional vibrations of the second connection element of the first converter unit.

According to a thirtieth design of the converter of the invention, the sensor arrangement is configured to generate a first vibration signal, in particular an electrical first vibration signal, representing mechanical vibrations of at least the first converter unit, in particular at least torsional vibrations of the first connection element of the first converter unit, in particular in such a way that the first vibration signal has a measuring component, namely a signal component with a signal frequency corresponding to the usable vibration frequency. In a further development of this design of the invention, the sensor arrangement is also configured to detect at least the torsional vibrations of the first connection element of the first converter unit having the usable vibration frequency and to generate the first vibration signal with a measuring component representing, for example, at least these torsional vibrations of the first connection element, namely a signal component having a signal frequency corresponding to the usable vibration frequency.

According to a thirty-first design of the transducer of the invention, the sensor arrangement is configured to generate a second vibration signal representing mechanical vibrations of at least the first converter unit (for example, namely at least torsional vibrations of the second connection element of the first converter unit), for example an electrical vibration signal; for example, in such a way that the second vibration signal has a measuring component, namely a signal component with a signal frequency corresponding to the usable vibration frequency and/or that there is a phase difference between the first vibration signal and the second vibration signal dependent on a mass flow rate of the fluid. In a further development of this design of the invention, the sensor arrangement is also configured to detect at least the torsional vibrations of the second connection element of the first converter unit, which have the usable vibration frequency, and to generate the second vibration signal with a measuring component representing, for example, these torsional vibrations of the second connection element, namely a signal component having a signal frequency corresponding to the usable vibration frequency; this in particular in such a way that there is a phase difference between the measuring component of the first vibration signal and the measuring component of the second vibration signal which is dependent on a mass flow rate of the fluid.

According to a thirty-second design of the transducer of the invention, it is provided that the sensor arrangement has a first vibration sensor, for example an electrodynamic or a piezoelectric or a capacitive sensor. In a further development of this design of the invention, it is further provided that the sensor arrangement has a second vibration sensor, for example an electrodynamic, a piezoelectric or a capacitive sensor. For example, the second vibration sensor and the first vibration sensor may be structurally identical. The first vibration sensor may, for example, be mechanically connected at least to the first connection element of the first converter unit; alternatively, or in addition, the second vibration sensor may be mechanically connected at least to the second connection element of the first converter unit.

According to a thirty-third design of the transducer of the invention, the exciter arrangement is designed to excite or sustain resonance vibrations of the first converter unit.

According to a thirty-fourth design of the transducer of the invention, it is further provided that the exciter arrangement for generating a first exciter force causing (for example, time-varying and/or at least temporarily periodic) mechanical vibrations, of the first converter unit, namely usable vibrations, has at least one first vibration exciter. The first vibration exciter may, for example, be an electrodynamic vibration exciter or a piezoelectric vibration exciter. Alternatively or in addition, the first vibration exciter may be connected mechanically at least to the first connection element of the first converter unit or, for example, to both the first connection element of the first converter unit and to the second connection element of the first converter unit. In a further development of this design of the invention, it is further provided that the exciter arrangement for generating a second exciter force (which is, for example, time-varying and/or at least temporarily periodic), which causes mechanical vibrations, for example usable vibrations, of the first converter unit, has at least one second vibration exciter. The second vibration exciter may, for example, be an electrodynamic vibration exciter or a piezoelectric vibration exciter. Alternatively, or in addition, the second vibration exciter may be structurally identical to the first vibration exciter and/or at least mechanically connected to the second connection element of the first converter unit.

According to a thirty-fifth design of the transducer of the invention, it is further provided that the first converter unit has at least a third connection element (for example, at least partially sleeve-shaped and/or at least partially rod-shaped and/or at least partially shell-shaped and/or at least partially disk-shaped and/or metallic and/or identical in construction to the first connection element) and at least a fourth connection element (for example, at least partially sleeve-shaped and/or at least partially rod-shaped and/or at least partially shell-shaped and/or at least partially disk-shaped and/or metallic and/or structurally identical to the third connection element (213)). In a further development of this design of the invention, it is further provided that the first converter unit is mechanically connected to the displacer element of the first converter unit, and that the fourth connection element of the first converter unit is mechanically connected to the displacer element of the first converter unit in the direction of the imaginary longitudinal axis of said displacer element and/or along an imaginary envelope line of the wall of the tube at a distance from the third connection element and/or that the first converter unit is inserted into the tube and mechanically connected thereto in such a way that each of the third and fourth connection elements thereof is respectively placed at least partially inside the wall of said tube and is mechanically connected thereto in such a way that the fourth connection element is mechanically connected to the wall of the tube at a distance from the third connection element in the direction of the imaginary longitudinal axis of the tube and/or is arranged downstream of the third connection element in the flow direction. Advantageously, the first and third connection elements may also be arranged and mechanically connected to the displacer element in such a way that an imaginary main axis of inertia of the first connection element and an imaginary main axis of inertia of the third connection element are aligned with each other and/or the second and fourth connection elements may also be arranged and mechanically connected to the displacer element in such a way that an imaginary main axis of inertia of the second connection element and an imaginary main axis of inertia of the fourth connection element are aligned with each other. Alternatively or in addition, the third connection element may be positioned on the tube at a distance from the first connection element along a circumferential line of the wall, for example diametrically opposite the first connection element, and/or the fourth connection element may be positioned on the tube at a distance from the second connection element along a circumferential line of the wall, for example diametrically opposite the second connection element, and/or the fourth connection element may be positioned on the tube at a distance from the third connection element along an imaginary envelope line of the wall. Furthermore, the exciter arrangement may comprise a first vibration exciter and a second vibration exciter, wherein the first vibration exciter is mechanically connected both to the first connection element of the first converter unit and to the second connection element of the first converter unit, and wherein the second vibration exciter is mechanically connected both to the third connection element of the first converter unit and to the fourth connection element of the first converter unit, and/or the sensor arrangement may have a first, second, third and fourth, for example electrodynamic or piezoelectric, vibration sensor, the first vibration sensor being mechanically connected at least to the first connection element of the first converter unit, the second vibration sensor at least to the second connection element of the first converter unit, the third vibration sensor at least to the third connection element of the first converter unit and the fourth vibration sensor at least to the fourth connection element of the first converter unit.

According to a thirty-sixth design of the transducer of the invention, the first converter unit has different flexural/torsional vibration modes, for example, namely, different normal modes as well as natural or resonance frequencies, wherein in each of the flexural/torsional vibration modes, the first connection element of the first converter unit respectively undergoes torsional vibrations about an imaginary first torsional vibration axis of the first converter unit (for example, parallel to or coinciding with an imaginary main axis of inertia of the first connection element) and the second connection element of the first converter unit respectively executes torsional vibrations about a second imaginary torsional vibration axis of the first converter unit (for example parallel to an imaginary main axis of inertia of the second connection element or coinciding therewith and/or parallel to the first imaginary torsional vibration axis of the first converter unit), and wherein in each of the flexural/torsional vibration modes the displacer element of the first converter unit respectively executes both flexural vibrations coupled to the respective torsional vibrations of the first connection element and flexural vibrations coupled to the respective torsional vibrations of the second connection element about an imaginary flexural vibration axis of the first converter unit (for example, parallel to an associated imaginary main axis of inertia and/or extending in the direction of flow); advantageously, a basic flexural/torsional vibration mode inherent in the first converter unit, namely one with a lowest natural frequency or a basic flexural/torsional vibration mode inherent in the first converter unit, namely a flexural/torsional vibration mode having a lowest natural frequency or a lowest resonance frequency of all flexural/torsional vibration modes of the first converter unit, may serve as a use mode and/or a total spring constant of the first converter unit determining a natural frequency of said basic flexural/torsional vibration modes may be selected so that it is more than 10% and/or less than 50% of a spring constant of the displacer element of the first converter unit contributing to said overall spring constant. In a further development of this design of the invention, the exciter arrangement is also configured to excite or sustain the usable vibrations with a basic flexural/torsional vibration mode having an instantaneous resonance frequency of a basic flexural/torsional vibration mode, namely one having a lowest natural frequency or a lowest resonance frequency of all the flexural/torsional vibration modes of the first converter unit, namely a vibration mode of the first converter unit that coincides with and/or deviates from a flexural/torsional vibration mode of the first converter unit by less than 2 Hz, and/or the exciter arrangement is configured to excite or sustain the usable vibrations with a basic flexural/torsional vibration mode of the first converter unit which coincides with an instantaneous resonance frequency of a basic flexural/torsional vibration mode, namely with its instantaneous resonance frequency.

In a further development of this design of the invention, it is further provided that the first connection element of the first converter unit comprises a first subsegment (that, for example, respectively forms at least partially a first surface of the first connection element facing the lumen of the tube and a second surface of the first connection element opposite thereto or facing away from the lumen of the tube and/or is at least partially sleeve-shaped and/or at least partially shell-shaped and/or at least partially disk-shaped and/or at least partially hollow-cylindrical) and that the first connection element of the first converter unit is arranged in such a way that an imaginary main axis of inertia of the first subsegment is parallel to or coincides with the first imaginary torsional vibration axis. Alternatively or in addition, it is further provided that the first converter unit has a third connection element (for example, at least partially sleeve-shaped and/or at least partially rod-shaped and/or at least partially shell-shaped and/or at least partially disk-shaped and/or metallic and/or structurally identical to the first connection element) and at least one fourth connection element (for example, at least partially sleeve-shaped and/or at least partially rod-shaped and/or at least partially shell-shaped and/or at least partially disk-shaped and/or metallic and/or structurally identical to the third connection element (213)) and that in each of the flexural/torsional vibration modes the third connection element of the first converter unit executes at least proportionate torsional vibrations about the (for example, at least partially sleeve-shaped and/or at least partially rod-shaped and/or at least partially shell-shaped and/or at least partially disk-shaped and/or metallic and/or structurally identical to the third connection element) first imaginary torsional vibration axis of the first converter unit and the fourth connection element of the first converter unit executes at least proportionate torsional vibrations about the (for example, parallel to or coinciding with an associated imaginary main axis of inertia of the fourth connection element) second imaginary torsional vibration axis of the first converter unit in opposite phase and/or in opposite phase to said torsional vibrations of the third connection element.

According to a thirty-seventh design of the transducer of the invention, the exciter arrangement is configured to convert electrical power into mechanical power, and, in converting electrical power to mechanical power, to excite or sustain usable vibrations, namely induced mechanical vibrations of the transducer in a use mode, in a usable vibration frequency, namely a predeterminable vibration frequency—for example, a frequency dependent on the density of the fluid and/or variable during operation and/or corresponding to an instantaneous resonance frequency of the first converter unit.

In a further elaboration of this design of the invention, it is further provided that in use mode the first connection element of the first converter unit at least proportionally executes torsional vibrations about a first imaginary torsional vibration axis of the first converter unit (for example, parallel to or coinciding with an imaginary main axis of inertia of the first connection element), and the second connection element of the first converter unit at least proportionally executes torsional vibrations opposed to said torsional vibrations of the first connection element about a second imaginary torsional vibration axis of the first converter unit (for example, parallel to or coinciding with an imaginary main axis of inertia of the second connection element and/or parallel to the first imaginary torsional vibration axis), and that in use mode the displacer element of the first converter element at least partially executes flexural vibrations (for example, coupled to the torsional vibrations of the first connection element and/or the second connection element and/or identical in frequency thereto) about an imaginary flexural vibration axis of the first converter unit (parallel to an associated imaginary main axis of inertia and/or running in the flow direction); and that in such an advantageous way that the usable vibrations of the first converter unit, not least the flexural vibrations of the displacer element of the first converter unit in use mode, are suitable for inducing Coriolis forces in the fluid flowing through the tube that are dependent on a mass flow rate of said fluid, and which in turn induce Coriolis vibrations, namely mechanical vibrations of the transducer in a Coriolis mode which are superimposed on and/or coupled to the usable vibrations, in which Coriolis mode the displacer element of the first converter unit carries out flexural vibrations about the imaginary flexural vibration axis of the first converter unit extending in the direction of flow, which flexural vibrations deviate at least proportionally from its flexural vibrations in the use mode (for example coupled to or having the same flexural vibrations in the use mode or the same use vibration frequency), and in which Coriolis mode the first connection element of the first converter unit carries out torsion vibrations about the first imaginary torsion vibration axis of the first converter unit, which torsion vibrations at least proportionally superimpose its torsion vibrations in use mode and/or exhibit usable vibration frequency (for example coupled with the flexural vibrations of the displacer element in Coriolis mode) and the second connection element of the first converter unit carries out torsion vibrations about the second imaginary torsion vibration axis of the first converter unit, which torsion vibrations at least proportionally superimpose its torsion vibrations in use mode (for example coupled with the flexural vibrations of the displacer element in Coriolis mode and/or exhibiting usable vibration frequency). Use mode and Coriolis mode can be advantageously designed so that there is a phase difference between the torsional vibrations of the first connection element with usable vibration frequency and the torsional vibrations of the second connection element with usable vibration frequency dependent on the mass flow rate of the fluid.

According to a thirty-eighth design of the invention, the first converter unit contains suspension modes having different normal modes and different resonance frequencies, wherein in each of the suspension vibration modes, the first connection element of the first converter unit respectively executes flexural vibrations about a first imaginary flexural vibration axis of the first converter unit (for example, perpendicular to the first imaginary torsional vibration axis of the first converter unit) and the second connection element of the first converter unit respectively executes flexural vibrations about a second imaginary flexural vibration axis (for example, perpendicular to the second imaginary torsional vibration axis of the first converter unit), and wherein in each of the suspension vibration modes, the displacer element of the first converter unit respectively oscillates about a static rest position displaced, for example, being shifted from said rest position and/or rotated about said rest position. In a further development of this design of the invention, the first converter unit also comprises different flexural and torsional frequency modes having namely deviating normal modes and deviating natural and/or resonance frequencies, and it is further provided that a natural frequency of a basic suspension vibration mode of the first converter unit is more than 10 Hz higher than a natural frequency of a basic flexural/torsional vibration mode of the first converter unit, for example more than 110% of the natural frequency of the basic flexural/torsional vibration mode.

According to a thirty-ninth design of the transducer of the invention, the displacer element of the first converter unit has a natural vibration mode, for example a flexural vibration mode, which has a first nodal surface (for example, formed as linear and/or as a nodal line) and at least one—for example exactly one—second nodal surface at a distance from said first nodal surface (for example, running parallel thereto and/or formed as linear and/or as a nodal line). In a further development of this design of the invention, the first connection element of the first converter unit and the displacement element of the first converter unit are so arranged and connected to each other that an imaginary main axis of inertia of said first connection element and the first nodal surface are aligned with each other, for example coincide with each other in an imaginary extension, and/or the second connection element of the first converter unit and the displacer element of the first converter unit are so arranged and connected to one another that an imaginary main axis of inertia of said second connection element and the second nodal surface are aligned with one another, for example coincide with one another in an imaginary extension.

According to the fortieth design of the transducer of the invention, it is further provided that the displacer element of the first converter unit has a greatest height, which is measured as a greatest extension of said displacer element in the direction of a (for example, parallel to an imaginary main axis of inertia of the first connection element of the first converter unit and/or parallel to an imaginary main axis of inertia of the second connection element of the first converter unit and/or parallel to a diameter of the tube) imaginary main axis of inertia of the displacer element, whose greatest height corresponds to less than 100%, for example less than 95%, of a caliber, namely an internal diameter of the tube and/or more than 10%, for example more than 30%, of the same caliber.

According to a forty-first design of the transducer of the invention, it is provided that the displacer element of the first converter unit has a greatest length, measured as a greatest extension of said displacement element in the direction of an imaginary main axis of inertia of the converter unit (for example perpendicular to an imaginary main axis of inertia of the first connection element of the first converter unit and/or perpendicular to an imaginary main axis of inertia of the second connection element of the first converter unit and/or parallel to an imaginary longitudinal axis of the tube), the greatest length of the first converter unit being more than 100%, for example also more than 200%, and/or less than 1000%, for example not more than 600%, of a tube caliber.

According to a forty-second design of the transducer of the invention, it is provided that the displacer element of the first converter unit has a greatest length, measured as a greatest extension of the said displacer element in the direction of an imaginary main axis of inertia of the converter unit (for example, perpendicular to an imaginary main axis of inertia of the first connection element of the first converter unit and/or perpendicular to an imaginary main axis of inertia of the second connection element of the first converter unit and/or parallel to an imaginary longitudinal axis of the tube), and a greatest height, measured as a greatest extension of said displacer element in the direction of an imaginary main axis of inertia of the displacer element (for example, parallel to an imaginary main axis of inertia of the first connection element of the first converter unit and/or parallel to an imaginary main axis of inertia of the second connection element of the first converter unit and/or parallel to a diameter of the tube), and that the displacer element of the first converter unit has a height-to-length ratio, measured as a ratio of its greatest height to its greatest length, less than one, for example less than 0.5, and/or greater than 0.1, greater than 0.3.

According to a forty-third design of the transducer of the invention, it is further provided that a smallest distance between the first connection element of the first converter unit and the second connection element of the first converter unit is more than 40% of a greatest length of the displacer element of the first converter unit, measured as a greatest extension of said displacer element in the direction of an imaginary main axis of inertia of the converter unit (for example, perpendicular to an imaginary main axis of inertia of the first connection element of the first converter unit and/or perpendicular to an imaginary main axis of inertia of the second connection element of the first converter unit and/or parallel to an imaginary longitudinal axis of the tube), and/or less than 80% of the same greatest length of the displacer element of the first converter unit, for example 56% of the greatest length of the displacer element of the first converter unit.

According to a forty-fourth design of the transducer of the invention, it is further provided that the displacer element of the first converter unit has a smallest thickness, measured as a smallest extension of said displacer element in the direction of an imaginary main axis of inertia of said displacer element perpendicular to the imaginary main axis of inertia of the first connection element of the first converter unit and/or perpendicular to the imaginary main axis of inertia of the second connection element of the first converter unit and/or perpendicular to an imaginary longitudinal axis of the tube, which smallest thickness $d_{210}$ is less than 10%, in particular, less than 5%, of a tube caliber and/or more than 0.5%, in particular, namely more than 1%, of said caliber.

According to a first further development of the transducer of the invention, the latter comprises a second converter unit, for example, similar to the first converter unit or having the same function or construction as the first converter unit, which has at least one displacer element (for example, at least partially disk-shaped and/or at least partially rod-shaped and/or metallic and/or structurally identical to the displacer element of the first converter unit), a first connection element (for example, at least partially sleeve-shaped and/or at least partially rod-shaped and/or at least partially shell-shaped and/or at least partially disk-shaped and/or at least partially circular-cylindrical and/or metallic and/or serving as a force transducer and/or structurally identical to the first connection element of the first converter unit) and at least one second connection element (for example, at least partially sleeve-shaped and/or at least partially shell-shaped and/or at least partially circular-cylindrical and/or metallic and/or serving as a force transducer and/or structurally identical to the second connection element of the first converter unit and/or to the first connection element of the second converter unit), wherein said first connection element of the second converter unit is mechanically connected to said displacer element of the second converter unit and wherein said second connection element of the second converter unit is mechanically connected to the displacer element of the second converter unit at a distance from the first connection element of the second converter unit in the direction of an imaginary longitudinal axis of said displacer element.

According to a first design of the first further development of the invention, the second converter unit is inserted into the tube and mechanically connected thereto in such a way that the displacer element thereof is placed inside the lumen of said tube at a distance from the displacer element of the first converter unit and each of the first and second connection elements of the second converter unit is respectively placed at least partially inside the wall of said tube and mechanically connected thereto, and in such a way that the second connection element of the second converter unit is mechanically connected to the wall of the tube at a distance from the first connection element of the second converter unit in the direction of an imaginary longitudinal axis of the tube and/or is arranged downstream of the first connection element of the second converter unit in the flow direction, and the second converter unit is also designed so as to be contacted by fluid located in the lumen of the tube and meanwhile allowed to vibrate in such a way that both, each of the first and second connection elements thereof and the displacer element thereof, are respectively at least proportionately elastically deformed; and in such a way that each of the first and second connection elements of the second converter unit is at least proportionately twisted about a respective imaginary main axis of inertia and/or that the displacer element of the second converter unit is at least proportionately bent out of a static rest position in the direction of a diameter of the tube perpendicular to an imaginary main axis of inertia of the first connection element of the second converter unit and/or an imaginary main axis of inertia of the second connection element of the second converter unit.

According to a second design of the first further development of the invention, the second converter unit is inserted into the tube and is mechanically connected thereto in such a way that said converter unit is arranged parallel to the first converter unit.

According to a third design of the first further development of the invention, the second converter unit has, for example, at least a lowest resonance frequency that is equal to, for example, the lowest resonance frequency of the first converter unit.

According to a fourth design of the first further development of the invention, the exciter arrangement has at least one, for example electrodynamic or piezoelectric, first vibration exciter for generating a first (for example time-varying and/or at least temporarily periodic) excitation force causing mechanical vibrations, for example usable vibrations, of the first and second converter units, wherein the first vibration exciter is mechanically connected both to the first connection element of the first converter unit and to the first connection element of the second converter unit. In order to generate a (for example time-varying and/or at least temporarily periodic) second excitation force causing mechanical vibrations, for example usable vibrations, of the first and second converter units, the exciter arrangement can also have a second vibration exciter, for example structurally identical to the first vibration exciter, which can advantageously be mechanically connected both to the second connection element of the first converter unit and to the first connection element of the second converter unit.

According to a fifth design of the first further development of the invention, the sensor arrangement for generating at least the first vibration signal has a first, electrodynamic or piezoelectric or capacitive, vibration sensor, for example, wherein the first vibration sensor is mechanically connected both to the first connection element of the first converter unit and to the first connection element of the second converter unit. In order to generate at least one second vibration signal representing mechanical vibrations of at least the first converter unit, the sensor arrangement can also have a second vibration sensor, for example structurally identical to the first vibration sensor, which can advantageously be mechanically connected both to the second connection element of the first converter unit and to the second connection element of the second converter unit.

According to a sixth design of the first further development of the invention, the second converter unit also has a third connection element (at least, for example, partially sleeve-shaped and/or at least partially rod-shaped and/or at least partially shell-shaped and/or at least partially circular-cylindrical and/or metallic and/or serving as a force inducer and/or metallic and/or structurally identical to the first connection element of the second converter unit) and at least one (at least, for example, partially sleeve-shaped and/or at least partially rod-shaped and/or at least partially shell-shaped and/or at least partially circular-cylindrical and/or metallic and/or serving as a force transducer and/or metallic and/or structurally identical to the third connection element of the second converter unit) fourth connection element. Furthermore, the second converter unit is inserted into the tube and mechanically connected thereto in such a way that each of its third and fourth connection elements is respectively placed at least partially inside the wall of said tube and mechanically connected thereto in such a way that the fourth connection element is mechanically connected to the tube wall at a distance from the third connection element in the direction of the imaginary longitudinal axis of the tube and/or is arranged downstream of the third connection element in the flow direction. In the use mode, the third connection element of the second converter unit can at least proportionally execute torsional vibrations about the first imaginary torsional vibration axis (for example, parallel to or coinciding with an associated imaginary main axis of inertia) of the second converter unit, and the fourth connection element of the second converter unit can execute torsional vibrations at least proportionately about the second imaginary torsional vibration axis (for example, parallel to or coinciding with an associated imaginary main axis of inertia) of the second converter unit in opposite phase and/or counter-equivalent to the said torsional vibrations of the third connection element. Furthermore, in use mode, the first connection element of the second converter unit can also generate, at least proportionately, torsional vibrations (for example, in opposite phase or counter-equivalent to the torsional vibrations of the first converter unit) about an imaginary first torsional vibration axis (for example parallel to or coinciding with the associated imaginary main axis of inertia) of the second converter unit, and the second connection element of the second converter unit can execute torsional vibrations that are at least proportionately in opposite phase and/or counter-equivalent to said torsional vibrations of the first connection element of the second converter unit (for example also in opposite phase and/or counter-equivalent to the torsional vibrations of the second connection element of the first converter unit) about a second imaginary torsional vibration axis of the second converter unit (for example parallel to an associated imaginary main axis of inertia or coinciding with it and/or parallel to a first imaginary torsional vibration axis) and, in use mode, the displacer element of the second converter unit can also, at least proportionately, execute flexural vibrations (for example coupled with torsional vibrations of the first connection element of the second converter unit and/or the second connection element of the second converter unit and/or in the same frequency thereto and/or counter-equivalent to flexural vibrations of the displacer element of the first converter unit in use mode) about an imaginary flexural vibration axis (for example parallel to an associated imaginary main axis of inertia and/or extending in flow direction) of the second converter unit. Both the flexural vibrations of the displacer element of the first converter unit in use mode and the flexural vibrations of the displacer element of the second converter unit in use mode can be suitable for inducing Coriolis forces in the fluid flowing through the tube, which are dependent on the mass flow rate of said fluid and which cause the Coriolis vibrations; in such a way, for example, that in Coriolis mode, the displacer element of the second converter unit also at least proportionately executes flexural vibrations which deviate from its flexural vibrations in use mode (for example, flexural vibrations coupled to said flexural vibrations in use mode or having said usable vibration frequency) about the imaginary flexural vibration axis of the second converter unit extending in the flow direction and that in Coriolis mode, the first connection element of the second converter unit also executes torsional vibrations about the first imaginary torsional vibration axis of the second converter unit, which are at least proportionately superimposed on its torsional vibrations in use mode or have usable vibration frequency (for example, coupled with the flexural vibrations of the displacer element of the second converter unit in Coriolis mode), and the second connection element of the second converter unit also executes torsional vibrations about the second imaginary torsional vibration axis of the second converter unit, which are at least proportionally superimposed on its torsional vibrations in use mode (for example, torsional vibrations coupled to the flexural vibrations of the displacer element thereof in Coriolis mode or having a usable vibration frequency), in particular in such a way that there is a phase difference between the torsional vibrations of the first connection element with usable vibration frequency and the torsional vibration of the second connection element with usable vibration frequency, whose phase difference is dependent on the mass flow rate of the fluid.

According to a seventh design of the first further development of the invention, the transducer is provided with different parallel vibration modes, in particular having deviating normal modes and deviating natural frequencies, whereby the first converter unit and the second converter unit in each of the parallel vibration modes execute synchronous vibrations (for example in a respective flexural/torsional vibration mode) with identical vibration modes. Furthermore, the transducer has at least one anti-parallel vibration mode (for example forming the use mode), in which the first converter unit and the second converter unit synchronously execute vibrations (for example, in a respective flexural/torsional vibration mode) with mutually counter-equivalent vibration forms. Advantageously, the transducer or the first and second converter units are also designed in such a way that a natural frequency of these anti-parallel modes deviates from the respective natural frequency of each of the parallel vibration modes, for example, it is lower than the respective natural frequency of each of the parallel vibration modes. Alternatively or in addition, the exciter arrangement can also be designed to excite or sustain the usable vibrations with a vibration frequency deviating from a momentary resonant frequency of the anti-parallel vibration mode by no more than 2 Hz (for example a matching) vibration frequency.

According to an eighth design of the first further development of the invention, the transducer also has at least one first coupling element, which mechanically connects the first converter unit and the second connector unit to one another and is nevertheless spaced apart from the tube wall, for example rod-shaped or plate-shaped. The same can be used in particular for adjusting or separating natural frequencies of the transducer and for this purpose can be fixed, for example, both to the displacer element of the first converter unit, preferably in the area of a nodal surface of a natural vibration mode inherent in the displacer element, and to the displacer element of the second converter unit, preferably in the area of a nodal surface of a natural vibration mode inherent in the displacer element. Advantageously, a spring constant of the first coupling element contributing overall to the natural frequency of an anti-parallel resonance mode of the transducer can be selected to be smaller than a spring constant of the first coupling element contributing in each case to the respective natural frequency of parallel vibration modes of the transducer. Furthermore, the transducer can also have at least one, for example rod-shaped or plate-shaped, second coupling element, which mechanically connects the first converter unit and the second converter unit with each other and is spaced apart from the wall of the tube—in particular the same distance as the first coupling element—as well as from the first coupling element—in particular an identical coupling element. The second coupling element can be fixed both to the displacer element of the first converter unit and to the displacer element of the second converter unit.

According to a ninth design of the first further development of the invention, the sensor arrangement is configured to generate the first vibration signal in such a way that it represents mechanical vibrations of the first and second converter units (for example, torsional vibrations of the first connection element of the first converter unit and torsional vibrations of the first connection element of the second converter unit).

According to a tenth design of the first further development of the invention, the sensor arrangement is configured to detect the torsional vibrations (for example, having a usable vibration frequency) of the first connection element of the first converter unit as well as the torsional vibrations (for example, having a usable vibration frequency) of the first connection element of the second converter unit and to generate the first vibration signal with a measuring component (for example, representing at least these torsional vibrations of the first connection elements), namely a signal component corresponding to a usable vibration frequency of the first connection element of the second converter unit. Furthermore, the sensor arrangement can be configured to generate a second vibration signal, for example an electrical vibration signal, representing mechanical vibrations of the first and second converter units (for example, namely torsional vibrations of the second connection element of the first converter unit and torsional vibrations of the second connection element of the second converter unit). For example, the sensor arrangement can be configured to detect torsional vibrations of the second connection element of the first converter unit having the usable vibration frequency and torsional vibrations of the second connection element of the second converter unit having the usable vibration frequency, and to generate the second vibration signal with a measuring component representing the torsional vibrations of the second connection elements, namely a signal component having a signal frequency corresponding to the usable vibration frequency; and, in particular, in such a way that there is a phase difference between the measuring component of the first vibration signal and the measuring component of the second vibration signal, which phase difference is dependent on the mass flow rate of the fluid.

According to a second further development of the transducer of the invention, the latter further comprises at least one (first) carrier frame for holding components of the sensor arrangement and/or components of the exciter arrangement, which frame is fixed externally to the tube wall and extends, for example, at least from the first to the second connection element of the first converter unit and/or extends parallel to the displacer element of the first converter unit.

According to a third further development of the transducer of the invention, the latter further comprises at least one temperature sensor, which is coupled thermally conductively to the first converter unit, and, for example, mechanically connected to its first connection element, for detecting a temperature of said converter unit and/or a fluid contacting said converter unit.

According to a fourth further development of the transducer of the invention, the latter further comprises protective casing attached to the tube on the outside and at least partially surrounding the latter. In a further development of this design of the invention, it is further provided that the sensor arrangement and/or the exciter arrangement is arranged within the protective casing.

According to a first design of the measuring system of the invention, the electronic measuring and operating system is configured to receive and/or process the first vibration signal, for example to determine a substance parameter value representing at least one substance parameter based on the first vibration signal. In a further development of this design of the invention, the electronic measuring and operating system is configured to determine a substance parameter value representing at least one substance parameter based on the first vibration signal, and, for example, to determine a density measured value representing a density of the fluid based on a signal frequency of at least the first vibration signal corresponding to the usable vibration frequency. In addition, the electronic measuring and operating system may be configured to compare the density of the measured value with at least one predetermined density threshold value.

According to a second design of the measuring system of the invention, the electronic measuring and operating system is configured to feed electric power that is at least inducing usable vibrations into the exciter arrangement of the transducer by means of at least one electrical exciter signal, which, for example, has a signal frequency corresponding to a resonance frequency of the first converter unit. For example, said exciter signal may have a signal frequency corresponding to a resonance frequency of the first converter unit. In a further development of this design of the invention, the electronic measuring and operating system is also configured to vary at least one signal frequency of the exciter signal and/or to generate the exciter signal with a plurality of different signal frequencies. Alternatively or in addition, the electronic measuring and operating system can be advantageously configured to monitor an operating state of the measuring system based on the exciter signal and/or on the at least one vibration signal, for example, by means of two or more different signal frequencies of the exciter signal and/or at least one vibration signal, such as to monitor or verify a functional capability of the transducer and/or the electronic measuring and operating system, and/or the electronic measuring and operating system can be advantageously configured to determine or compare a viscosity value representing a viscosity of the fluid with at least one predetermined viscosity threshold value on the basis of the exciter signal, if necessary, together with the at least one vibration signal.

According to a third design of the measuring system of the invention, the sensor arrangement of the transducer is configured to generate a second vibration signal representing mechanical vibrations of at least the first converter unit (for example, namely at least torsional vibrations of the second connection element of the first converter unit), for example an electrical vibration signal, for example, in such a way that the second vibration signal has a measuring component, namely a signal component with a signal frequency corresponding to the usable vibration frequency and/or that there is a phase difference between the first vibration signal and the second vibration signal dependent on the mass flow rate m of the fluid. In addition, the electronic measuring and operating system is configured to receive and/or process both the first vibration signal and the second vibration signal, so as, for example, namely based on the first vibration signal and/or based on the second vibration signal, to determine a flow parameter value representing the at least one flow parameter, such as a mass flow value representing a mass flow rate, m, and/or a substance parameter value representing the at least one substance parameter, such as a density value representing a fluid density of the fluid and/or a viscosity value representing a viscosity of the fluid. In a further development of this design of the invention, the electronic measuring and operating system is configured to determine a flow parameter value representing the at least one flow parameter on the basis of the first vibration signal and/or the second vibration signal, for example, namely based on a phase difference between the first vibration signal and the second vibration signal, to determine a mass flow value representing a mass flow rate, m, of the fluid or to compare said mass flow measured value with at least one predetermined mass flow threshold value.

A fundamental idea of the invention consists in applying to a transducer of the type in question, on the one hand, the mechanical excitation force necessary for the excitation of usable vibrations of the at least one converter unit or for the deformation of its at least one displacer element placed inside the tube by means of at least one vibration exciter placed outside the tube, and from there to the displacer element by means of at least two connection elements serving as mechanical force transducers through the wall of the tube, and on the other hand also to conduct the deformations of the displacer element additionally caused by the fluid to be measured via the same or the aforementioned connection elements to a vibration sensor likewise placed in the tube. Surprisingly, it has also been shown that torsional vibrations of the aforementioned connection elements about a respective imaginary torsional vibration axis, for example parallel or coincident with a respective main axis of inertia, or the twisting associated therewith, can be particularly advantageously used for transmitting the exciter force or the resulting movement through the wall of the tube.

Among other things, an advantage of the invention is that, due to the mechanical transmission of the deformation movements of the converter unit necessary for the acquisition of the measurement variable through the wall of the tube, the use of complex line bushings within the tube or its wall is dispensed with, and thus a very robust and long-term stable transducer can be provided; this applies in particular also to measurements in tube systems with large nominal diameters of more than 100 mm, in particular more than 200 mm, and/or for measurements with fluid and/or operating temperatures of more than 100° C., in particular also more than 200° C., and/or with fluid and/or operating pressures of more than 100 bar, in particular more than 200 bar. The connection between the transducer and the pipeline can easily be realized by means of standard flanges provided on the pipe. A further advantage of the invention is also that, despite the novel mechanical construction of the transducer, the vibronic density and/or viscosity measuring instruments established for conventional vibronic measuring systems, not least also Coriolis mass flow meters or, likewise, vibronic density and/or viscosity measuring instruments formed by means of at least one measuring tube which vibrates during operation, known from U.S. Pat. No. 6,311, 136 and/or offered by the applicant itself, not least for Coriolis mass flow meters of the aforementioned type (http://www.endress.com/de/messgeraete-fuer-die-prozesstechnik/produktfinder?filter.business-area=flow&filter.measuring-principle-parameter=coriolis&filter.text=), can in principle be adopted or continued to be used with comparatively minor modifications. Moreover, due to the simple mechanical design of the transducer, a very inexpensive, but nevertheless very precise limit switch can be provided, which can be used, for example, for monitoring pipeline systems, for example with regard to mass flow rate, density or viscosity and/or operating parameters monitored on this basis, and/or for protecting pumps and/or valves.

BRIEF DESCRIPTION OF THE DRAWINGS

The invention as well as advantageous embodiments thereof are explained in more detail below based on exemplary embodiments shown in the figures of the drawing. Identical or identically acting or identically functioning parts are provided with the same reference signs in all figures; for reasons of clarity or if it appears sensible for other reasons, reference signs mentioned before are dispensed with in subsequent figures. Further advantageous embodiments or developments, in particular combinations of partial aspects of the invention that were initially explained only separately, furthermore result from the figures of the drawing and from the claims themselves.

The figures show in detail.

DETAILED DESCRIPTION

Figure 1:
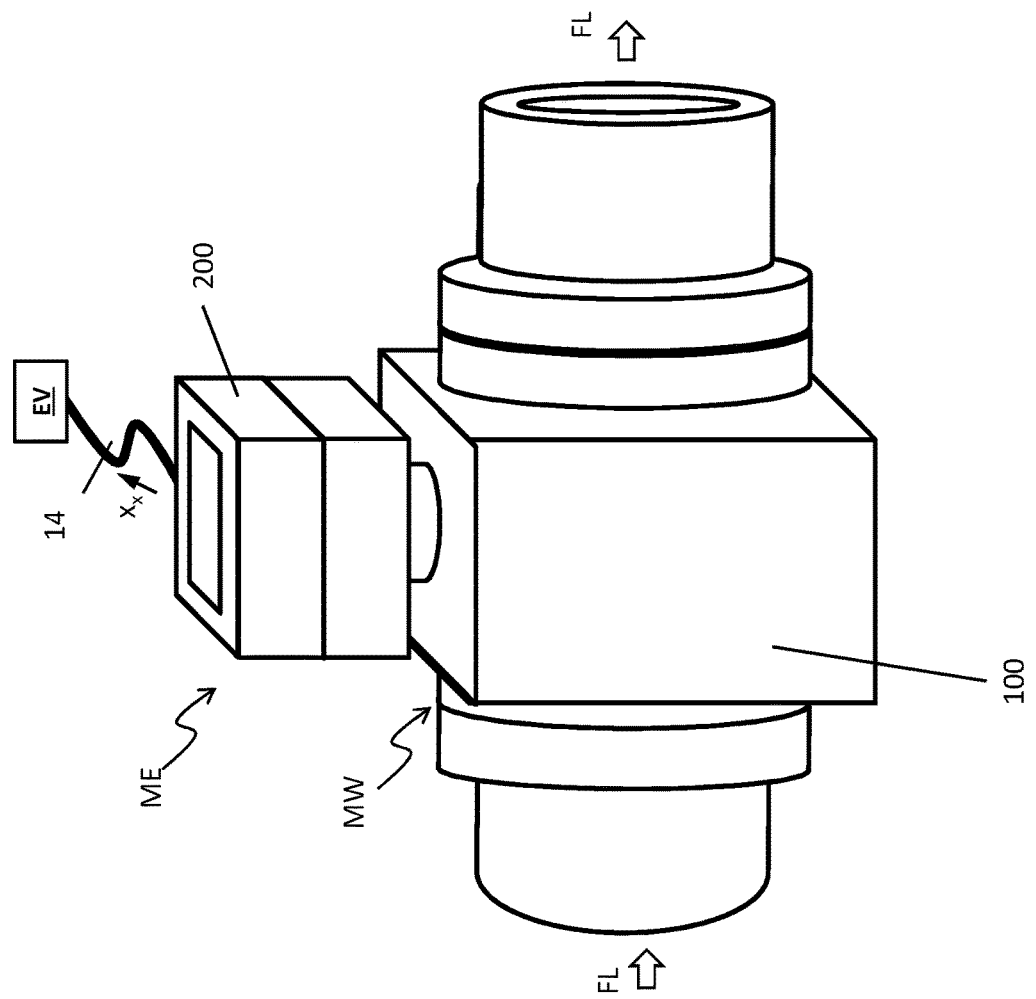
FIGS. 1 and 2 show schematic representations of a vibronic measuring system used for measuring and/or monitoring at least one measured variable of flowing fluid.
Figure 2:
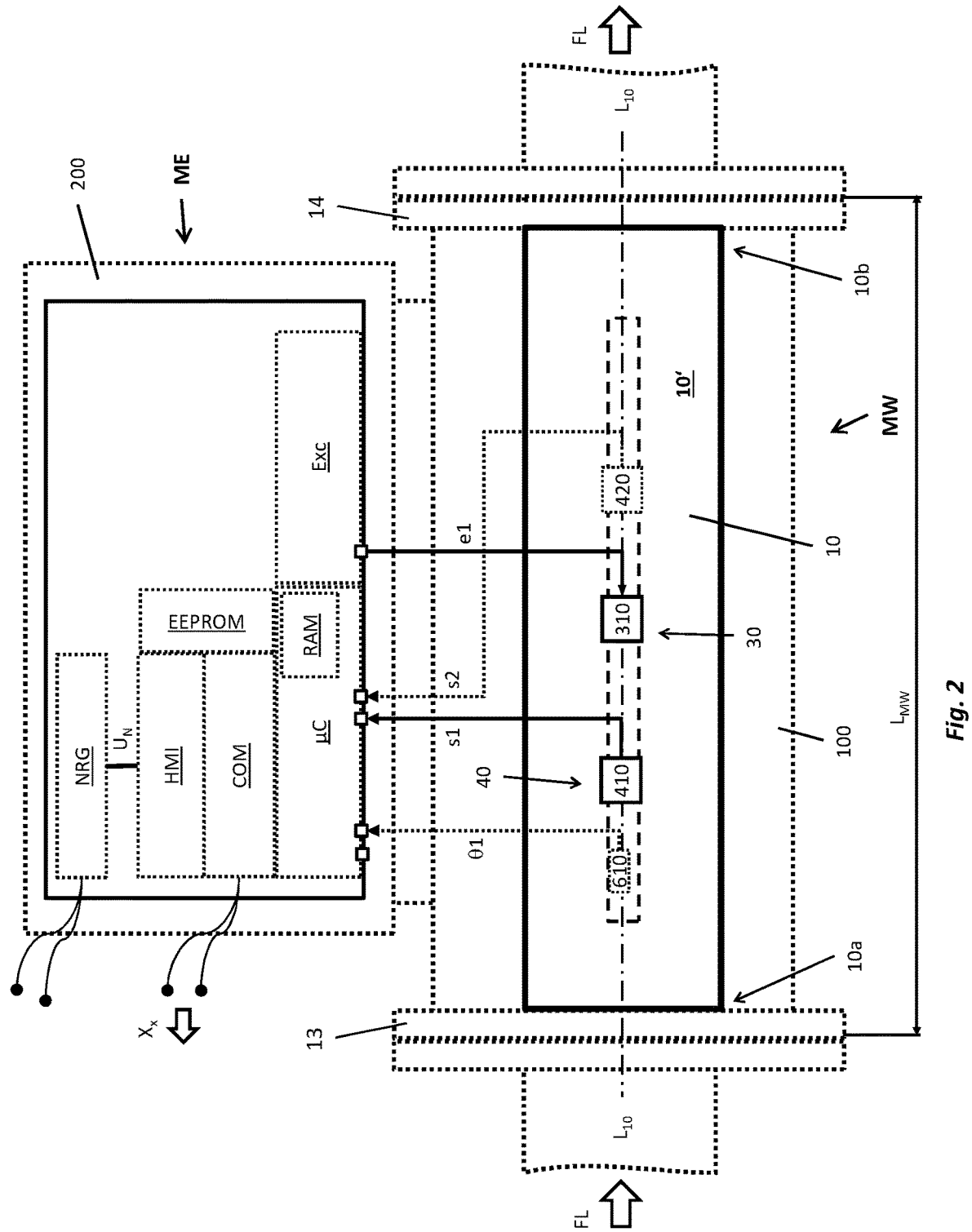

FIGS. 1 and 2 illustrate a schematic representation of a vibronic measuring system for measuring and/or monitoring, in particular, at least one time-varying measurement x, in particular a flow parameter such as a mass flow rate m, a volume flow rate v and/or a flow velocity $v_m$, and/or a substance parameter such as a density $\rho$ and/or a viscosity $\eta$ of a flowing fluid FL, in particular a gas, a liquid or a dispersion. The fluid FL to be measured or monitored by means of the measuring system may be, for example, a process gas, superheated steam, compressed natural gas (CNG) or, for example, a gas flowing at more than 500 t/h; fluid to be measured and/or monitored can, for example, also have a temperature of more than 100° C., in particular more than 200° C., and/or a static pressure of more than 100 bar, in particular more than 200 bar, and/or a fluid in a pipeline with a nominal width of more than 100 mm, in particular 200 mm. In addition, however, the measuring system in accordance with the invention can also be used, for example, in applications such as those listed in the aforementioned U.S. Pat. No. 4,420,983, US-A 2016/0187176, US-A 2016/0334316, EP-B 564 682 and WO-A 95/29386.

The measuring system comprises a vibration-type transducer MW for generating measuring signals for measuring the at least one measurement variable, and an electronic measuring and operating system ME electrically coupled to the transducer MW and supplied with electrical energy, for example during operation from an external source via connecting cable and/or by means of internal energy storage devices, for generating the measured values representing the measured variable(s) detected by the transducer, and/or for sequentially outputting such measured values $x_m$ as a respectively currently valid measured value $x_x$ ($x_m \rightarrow x_x$, $x_{m\rho} \rightarrow x_x$, $x_\eta \rightarrow x_x$) of the measuring system to a corresponding measurement output, for example also in the form of digital measured values and/or in real time. In addition, according to a design of the invention, the electronic measuring and operating system ME is designed to compare at least one of the aforementioned measured values or at least some of the measured values with a predetermined reference or threshold value. Furthermore, the electronic measuring and operating system ME can advantageously be configured to generate—for example a visually and/or acoustically perceptible alarm—in the event that a deviation of the measured value from the predefined threshold value is determined, for example in such a way that the measured value is higher than the respective threshold value or in such a way that the measured value is lower than the respective threshold value.

In order to protect the transducer or individual—for example, namely, mechanical and/or electrical or electro-mechanical—components of the latter, according to a further development of the invention, the transducer comprises a transducer protective housing 100, which is attached to the outside of the tube and at least partially surrounds the latter, wherein each of the aforementioned connection flanges, each of which holds one end of tube 10 can also be designed, for example, as an integral part of the said protective housing 100 as is quite usual in industrial measuring systems and as also indicated in FIGS. 1 and 2. The electronic measuring and operating system formed, for example, by means of at least one microprocessor and/or by means of a digital signal processor (DSP) can in turn be accommodated within the aforementioned electronics protective housing 200 of the measuring system, which is attached and/or mounted directly to the aforementioned transducer protective housing 100 for example. The said electronics protective housing 200 may, depending on the requirement for the measuring system, also be designed to be impact-resistant and/or explosion-proof and/or hermetically sealed, for example.

The electronic measuring device ME can, as also shown schematically in FIG. 2 in the manner of a block diagram, have a measuring and evaluation circuit μC, which processes measurement signals of the transducer MW and which, during operation, generates the corresponding measured values $x_x$ for the measurement variable x to be recorded by the measuring system. The measuring and evaluation circuit μC of the electronic measuring and operating system ME can be realized, for example, by means of a microcomputer having at least one microprocessor and/or a digital signal processor (DSP). The program codes to be executed by this microcomputer and the operating parameters serving to control the respective measuring system, such as set point values for controllers or controller algorithms implemented by means of the electronic measuring and operating system, can, as schematically shown in FIG. 2, be stored persistently, for example in a non-volatile EEPROM data memory of the electronic measuring and operating system ME, and loaded into a volatile RAM data memory, which is, for example, integrated into the microcomputer, when the electronic measuring and operating system ME starts. Furthermore, the electronic measuring and operating system ME can also be designed in such a way that it corresponds to one of the prior art electronic measuring and operating systems suitable for vibronic measuring systems using vibrating measuring tubes, such as e.g. an electronic measuring and operating system in accordance with U.S. Pat. No. 6,311,136 or an electronic measuring and operating system of a Coriolis mass flow/density meter offered by the applicant, e.g. under the designation "PROMASS 83F".

In the case of the measuring system shown here, the measured values $x_x$ ($x_m$, $x_p$, $x_\eta$, $x_9$...) generated by means of the measuring and operating system ME can be displayed on site, namely directly at the measuring point formed by means of the measuring system. In order to visualize measured values generated by the measuring system and/or internally generated system status messages, such as an error message signaling increased measuring inaccuracy or uncertainty or an alarm signaling a fault in the measuring system itself or at the measuring point formed by the measuring system, the measuring system can, as indicated in FIG. 2, for example, have a display and operating element HMI on site that communicates with the electronic measuring and operating system ME and is, if required, also portable, such as an LCD, OLED, or TFT display placed in the electronics housing 200 behind a suitably provided window, and a suitable input keyboard and/or a touch screen. In a favorable way, the electronic measuring and operating system ME, which can, for example, also be (re)programmed or remotely parameterized, can also be designed such that it can exchange measurement and/or other operating data, such as current measured values, system diagnosis values, system status messages, or setting values serving to control the measuring system, during operation of the measuring system with an electronic data processing system, which is superordinate to the measuring system, for example a programmable logic controller (PLC), a personal computer (PC) and/or a workstation via a data transmission system, for example a field bus system, such as FOUNDATION FIELDBUS, PROFIBUS, and/or wirelessly via radio. Furthermore, the electronic measuring and operating system ME can be designed so that it can be supplied by an external power supply, for example via the aforementioned field bus system. For this purpose, the electronic measuring and operating system ME can have, for example, an internal NRG power supply circuit for providing internal supply voltages $U_N$, which is supplied by an external power supply provided in the aforementioned data processing system during operation via the aforementioned field bus system. In this case, the measuring system can, for example, be designed as a so-called four-wire device, in which the internal power supply circuit of the electronic measuring device ME can be connected by means of a first pair of lines to an external power supply and the internal communication circuit of the electronic measuring and operating system ME can be connected by means of a second pair of lines to an external data processing circuit or an external data transmission system. However, the electronic measuring and operating system may also be designed such that, as is quite usual for industrial measuring systems, it can be electrically connected by means of a two-wire connection, which is, for example, configured by means of a 4-20 mA current loop, to the external electronic data processing system and is supplied with electrical power via this connection and can transmit measured values to the data processing system, optionally also using HART Multidrop. In the typical case that the measuring system is provided for coupling to a field bus or another electronic communication system, the electronic measuring and operating system ME, which can also, for example, be (re)programmed on site and/or via the communication system, can moreover have a corresponding communication interface COM, for example a communication interface compliant with the relevant industry standards, such as IEC 61158/IEC 61784, for a data communication, for example for sending measurement and/or operating data, thus the measured values representing the respective measurement variable, to the aforementioned programmable logic controller (PLC) or a superordinate process control system and/or for receiving setting data for the measuring system. The transducer can be electrically connected to the electronic measuring and operating system by means of corresponding connecting lines leading out of the electronics housing 200 via cable feed-through into the transducer housing 100 and laid within the transducer housing 100 at least in sections. In this case, the connecting lines can be formed at least partially as conductor wires enveloped at least in sections by an electrical insulation, for example in the form of "twisted pair" lines, ribbon cables and/or coaxial cables. Alternatively or in addition to this, the connecting leads can also be formed, at least in sections, by means of conductor tracks of, for example, a flexible or partly rigid and partly flexible, and possibly also lacquered printed circuit board, cf. also the aforementioned WO-A 96/07081.

FIGS. 3, 5, 4 and 6 show a schematic representation of various views of an exemplary embodiment of such a transducer suitable for the aforementioned vibronic measuring system. The transducer comprises a tube 10, at least straight in sections with a lumen 11' covered by—for example a metallic and/or hollow-cylindrical—wall, and which extends from an inlet side first (tube) end 11a to an outlet side second (tube) end 11b. The tube 10 is configured to be traversed by fluid, for example gas, liquid or a dispersion, in a flow direction, namely starting from the inlet side first end in the direction of the outlet side second end. Accordingly, according to a further design of the invention, the tube 10 is designed to be inserted into the passage of a pipeline, which guides the fluid to be measured during operation, for example having a caliber of more than 50 mm. Each of the two ends of the tube can, as indicated in FIG. 1, also be held by a connection flange 13 or 14, which is compatible with any connection flange on the aforementioned pipeline. Furthermore, the tube 10 itself can have a caliber $D_{10}$, which corresponds to the caliber DN of the aforementioned pipeline and/or which is more than 10 mm, for example more than 500 mm. Not least in the aforementioned case, in which caliber $D_{10}$ is more than 100 mm, the tube 10 can also have a length of $L_{10}$, measured as a smallest distance between its first end and its second end, which is smaller than said caliber $D_{10}$, hence the transducer or the measuring system formed therewith can therefore be very compact. According to a further design of the invention, the wall of the tube 10 has a smallest wall thickness, which is less than 2 mm, for example more than 5 mm, and/or the wall thereof consists at least partially—for example, predominantly or completely—of steel, such as high-strength stainless steel and/or a nickel-based alloy, whereby the transducer or the measuring system formed therewith can readily also be used for applications with comparatively high operating pressures of more than 100 bar.

The transducer in accordance with the invention also comprises at least one first converter unit 21, an electromechanical exciter arrangement 30 for exciting and sustaining induced mechanical vibrations of the converter unit 21, for example resonance vibrations, coupled to or in operative connection thereto, for example formed by means of at least one electrodynamic or piezoelectric vibration exciter 31. In particular, the exciter arrangement 30 is configured to convert electrical (exciter) power $P_{exc}$ into mechanical power and, in converting electrical power into mechanical power, to excite and/or sustain usable vibrations, namely induced mechanical vibrations of the transducer, in particular at least its converter unit 21, in use mode—sometimes referred to as drive mode—with a usable vibration frequency $f_{exc}$, namely a predeterminable vibration frequency—that is, for example, also dependent on the density ρ of the fluid FL to be measured and/or is variable during operation and/or corresponds to the momentary resonance frequency $f_{R1}$ of the converter unit 21—or at least introduce one corresponding exciter force $F_{exc}$ causing the usable vibrations into the converter unit 21. A natural frequency mode inherent in the converter unit 21 can be used as a use mode, in particular a vibration mode serving to induce Coriolis forces dependent on a mass flow rate m of the fluid flowing through the tube and/or having a natural or resonant frequency of more than 100 Hz and/or less than 1000 Hz.

Figure 3:
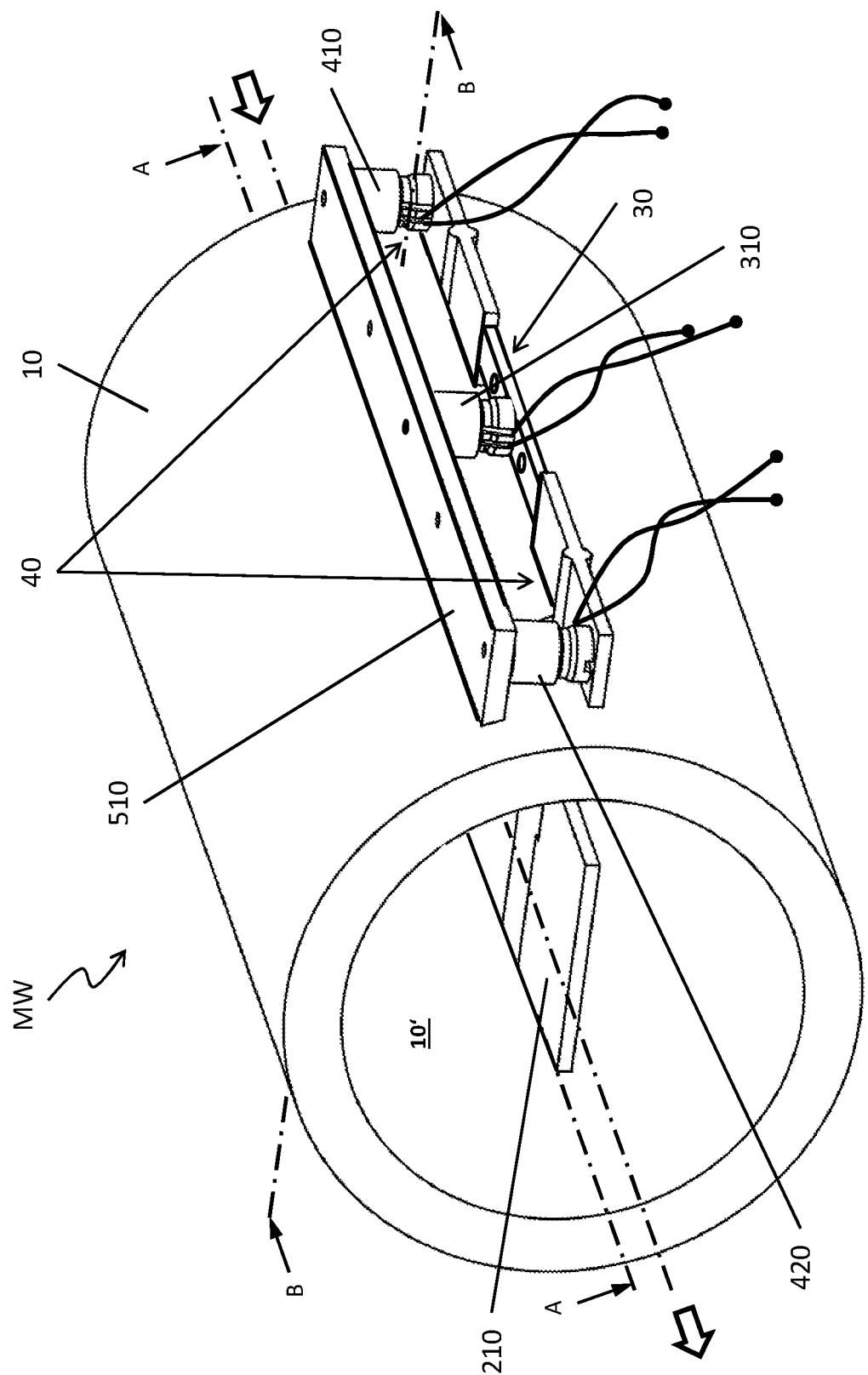
FIGS. 3-6 show schematic representations of an exemplary embodiment of a vibration-type transducer in various views that is suitable for a measuring system in accordance with FIGS. 1 or 2 and is in accordance with the present disclosure.

According to a further design of the invention, the exciter arrangement 30 has at least one, for example electrodynamic or piezoelectric, first vibration exciter 310 for generating a (first) excitation force $F_{exc}$, which is time-varying and/or at least periodically periodic, causing mechanical vibrations, in particular usable vibrations, of the converter unit 21. In addition, the transducer MW in accordance with the invention comprises—as schematically shown in FIG. 3 and as is quite usual with vibronic transducers or measuring systems formed therewith—a sensor arrangement 40 for detecting mechanical vibrations of said converter unit 21, which is also coupled to the converter unit 21 or is in operative connection therewith, for example formed by means of at least one electrodynamic vibration sensor 410 and/or at least two vibration sensors of identical construction. In particular, the sensor arrangement 40 is intended to generate at least one—first—vibration signal s1 representing mechanical vibrations of at least the converter unit 21; and, in particular, in such a way that, for example, the electrical or optical, vibration signal s1 has a measuring component, namely a signal component with a signal frequency corresponding to the usable vibration frequency. According to a further design of the invention, the sensor arrangement 40 is also designed to generate at least one second vibration signal s2, for example electrical or optical, which also represents mechanical vibrations of at least the converter unit 21 and, in particular, in such a way that the vibration signal s2 has a measuring component, namely a signal component with a signal frequency corresponding to the usable vibration frequency and/or that between the vibration signal s1 and the vibration signal s2—for example, namely between their respective aforementioned measuring components—there is a phase difference Δφ dependent on the mass flow rate m of the fluid FL. Accordingly, the sensor arrangement 40 has, for example, a first electrodynamic or a piezoelectric or a capacitive vibration sensor 410 according to a further design of the invention. Moreover, according to a further design of the invention, the sensor arrangement 40 is also formed, for example, by means of a second electrodynamic or piezoelectric or capacitive, vibration sensor 420. This type of vibration sensor 420 can advantageously be designed identically as the vibration sensor 410. As schematically represented in FIG. 3 for example, the transducer, according a further design of the invention, comprises at least one first carrier frame 510, for example in the form of a plate or rod, fixed on the outside of the tube wall 10, for sensor arrangement components and/or exciter arrangement components, to which carrier frame 510, for example the vibration exciter 310 and/or the vibration sensor 410 can be mechanically connected; the aforementioned vibration sensor 420 can also be optionally mechanically connected to said carrier frame 510.

Both the exciter arrangement 30 and the sensor arrangement 40 of the transducer are directly connected to the electronic measuring and operating system ME, in particular by means of electrical connecting cables. According to a further design of the invention, the electronic measuring and operating system is also designed to receive and/or process the vibration signal s1, and, in particular, to determine a measured value representing at least one measurement variable, for example namely a flow parameter value representing the at least one substance parameter and/or a flow parameter value representing the at least one substance parameter, namely on the basis of the vibration signal s1. For example, the electronic measuring and operating system may also be configured to determine a measured density value $x_ρ$ representing the density ρ of the fluid, based on the aforementioned signal frequency of the vibration signal s1 that corresponds to the usable vibration frequency, and/or its aforementioned measuring component, and, if necessary, to compare the measured density value $x_ρ$ with at least one predetermined density threshold value. In the aforementioned case of the sensor arrangement 30 providing at least two vibration signals s1, s2, the electronic measuring and operating system ME is, according to a further design of the invention, also designed to receive or process both vibration signal s1 and vibration signal s2, for example namely to determine the aforementioned flow parameter value, in particular the mass flow measured value $x_m$ representing the mass flow rate m of the fluid FL, and/or the aforementioned substance parameter value, in particular the aforementioned density measured value $x_\rho$ and/or a viscosity measured value $x_\eta$ representing a viscosity η of the fluid, on the basis of the vibration signal s2 and/or the vibration signal s1. In particular, the electronic measuring and operating system can be configured, based on a phase difference Δφ established between the vibration signal s1 and vibration signal s2—for example, between said aforementioned measuring components thereof—to determine the measured mass flow value $x_m$ representing the mass flow rate m of the fluid FL and/or the electronic measuring and operating system can be configured to compare said measured mass flow value with at least one predetermined mass flow threshold value.

In order to cause mechanical vibrations of at least one converter unit 21, the electronic measuring and operating system is designed, according to a further design of the invention, to feed electrical power that forces at least the aforementioned usable vibrations of the converter unit 21 into the exciter arrangement 30 by means of at least one electrical exciter signal $e_1$ that has a signal frequency corresponding to a resonance frequency of the converter unit 21. In addition, the electronic measuring and operating system may also be configured, on the basis of said exciter signal $s_1$, in particular on the basis of exciter signal $s_1$ and at least vibration signal s1, to determine the at least one aforementioned measured value or to compare it with a correspondingly predefined threshold or reference value; namely to compare the aforementioned measured mass flow value $x_m$, the aforementioned measured density value $x_\rho$ and/or the aforementioned measured viscosity value $x_\eta$, the aforementioned measured mass flow value $x_m$ with an associated mass flow threshold value and/or to compare the aforementioned measured density value $x_\rho$ with an associated density threshold value and/or to compare the aforementioned measured viscosity value $x_\eta$ with an associated viscosity threshold value and to trigger an alarm accordingly, if necessary. According to a further design of the invention, the electronic measuring and operating system is also designed to vary at least one signal frequency of the exciter signal $e_1$, for example in order to start up the measuring system as quickly as possible and/or to adapt the exciter signal to changing measuring conditions as quickly as possible and/or to carry out a self-diagnosis of the measuring system, and/or to generate the exciter signal $e_1$ with a plurality of different signal frequencies. Furthermore, the electronic measuring and operating system can advantageously be configured to monitor an operating state of the measuring system based on the exciter signal e1 and/or at least one vibration signal s1, for example on the basis of two or more different signal frequencies of the exciter signal e1 and/or of the at least one vibration signal s1, and to check or verify, for example, a proper functioning of the transducer and/or of the electronic measuring and operating system.

Figure 4:
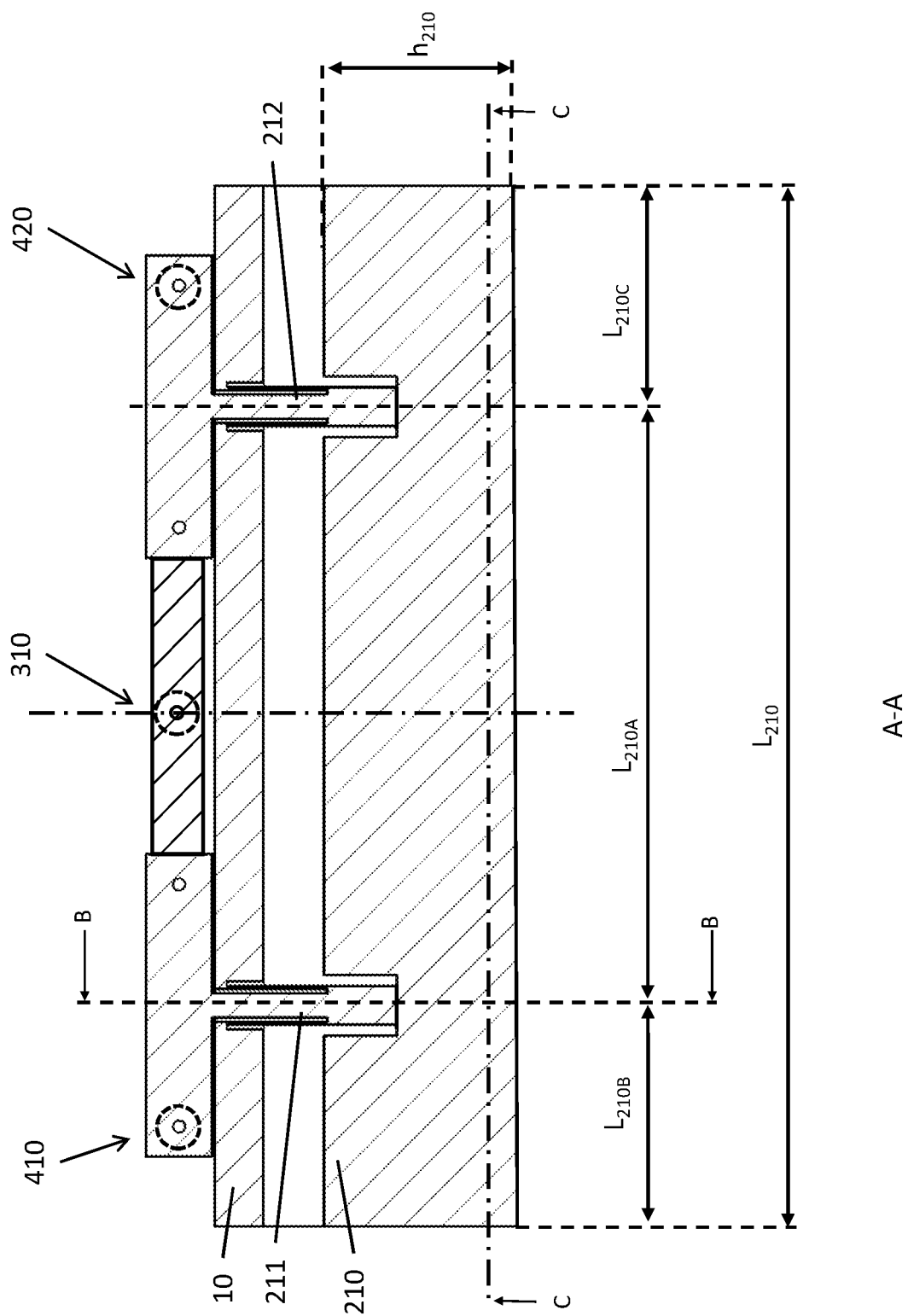
Figure 5:
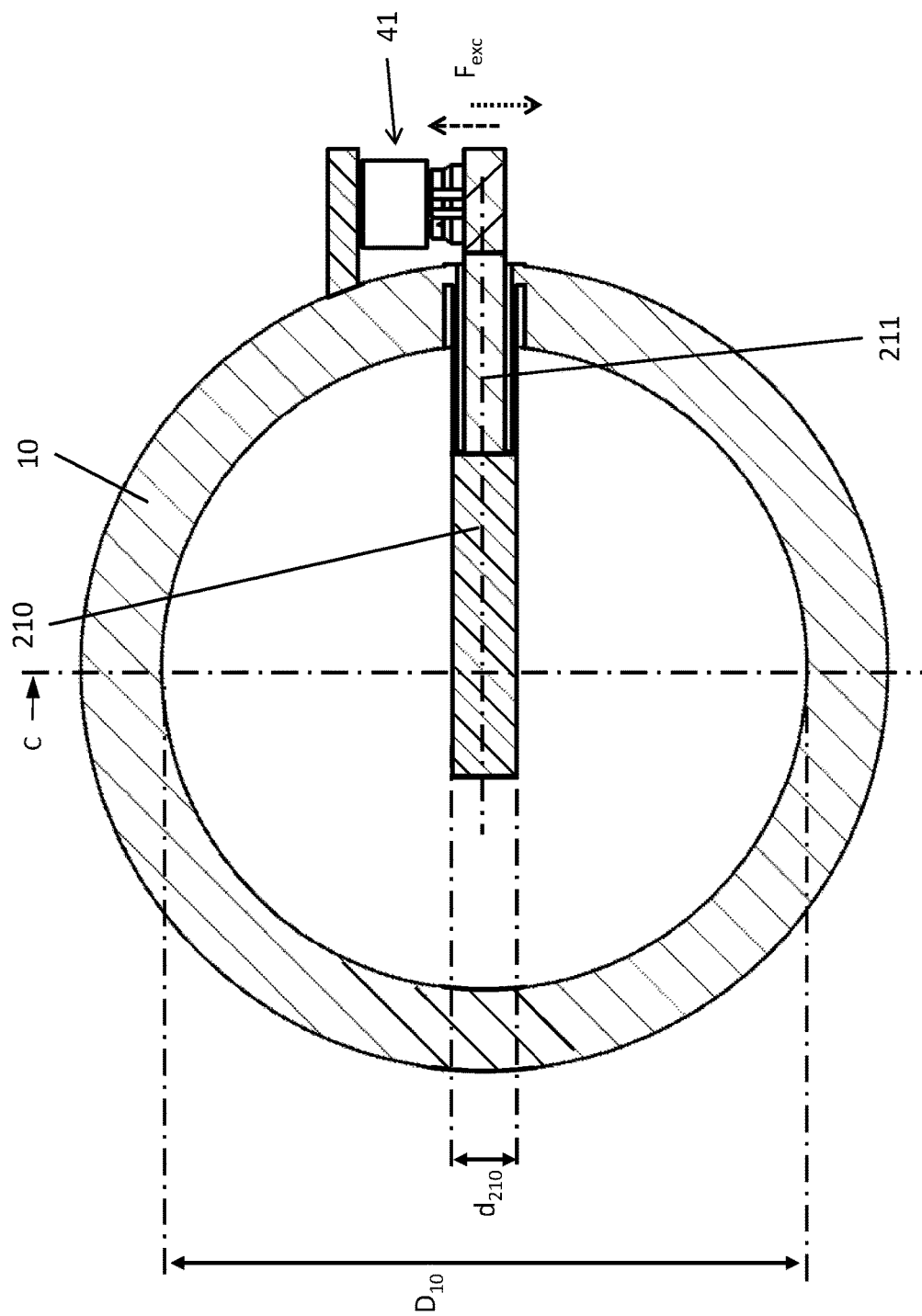
Figure 7:
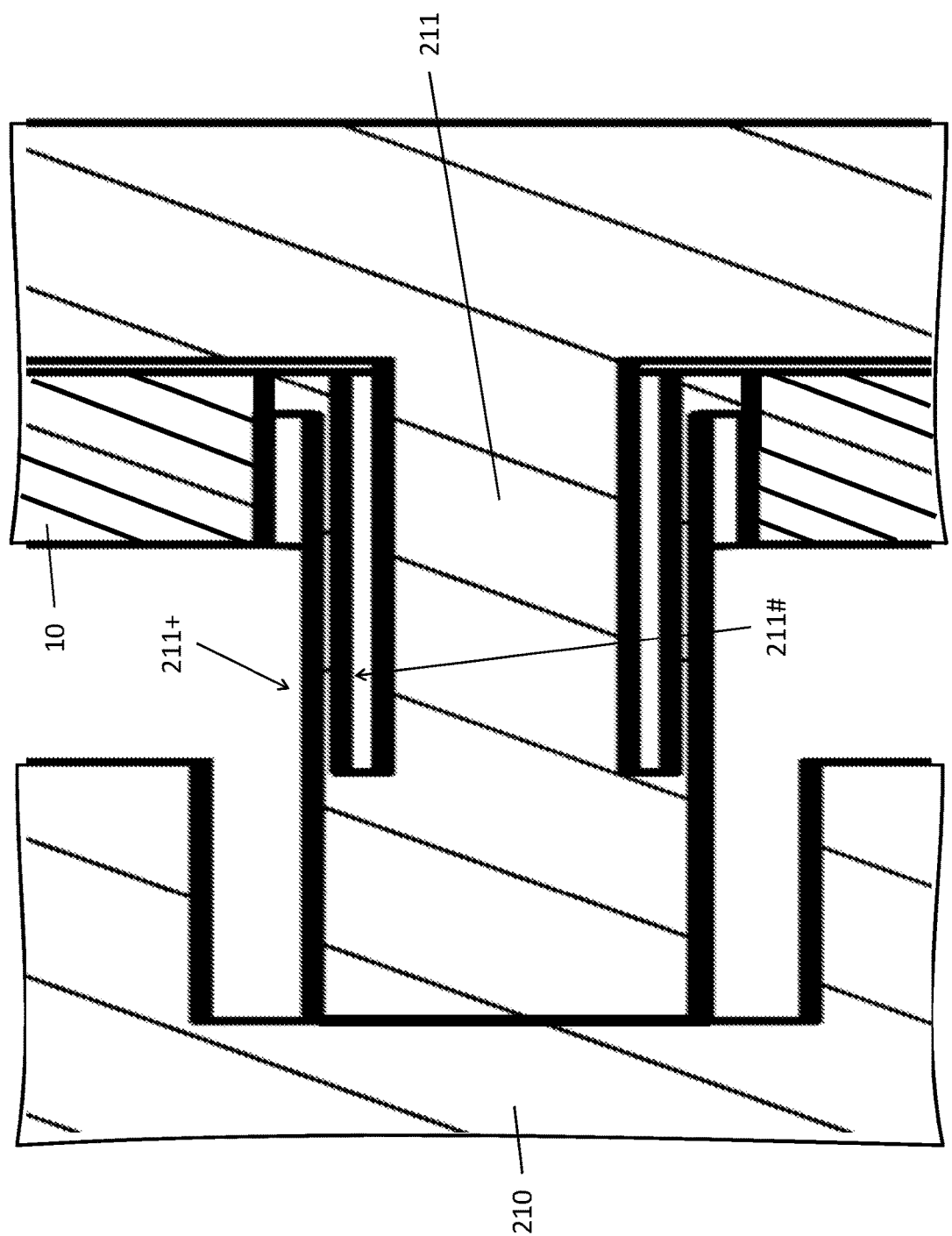
FIGS. 7 and 8 show exemplary embodiments of connection elements that are suitable for a transducer in accordance with present disclosure.
Figure 8:
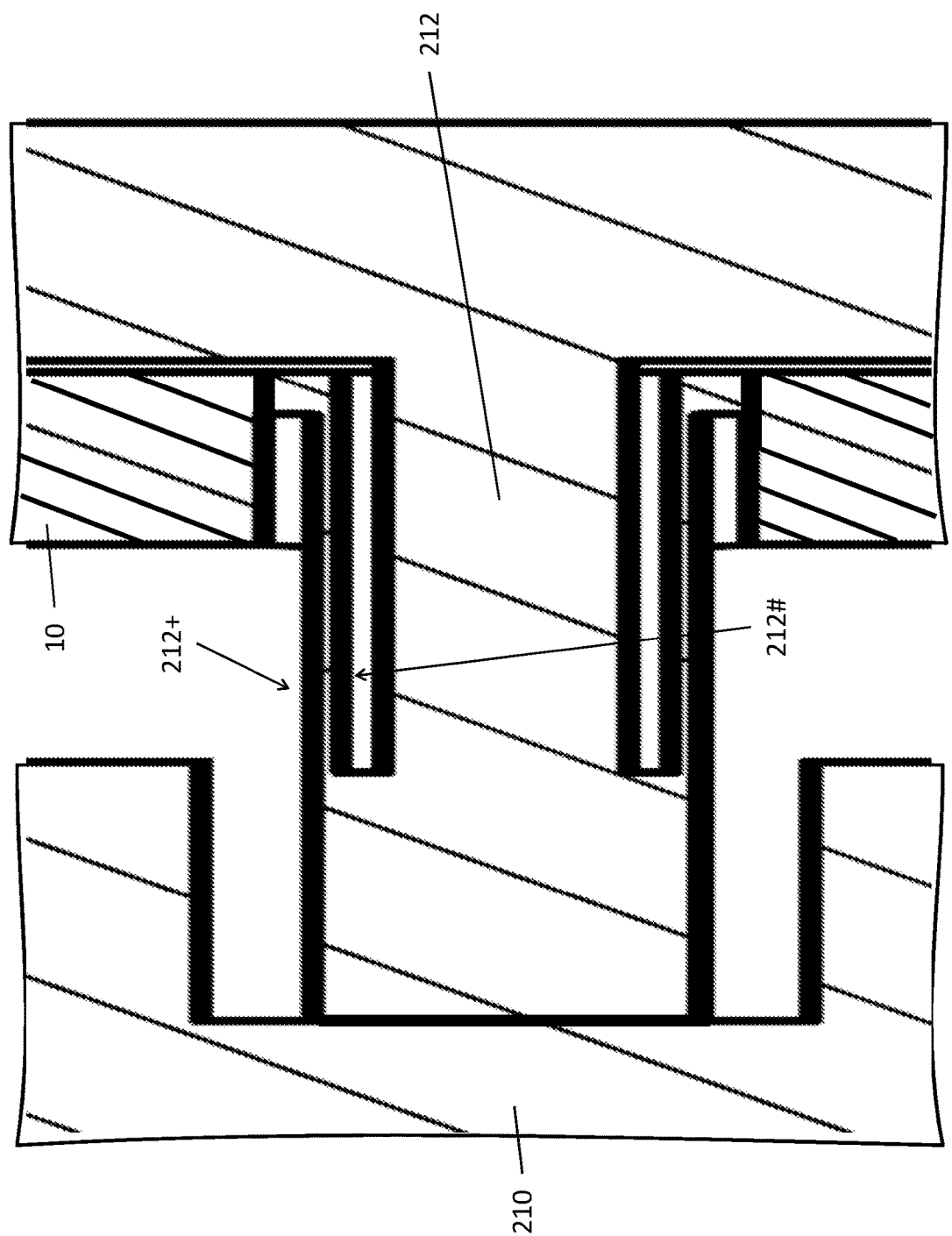
Figure 9:
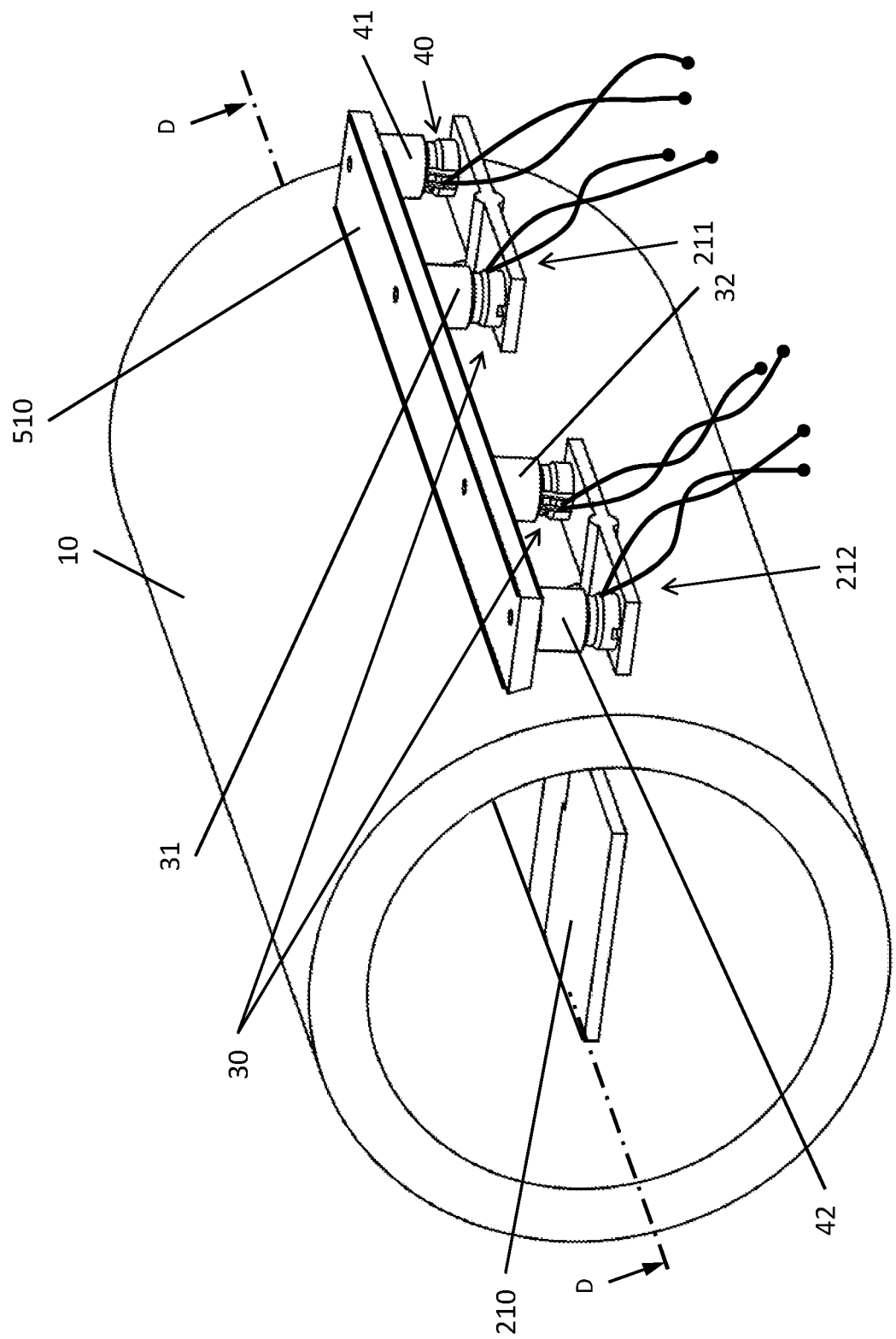
FIGS. 9-11 show schematic representations of another exemplary embodiment of a vibration-type transducer in different views that is suitable for a measuring system in accordance with the present disclosure.
Figure 10:
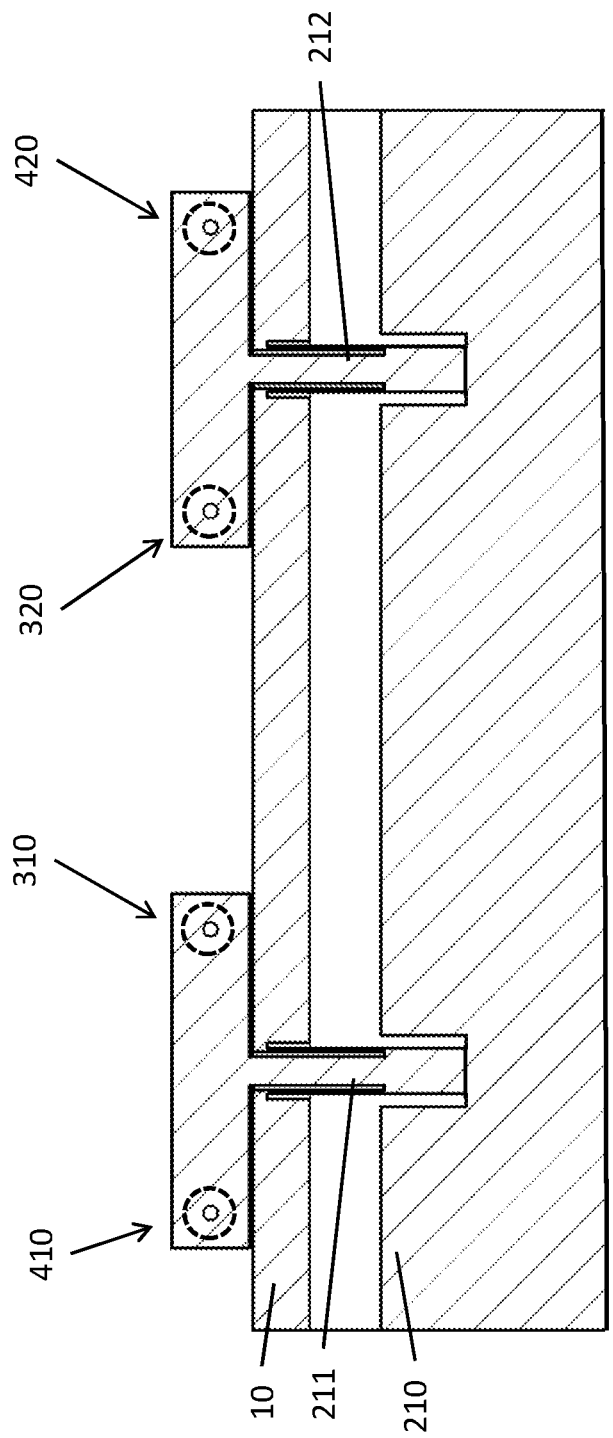
Figure 11:
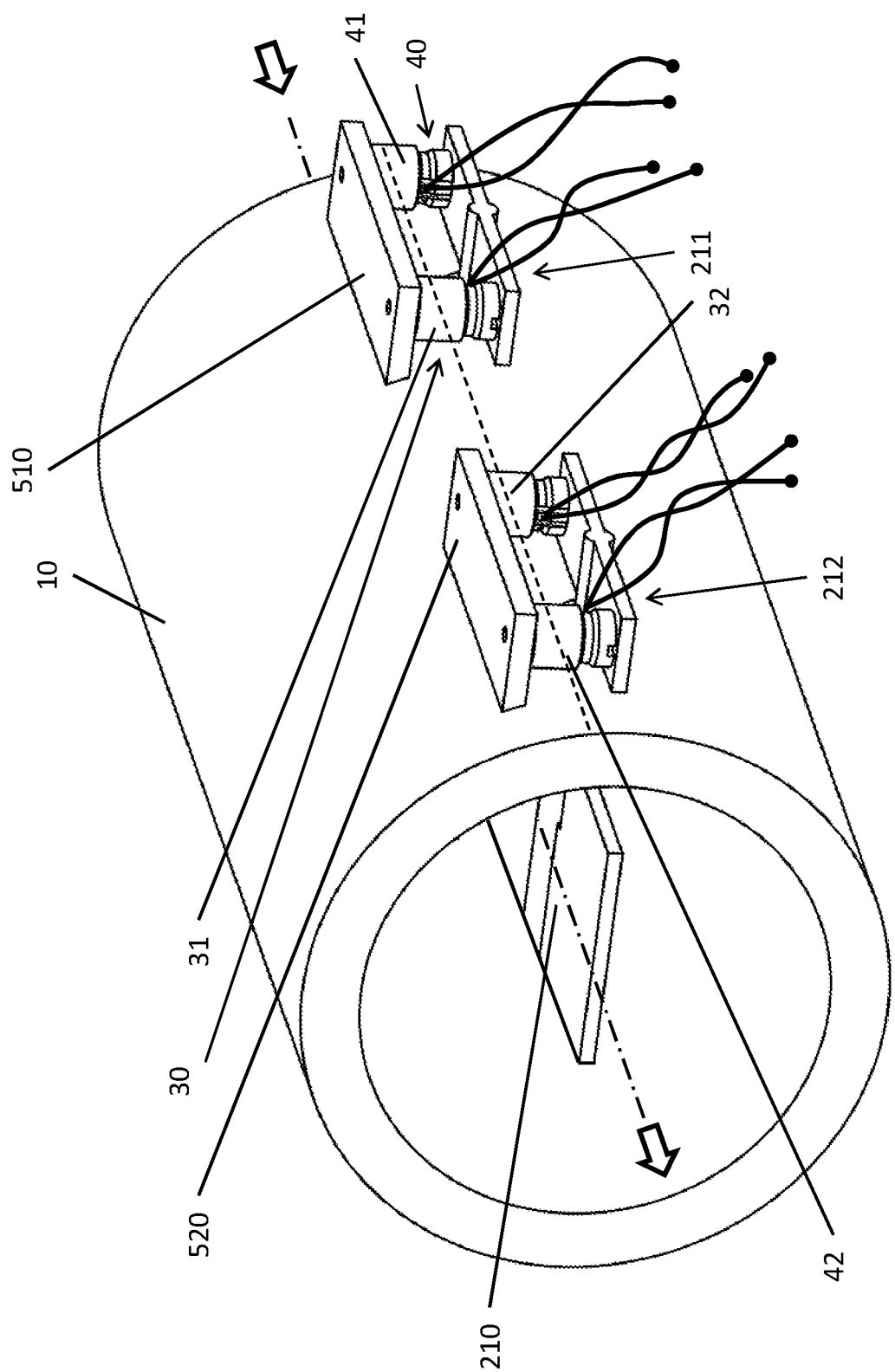

The converter unit 21 of the transducer in accordance with the invention or of the measuring system formed therewith, as shown in FIG. 3, 5, 4 or 6 or, as can be easily seen from their synopsis, is formed by means of at least one displacer element 210, a first connection element 211 and at least one second connection element 212. Each of the two connection elements 211, 212—in particular, identical in function and, possibly, in construction—is mechanically connected to the displacer element 210, namely in the direction of an imaginary longitudinal axis of the said displacer element 210 with a predetermined distance $L_{210.4}$. As is indicated in FIG. 7, the connection element 211 has a first surface 211+ and a second surface 211 # opposite thereto, for example, also at least partially parallel to the first surface 211+; as can be seen from FIG. 8, the connection element 212 also has a corresponding first surface 212+ and a second surface 212 # opposite thereto, for example, also at least partially parallel to the surface 212+. As can be readily seen in a synopsis of FIGS. 3, 5, 4 and 6, the converter unit 21 is inserted into tube 10 and mechanically connected thereto in such a way that the displacer element 210 thereof is placed inside the lumen of said tube 10 and that each of the connection elements 211, 212 is respectively placed inside the wall of the tube 10 and mechanically connected thereto; in particular, this is done in such a way that the connection element 212 is mechanically connected to the wall of the tube in the direction of an imaginary longitudinal axis $L_{10}$ of the tube and/or an imaginary envelope line of the wall of the tube at a distance from the other connection element 211 or is arranged downstream of the connection element 211 in the flow direction and/or that, as indicated in FIGS. 7 and 8 or as can be seen from the synopsis of FIGS. 4, 5, 7 and 8, a respective first surface 211+ or 212+ of each of the two connection elements 211 respectively faces the lumen of the tube 10 and a respective second surface 211 # or 212 # of each of the two connection elements 211, 212 respectively faces away from the lumen of the tube 10. The converter unit 21 and the aforementioned carrier frame 510 can also be advantageously designed and arranged in such a way that said carrier frame, as indicated in FIG. 3 or as can be seen from the synopsis of FIGS. 3 and 5, extends at least from the connection element 211 to the connection element 212 and/or runs parallel to the aforementioned longitudinal axis $L_{10}$ or to the displacer element 210. According to a further design of the invention, the vibration exciter 310 and/or the vibration sensor 410 is mechanically connected at least to the connection element 211. In addition, the aforementioned vibration sensor 420, as shown in FIGS. 3 and 5, or as can be seen from its synopsis, can be at least mechanically connected to the connection element 212. In addition, the vibration exciter 310 and/or the vibration sensor 410 and possibly the aforementioned vibration sensor 420 can also be mechanically connected to both the connection element 211 and the connection element 212. According to a further design of the invention, the exciter arrangement 40 comprises at least one second vibration exciter 320, for example electrodynamic or piezoelectric and/or structurally identical to the vibration exciter 310, for generating a (second) exciter force, which induces mechanical vibrations of the converter unit 21, for example, namely the aforementioned usable vibrations, in particular one which is time-variable and/or at least temporarily periodic. Said vibration exciter 320, as schematically illustrated in FIGS. 9 and 10, or as can be seen from the synopsis thereof, can be mechanically connected at least to the connection element 212 and/or to the aforementioned carrier frame 510. According to a further design, the transducer, as schematically shown in FIG. 11 for example, further comprises a carrier frame 520 fixed on the outside of the wall of the tube 10, aligned, for example, with the aforementioned carrier frame 510 for holding components of the sensor arrangement 40 and/or components of the exciter arrangement 30. In the event that the transducer has both the carrier frame 510 and the carrier frame 520, as shown in FIG. 11 for example, the aforementioned vibration exciter 320 and/or the aforementioned vibration sensor 420 can be mechanically connected to said carrier frame 520.

As can also be seen from FIG. 11, the carrier frame 520 can be arranged in such a way that the carrier frame 520 and the aforementioned carrier frame 510 are positioned, in particular, in an aligned or in a spaced manner along one and the same imaginary envelope line of the wall of the tube.

Figure 12:
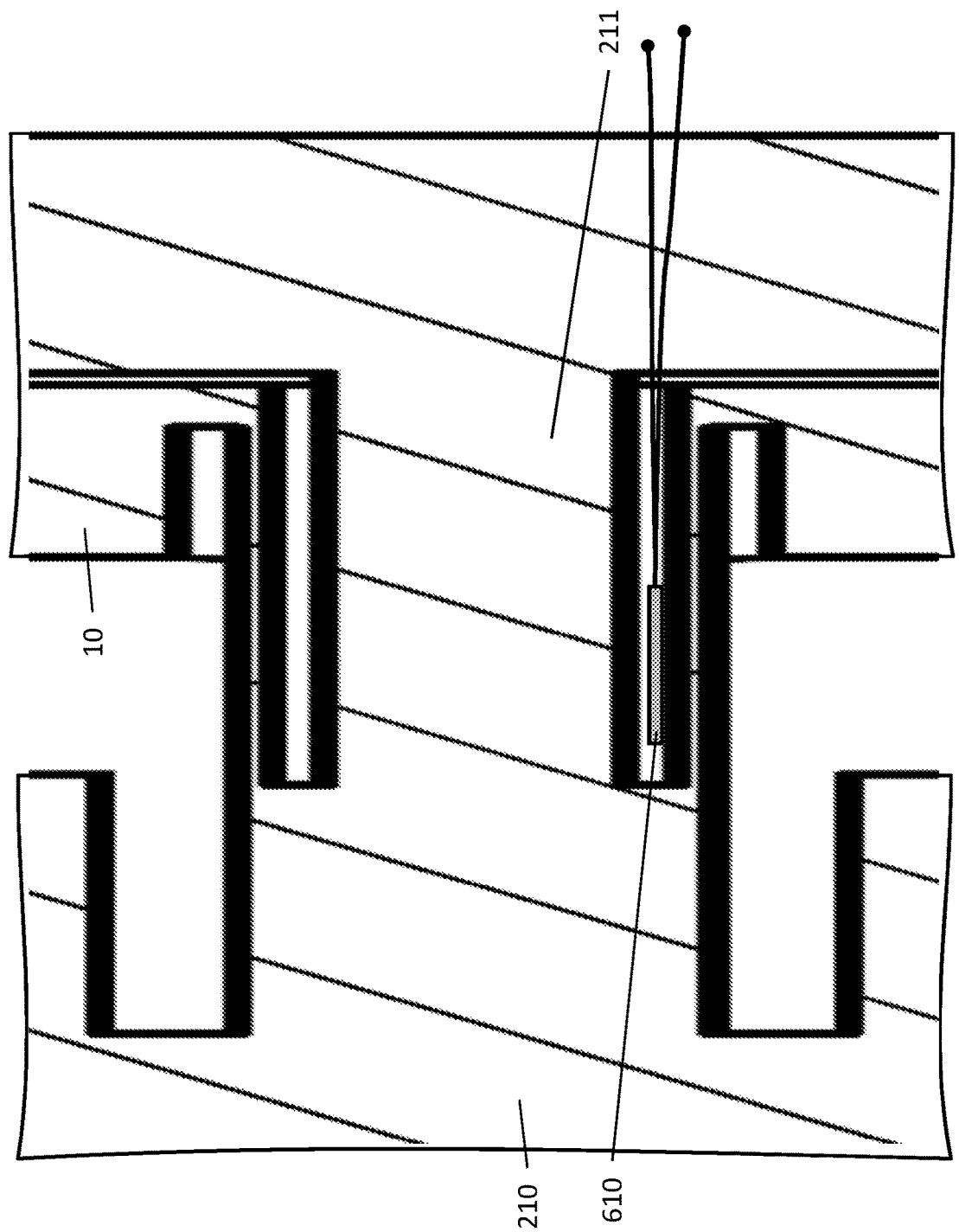
FIG. 12 shows a schematic representation of an exemplary embodiment of a connection element with a connected temperature sensor that is suitable for a transducer in accordance with the present disclosure.

In order to detect a temperature of the converter unit 21 and/or of the aforementioned fluid FL contacting said converter unit 21, or in order to generate a temperature signal θ1 representing said temperature, the transducer further comprises, according to a further design, at least one temperature sensor, which is thermally conductively coupled to the converter unit 21 and which can—as schematically represented in FIG. 12—for example, be mechanically connected to the connection element 211, and, in particular, attached to its aforementioned surface 211 #.

According to a further design of the invention, the displacer element 210 has a greatest height $h_{210}$, measured as a greatest extension of the displacer element 210 in the direction of an imaginary main axis of inertia of the displacer element 210 that is, in particular, parallel to the aforementioned imaginary main axis of inertia of the connection element 211 and/or parallel to the aforementioned main axis of inertia of the connection element 212 and/or parallel to a diameter of the tube 10, and a greatest height $h_{210}$—as indicated in FIG. 4—corresponds to less than 100%, notably less than 95%, of a caliber $D_{10}$, namely of an inner diameter of the tube 10 and/or more than 10%, notable more than 30%, of said caliber $D_{10}$. In another design of the invention, the displacer element 210 has a smallest thickness $d_{210}$, measured as a smallest extension of said displacer element in the direction of an imaginary main axis of inertia of the displacer element that is, in particular, perpendicular to the aforementioned imaginary main axis of inertia of the connection element 211 and/or perpendicular to the aforementioned imaginary main axis of inertia of the connection element 212 and/or perpendicular to the imaginary longitudinal axis of the tube 10, which smallest thickness $d_{210}$ corresponds to—as, for example, indicated in FIG. 5—less than 10%, in particular less than 5%, of a caliber $D_{10}$, namely an inner diameter of the tube 10 and/or more than 0.5%, in particular more than 1% of said caliber $D_{10}$.

Figure 6:
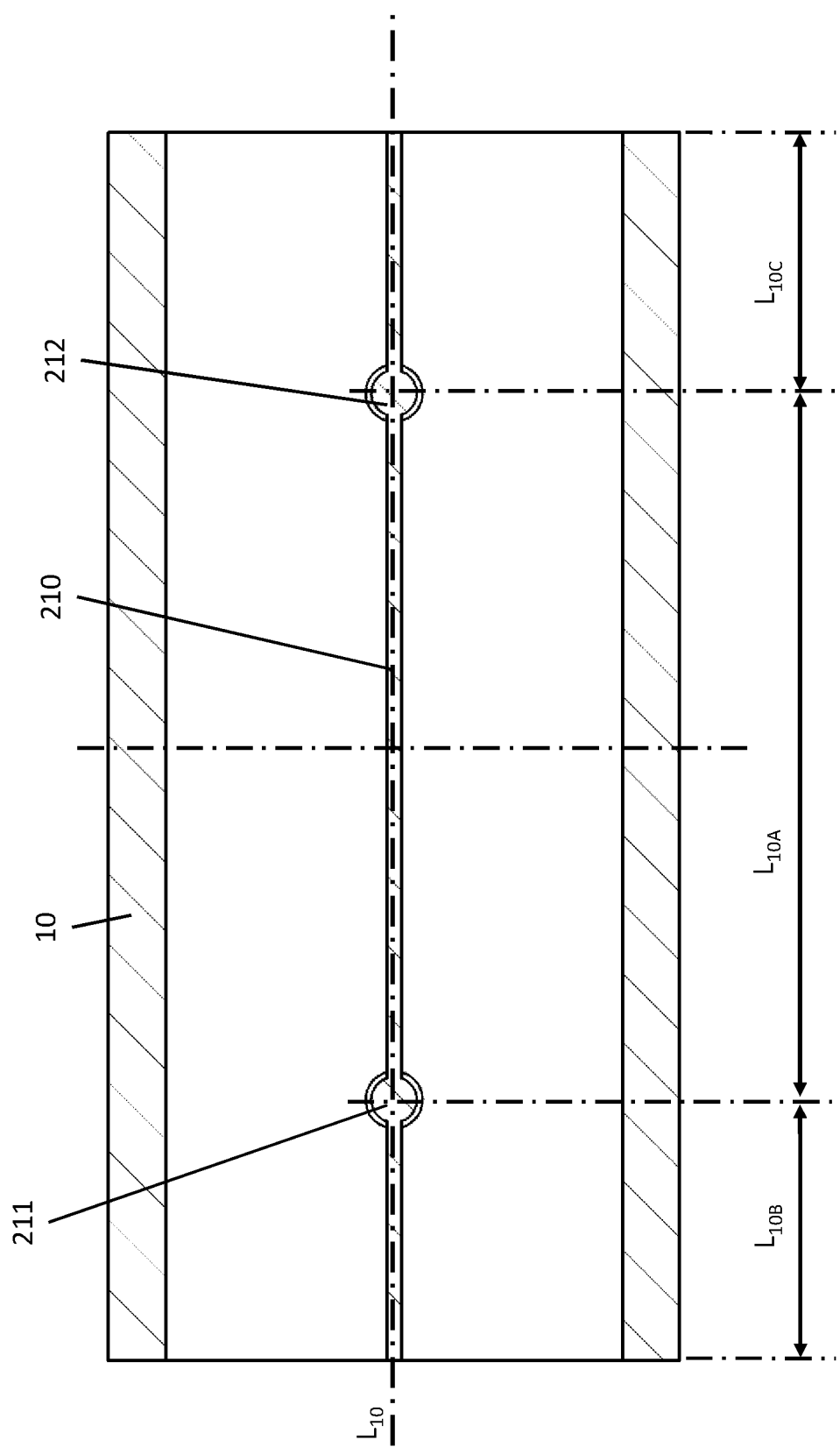

According to a further design of the invention, the displacer element 210 has a greatest length $L_{210}$, measured as a greatest extension of the displacer element 210 in the direction of an imaginary main axis of inertia of the converter unit 21 that is, in particular, perpendicular to the aforementioned imaginary main axis of inertia of the connection element 211 and/or perpendicular to the aforementioned imaginary main axis of inertia of the connection element 212 and/or parallel to the aforementioned imaginary longitudinal axis of the tube 10, which greatest length $L_{210}$—as also indicated in FIG. 4 or 6 respectively—corresponds to more than 100%, in particular more than 200%, of the aforementioned caliber $D_{10}$ of the tube 10 and/or more than 100%, in particular more than 200%, of the aforementioned greatest height $h_{210}$ of the displacer element 210; and in such a way that the greatest length L210 is no more than 10 times the caliber $D_{10}$, for example less than 6 times the caliber $D_{10}$, and/or that the displacer element 210 has a height-to-length ratio, measured as a ratio of its greatest height $h_{210}$ to its greatest length $L_{210}$, which is less than one, for example less than 0.5, and/or greater than 0.1, for example greater than 0.3. According to a further design of the invention, the displacer element 210 and the connection elements 211, 212 are configured and arranged in such a way that a smallest distance $L_{210A}$ between the connection element 211 and the connection element 212 is more than 40% of the aforementioned greatest length $L_{210}$ of the displacer element 210 and/or less than 80% of said greatest length $L_{210}$, notably 56% of the greatest length $L_{210}$. Alternatively or in addition, the displacer element 210 and the connection elements 211, 212 may also be designed and arranged in such a way that a smallest distance $L_{210B}$ between the connection element 211 and a first end of the displacer element 210—located upstream of the connection element 211—is less than 30% of the aforementioned greatest length $L_{210}$ of the displacer element 210, is more than 10% of said greatest length $L_{210}$, in particular 22% of the greatest length $L_{210}$, and/or that the smallest distance $L_{210C}$ between the connection element 212 and a second end of the displacer element 210—located downstream of the connection element 212—is less than 30% of the aforementioned greatest length $L_{210}$ of the displacer element 210, is more than 10% of said length $L_{210}$, in particular 22% of the length $L_{210}$; this is advantageous in such a way that—as is indicated in FIG. 4 or 6 respectively or for example FIG. 10—the aforementioned distance $L_{210B}$ and the aforementioned distance $L_{210C}$ are equal.

Figure 13:
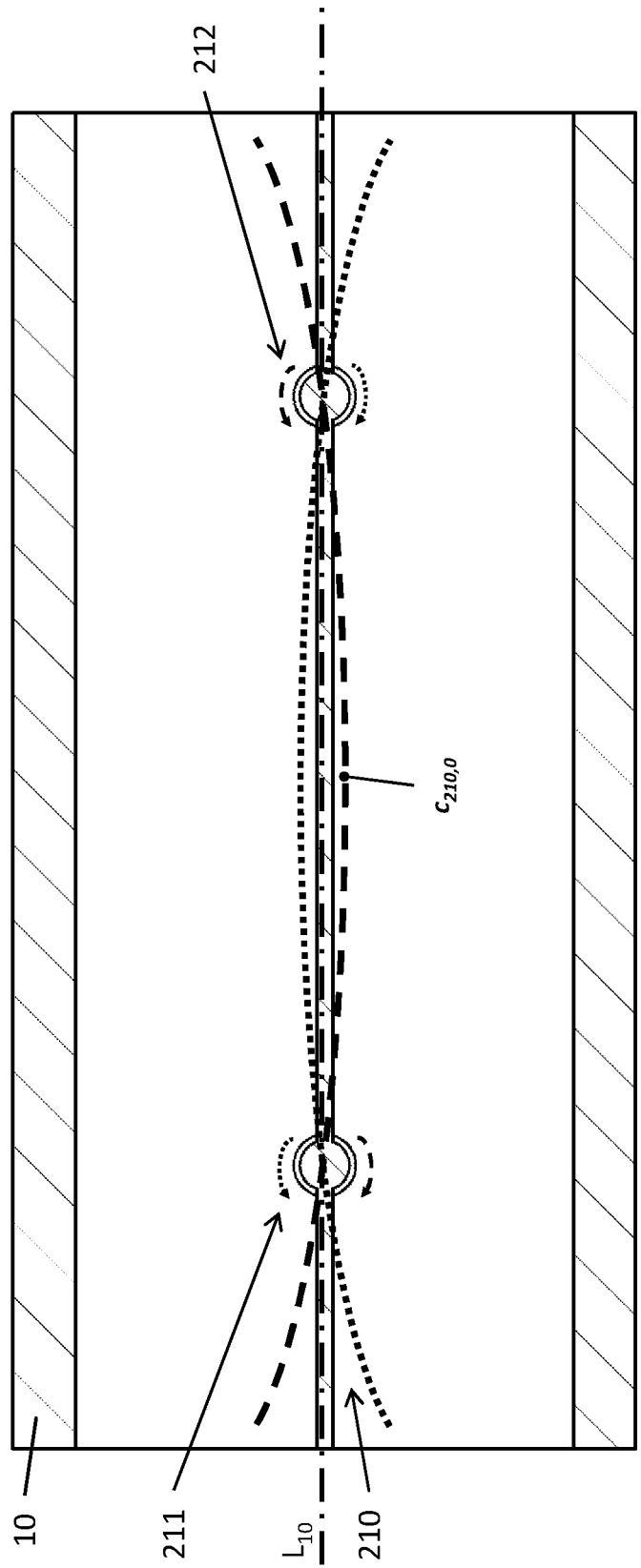
FIG. 13 shows a schematic representation of a converter unit vibrating in natural vibration mode that is suitable as a use mode of a transducer in accordance with the present disclosure.

The converter unit 21 of the transducer in accordance with the invention serves in principle as a fluid-mechanical converter which converts forces exerted on it by the flowing fluid into corresponding elastic deformations and/or its own elastic deformations into forces acting on the fluid flowing past it. In particular, the converter unit 21 is designed so as to be contacted by fluid located in the lumen of the tube and meanwhile allowed to vibrate in such a way that the displacer element 210 thereof and each of the aforementioned connection elements 211, 212 thereof—used to connect the displacer element 210 or the converter unit 21 formed therewith to the wall of the tube 10—are respectively at least proportionately elastically deformed; and in such a way as also indicated in FIG. 13 or as can be seen from a synopsis of FIGS. 4 and 13, each of the two connection elements 211, 212 is twisted at least proportionally about a respective imaginary main axis of inertia and/or that the displacer element 210 is bent out from a static rest position at least proportionately in the direction of a diameter $D_{10}$ of the tube 10 perpendicular to an imaginary main axis of inertia of the connection element 211 and/or an imaginary main axis of inertia of the connection element 212. The displacer element 210 can, as shown in FIG. 3, 5, 4 or 6, for example, be plate-shaped; but it can also, for example, be cylindrical, in particular circular and/or hollow-cylindrical, and thus also sleeve-shaped or tube-shaped. Each of the structurally identical connection elements 211, 212 serves, in turn, as a force transducer—acting in this case at a distance from and substantially perpendicular to the aforementioned main axis of inertia of connection element 211 and the aforementioned main axis of inertia of connection element 212—converting excitation forces imparted by the exciter arrangement 30 into corresponding torques or imparted torques into lateral movements and can, for example, be designed at least partly in the form of a sleeve and/or at least partly in the form of a shell and/or at least partly in the form of a circular cylinder and/or at least partly in the form of a rod. The displacer element 210 as well as the two connection elements 211, 212 can also be made of the same material and/or metal.

Figure 14:
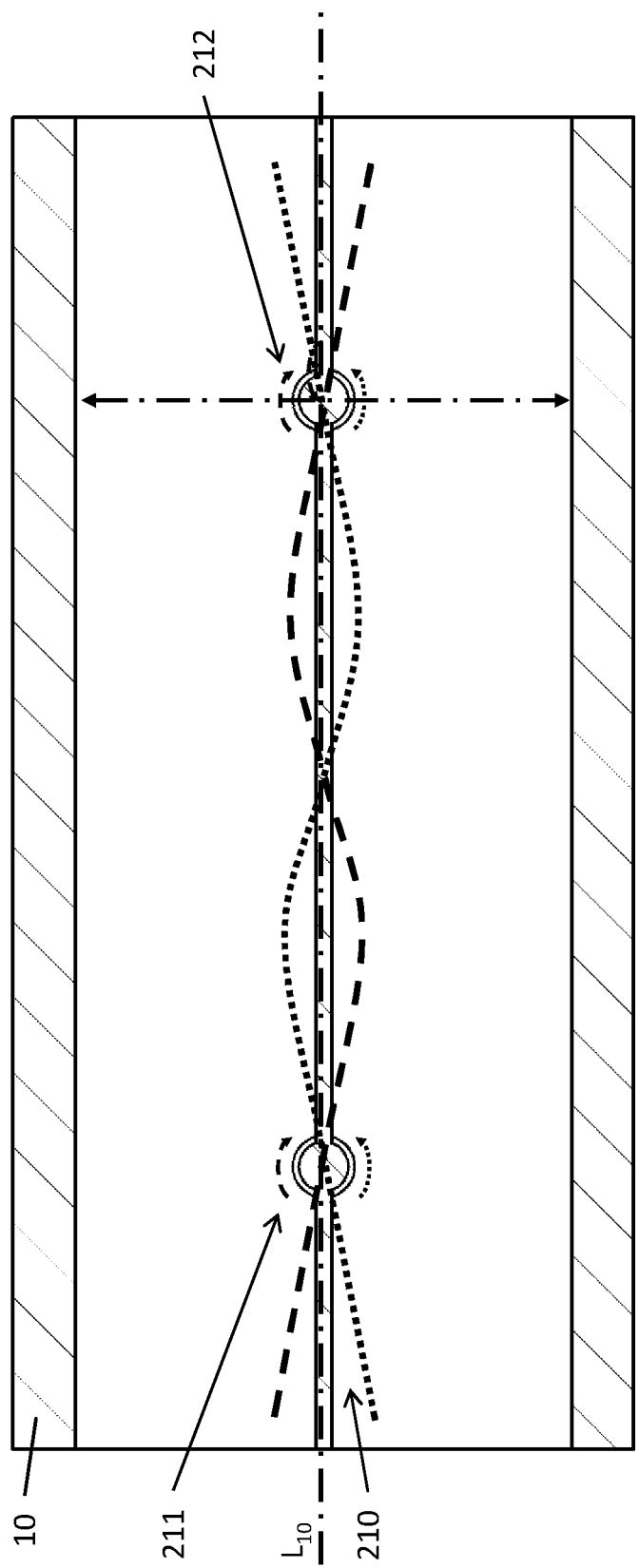
FIG. 14 shows a schematic representation of a converter unit vibrating in natural vibration mode of a transducer serving as Coriolis mode in accordance with the present disclosure.

According to a further design of the invention, the aforementioned use mode is specifically designed or selected in such a way that—as schematically shown in FIG. 13—the connection element 211 at least proportionately executes torsional vibrations about a first imaginary torsional vibration axis of the converter unit 21, which, in particular, is parallel to or coincides with an associated imaginary main axis of inertia, and the connection element 212 at least proportionately executes counter-equivalent torsional vibrations to said torsional vibrations of the connection element 211 about a second imaginary torsional vibration axis of the converter unit 21, which is, in particular, parallel to or coinciding with an associated main axis of inertia and/or is parallel to the first imaginary torsional vibration axis of converter unit 21. Furthermore, in use mode, the displacer element 210—as is schematically shown in FIG. 13—executes at least proportionately flexural vibrations, in particular coupled with the torsional vibrations of connection element 211 and/or connection element 212 and/or flexural vibrations with the same frequency about an imaginary flexural vibration axis of the converter unit 21, in particular running parallel to an associated imaginary main axis of inertia and/or in flow direction. The aforementioned usable vibrations of the converter unit 21, not least the flexural vibrations of displacer element 112 in use mode, are also suitable and serve to induce Coriolis forces in the fluid flowing through the tube dependent on its mass flow rate m. Said Coriolis forces in turn induce corresponding Coriolis vibrations, namely mechanical vibrations of the transducer superimposed on the usable vibrations and/or coupled thereto in Coriolis mode that is schematically shown in FIG. 14. In the Coriolis mode, the displacer element 21, as can also be seen from FIG. 14, executes flexural vibrations that at least proportionately deviate from its flexural vibrations in use mode, and that are, in particular, coupled with said vibrations in use mode or have a usable vibration frequency about the aforementioned imaginary flexural vibration axis of the converter unit 21 running in the flow direction. Furthermore, as also indicated in FIG. 14, in said Coriolis mode, the connection element 211 executes—at least proportionately—torsional vibrations about the aforementioned first imaginary torsional vibration axis of the converter unit 21, the torsional vibrations thereof are superimposed in use mode or they have usable vibrations coupled to flexural vibrations of the displacer element in Coriolis mode, and the connection element 212 executes—at least proportionately—torsional vibrations about the aforementioned second torsional vibration axis of the converter unit 21, the torsional vibrations thereof are superimposed in use mode or they are coupled, in particular, to the flexural vibrations of the displacer element in Coriolis mode; this in particular in such a way that, as a result, there is a phase difference $\Delta\varphi$ between the torsional vibrations of the connection element 211 with usable vibration frequency and the torsional vibrations of the connection element 212 with usable vibration frequency, which is dependent on the mass flow rate m of the fluid.

According to a further design of the invention, the sensor arrangement 40 is, as can be readily seen from the synopsis of FIGS. 3, 4, 5, 6 and 13, therefore used, in particular, for detecting mechanical vibrations of at least one of the connection elements 211, 212, hence mechanical vibrations of the connection element 211 and/or mechanical vibrations of the connection element 212, and for generating the vibration signal s1 so that said vibration signal s1 or its measuring component represent at least torsional vibrations of the connection element 211 or at least torsional vibrations of 212; this in particular in such a way that the sensor arrangement 40 detects at least the torsional vibrations of the connection element 211 having the usable vibration frequency and generates the vibration signal s1 with the measuring component representing these torsional vibrations and/or so that the sensor arrangement 40 detects at least the torsional vibrations of the connection element 212 having the usable vibration frequency and generates the vibration signal s2 with the measuring component representing these torsional vibrations, in particular in such a way that the aforementioned phase difference $\Delta\varphi$ that is dependent on the mass flow rate m of the fluid FL is formed between the measuring component of the vibration signal s1 and the measuring component of the vibration signal s2.

The converter unit 21 is a mechanical oscillator that naturally has a large number of different vibration modes with deviating normal modes and deviating natural or resonance frequencies. In particular, the converter unit 21 also has different flexural/torsional vibration modes, for example with different normal modes and different natural or resonant frequencies, in which respective flexural/torsional vibration mode the connection element 211 executes torsional vibrations about a first imaginary torsional vibration axis of the converter unit 21, in particular parallel to or coinciding with the aforementioned imaginary main axis of inertia of the connection element 211, and the connection element 212 in each case executes torsional vibrations about a second imaginary torsional vibration axis of the converter unit 21 parallel to or coinciding with the aforementioned imaginary main axis of inertia of the connection element 212 and/or parallel to the first imaginary torsional vibration axis of the converter unit 21, and in which respective flexural/torsional vibration modes the displacer element 210 respectively executes both flexural vibrations coupled to the respective torsional vibrations of the connection element 211 and flexural vibrations coupled to the respective torsional vibrations of the connection element 212 about an imaginary flexural vibration axis of the converter unit 21, in particular parallel to the aforementioned associated imaginary main axis of inertia and/or extending in the direction of flow. A flexural/torsional vibration mode having a lowest natural frequency or a lowest resonance frequency $f_0$ of all flexural/torsional vibration modes of the converter unit 21 corresponds to a basic flexural/torsional vibration mode of said converter unit 21, wherein a normal mode of said basic flexural/torsional mode or maximum deflections thereof may correspond to the form of vibration schematically illustrated in FIG. 13, and therefore said vibrations in the basic flexural/torsional vibration mode may serve as usable vibrations. Accordingly, in a similar basic flexural/torsional vibration mode, the displacer element 210 merely executes symmetrical flexural vibrations having a single vibration bulge about an associated static resting position, and the connection elements 211, 212 execute counter-equivalent torsional vibrations about the respective associated one of the aforementioned torsional vibration axes of the converter unit 21.

According to a further design of the invention, it is further provided that an total spring constant $c_{21,0}$ ($\rightarrow 2\pi \cdot f_{21,0} = \sqrt{[c_{21,0}/m_{21,0}]}$) of the converter unit 21, which determines the natural frequency $f_{21,0}$ of the basic flexural/torsional vibration, and which essentially results from a combination of the (flexural) spring constant $c_{210,0}$ of the displacer element 210 contributing to it, and the (torsion) spring constants of the connection elements 211, 212 contributing to it, is more than 10% and/or less than 50% of the aforementioned spring constant $c_{210,0}$ of the displacer element 210 ($c_{21,0} > 0.1 \cdot c_{210,0}$, $c_{21,0} < 0.5 \cdot c_{210,0}$). In the case of the transducer described in the FIG. 3, 5, 4, 6 or 13, the total spring constant $c_{21,0}$ can be taken, in a simplified form, as a connection in series of the aforementioned (individual) spring constant ($c_{210,0}$) of the displacer element 210 with a connection in parallel of the aforementioned (individual) spring constants ($c_{211,0}$; $c_{212,0}$) of the two connection elements 211, 212 and can also be calculated approximately with $c_{21,0} = c_{210,0} \cdot [c_{211,0} + c_{212,0}]/[c_{210,0} + c_{211,0} + c_{212,0}]$. The aforementioned (single-) spring constants ($c_{210,0}$; $c_{211,0}$; $c_{212,0}$) are in turn determined by the respective geometric dimensions of the displacer element 210 or the displacer element 211, 211 and the modulus of elasticity resulting from the respective material $E_{210}$, $E_{211}$, $E_{212}$ and/or shear modulus $G_{210}$, $G_{211}$, $G_{212}$. In addition, the aforementioned spring constants and/or natural and resonant frequencies can also be calculated numerically with high precision and computer-based accuracy, for example using established finite element methods (FEM). In the same way, a total mass $m_{21,0}$ determining the aforementioned natural frequency $f_{21,0}$ of the basic flexural/torsional vibration mode can also be determined according to the converter unit 21, for example, determined or measured by computer.

According to a further development of the invention, it is provided that the aforementioned basic flexural/torsional vibration mode of the converter unit 21 also serves as a use mode or that the use mode—completely or at least proportionately—corresponds to said basic flexural/torsional vibration mode. Accordingly, the exciter arrangement 30, according to a further design of the invention, is arranged to excite and/or maintain the usable vibrations with a vibration frequency corresponding to an instantaneous resonance frequency of the basic flexural/torsional vibration mode of the converter unit 21 or deviating therefrom by less than 2 Hz, or to excite and/or sustain said basic flexural/torsional vibration mode, in particular with its aforementioned instantaneous resonance frequency. Not least in the aforementioned case, in which the basic flexural/torsional vibration mode of the converter unit 21 serves as the use mode, the converter unit 21 can also be advantageously designed in such a way that the natural frequency $f_{21,0}$ of these basic flexural/torsional vibration modes, thus the usable vibration frequency $f_{exc}$ is not less than 100 Hz and/or not more than 1000 Hz.

Figure 15:
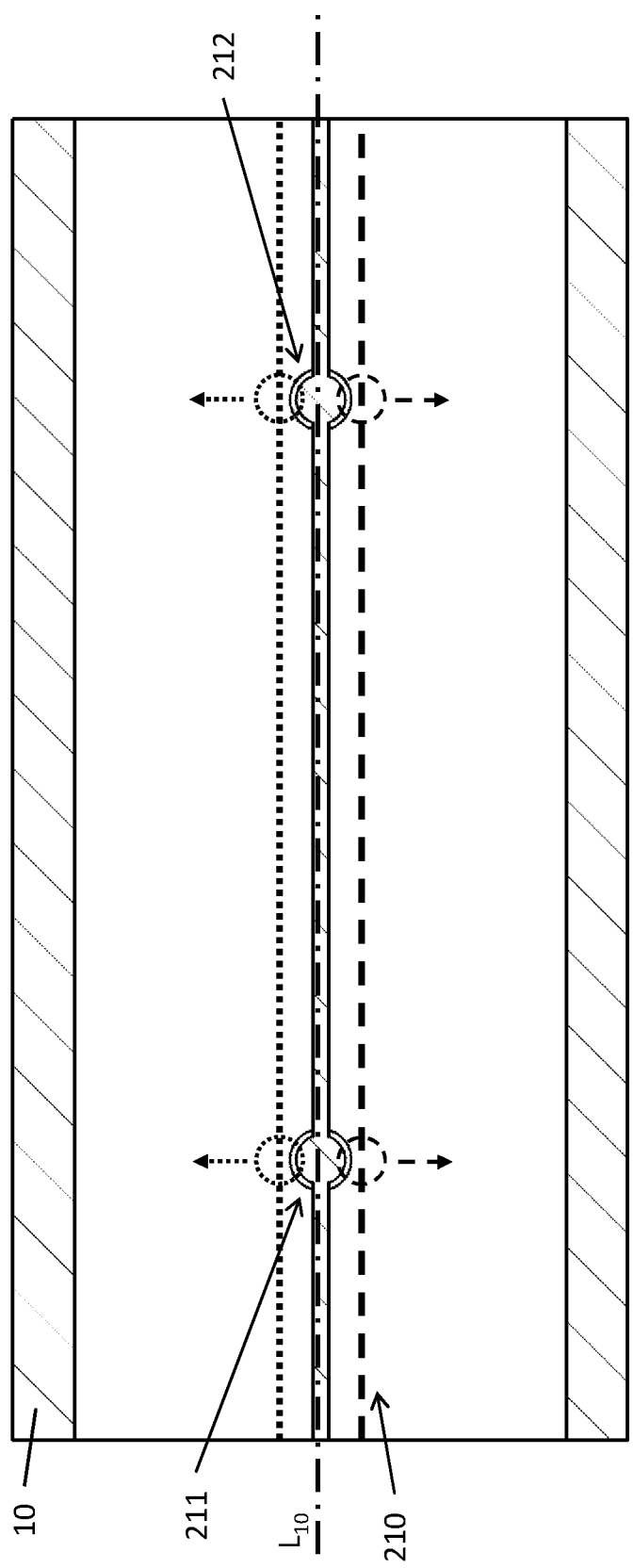
FIG. 15 shows a schematic representation of a suspension mode inherent in the converter unit of a transducer in accordance with the present disclosure.

In addition to the aforementioned flexural/torsional vibration modes, the converter unit 21 naturally has a large number of other vibration modes, each of which has a normal mode deviating from the normal modes of the flexural/torsional vibration modes and natural or resonant frequencies deviating from the natural or resonant frequencies of the flexural/torsional vibration modes. In particular, the converter unit 21 may also have different inherent suspension modes, for example with different modular forms and different natural or resonant frequencies. Each of the aforementioned suspension vibration modes is characterized in that in each case the connection element 211 executes flexural vibrations about a first imaginary flexural vibration axis of the converter unit 21, which is perpendicular to the aforementioned first imaginary torsional vibration axis of the converter unit 21, and the connection element 212 in each case executes flexural vibrations about a second imaginary flexural vibration axis perpendicular to the aforementioned second imaginary torsional vibration axis of the converter unit 21, and in that the displacer element 210 oscillates in each case about a static rest position, in particular is displaced from said rest position and/or is rotated or pivoted about said rest position. In particular, the converter unit 21 also has a basic suspension mode, namely a suspension vibration mode having the lowest resonance frequency of all suspension vibration modes of the converter unit 21, of which FIG. 15 schematically shows a normal mode or maximum deflections. Not least in the aforementioned case, in which the aforementioned basic flexural/torsional vibration mode of the converter unit 21 serves as the use mode, the natural frequency of the aforementioned basic suspension vibration modes of the converter unit 21 is set higher than the natural frequency of the aforementioned basic flexural/torsional vibration modes of the converter unit 21 according to a further design of the invention, in order to avoid undesired disturbances of the usable vibrations; in particular in such a way that the natural frequency of the basic suspension vibration mode is more than 110% of the natural frequency of the basic flexural/torsional vibration mode and/or is more than 10 Hz greater than the natural frequency of the basic flexural/torsional vibration mode. A respective (flexural) spring constant of each of the connection elements 211, 212, determining the natural frequency of the basic suspension vibration mode, as well as a corresponding total mass of the converter unit 21, can be calculated in advance on the basis of the geometric dimensions of converter unit 21, for example, determined by computer.

Also, the displacer element 210 itself has a plurality of natural vibration modes, not least also vibration modes that each have at least two line-like node surfaces and/or node surfaces embodied as a node line. In particular, the displacer element 210 may also include at least one such natural vibration mode, which has a first nodal surface—for example, linear and/or formed as a nodal line—and at least one second nodal surface at a distance from the first nodal surface—for example, also parallel thereto and/or line-like and/or formed as a nodal line. According to a further design, the connection element 211 and the displacer element 210 are further arranged and connected to each other in such a way that an imaginary main axis of inertia of said connection element 211 and the aforementioned first nodal surface are aligned with each other, for example coincide with each other in an imaginary extension and/or the connection element 212 and the displacer element 210 are arranged and connected to one another in such a way that an imaginary main axis of inertia of the same connection element 212 and the second nodal surface are aligned with one another, for example coincide with one another in an imaginary extension. In an advantageous way, the aforementioned first and second nodal surfaces selected for the positioning of the connection elements 211, 212 can be, for example, nodal surfaces of such a natural vibration mode of displacer element 210, in particular a flexural vibration mode of displacer element 210, in which the displacer element 210 executes such vibration movements that only have a single vibration bulge between the two aforementioned nodal surfaces. It is particularly advantageous, if these first and second nodal surfaces can also be—as schematically shown in FIG. 13—the nodal surfaces of a basic flexural vibration mode of displacer element 210, which has only these two nodal surfaces and does therefore have no other nodal surfaces and/or is symmetrical. In the case mentioned above, where the displacer element 210 is essentially plate-shaped, the first nodal surface—as shown in FIG. 13 or in a synopsis of FIGS. 6 and 13—is approximately in the range of 22% of the aforementioned greatest length $L_{210}$ of the displacer element 210 and is and the second nodal surface—as shown in FIG. 13 or in a synopsis of FIGS. 6 and 13—then lies in the range of 78% of said length $L_{210}$ or a distance between the first and second nodal surface is about 56% of said length $L2_{10}$. Accordingly, in a displacer element 210 formed in this way having a greatest length $L_{210}$ of 250 mm (millimeter), a greatest height $h_{210}$ of 80 mm and a greatest thickness $d_{210}$ of 2.4 mm and being suitable for a tube 10 with a caliber of, for example, about 100 mm, said nodal lines are at a distance from one another of approximately 140 mm, wherein, in the aforementioned event that the displacer element 210 is made of steel, the natural frequency of the basic flexural vibration mode is approximately 200 Hz.

Figure 16A:
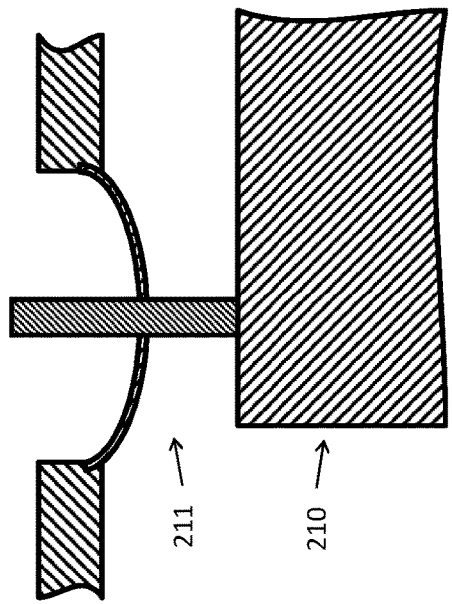
FIGS. 16a-16d, 17 and 18 show schematic representations of exemplary embodiments of connection elements that are suitable for a transducer in accordance with the present disclosure.
Figure 16B:
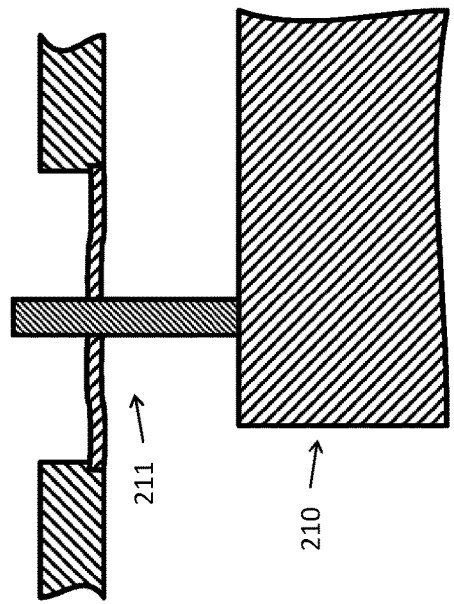
Figure 16C:
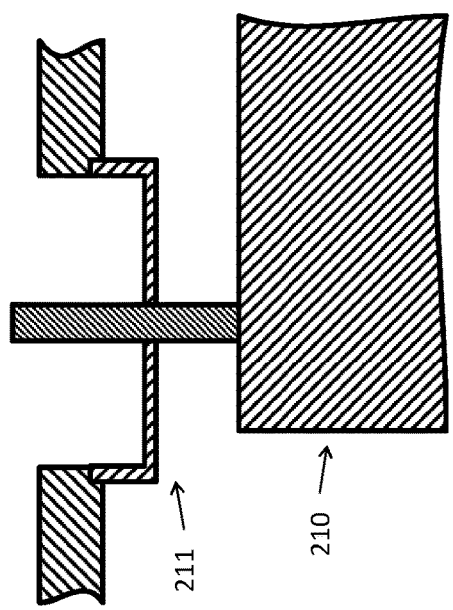
Figure 16D:
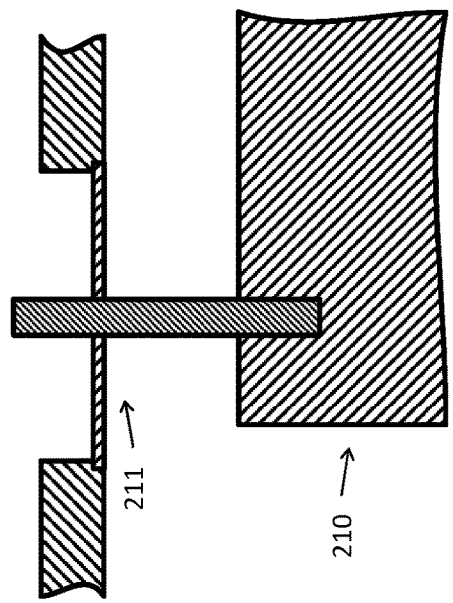

In order to seal the lumen or the wall of the tube 10 against fluid and also sufficiently against pressure from outside by means of the connection elements of the converter unit 21, on the one hand, and to enable a (torsionally) soft coupling of the displacer element 210 to the—comparatively rigid—wall of the tube by means of the connection elements, on the other, the connection element 211 and/or the connection element 212 are, according to a further design of the invention, at least partially cylindrical, namely partially hollow-cylindrical in shape as can be seen, for example, in a synopsis of FIGS. 4, 5, 6 and 7; however, the connection elements of the converter unit can also have other shapes, for example—as schematically shown in FIG. 16a and FIG. 16b—they can be partially shell-shaped or spherical, and/or—as schematically shown in FIG. 16c and FIG. 16d—they can be partially disc-shaped or circular or annular disk-shaped. Furthermore, the converter unit 21 can advantageously be formed in such a way that the aforementioned imaginary main axis of inertia of the connection element 211 and the aforementioned imaginary main axis of inertia of the connection element 212 are parallel to one another. As an alternative or in addition, the converter unit, as shown in FIGS. 4, 5 and 6 or readily apparent from their synopsis, can also be axially or mirror-symmetrically embodied at least with respect to an associated imaginary main axis of inertia, for example also parallel to the aforementioned imaginary main axis of inertia of the connection element 211 and/or to the aforementioned imaginary main axis of inertia of the connection element 212. According to a further design of the invention, it is further provided that the displacer element 210 and/or connection element 211 and/or the connection element 212 consist, in particular, at least proportionately, predominantly or completely of metal, for example stainless steel or a nickel-based alloy. Alternatively or in addition, the connection element 211 and the displacer element 210 and/or the connection element 211 and the displacer element 210 and/or the connection element 211 and the connection element 212 can consist of the same material, for example the same metal. Not least in the aforementioned case, in which the displacer element 210 and the connection elements 211, 212 are metallic, they can be connected to one another, for example, by means of welding or soldering connections. Alternatively or in addition, it is further provided that the converter unit, in particular its connection element 211 and/or its connection element 212, is manufactured at least partly by means of an additive manufacturing process, for example, a free space process and/or a powder bed process. As manufacturing methods, selective laser melting (SLM), selective laser sintering (SLS) and/or electron beam melting (EBM) can be used for this purpose.

Figure 17:
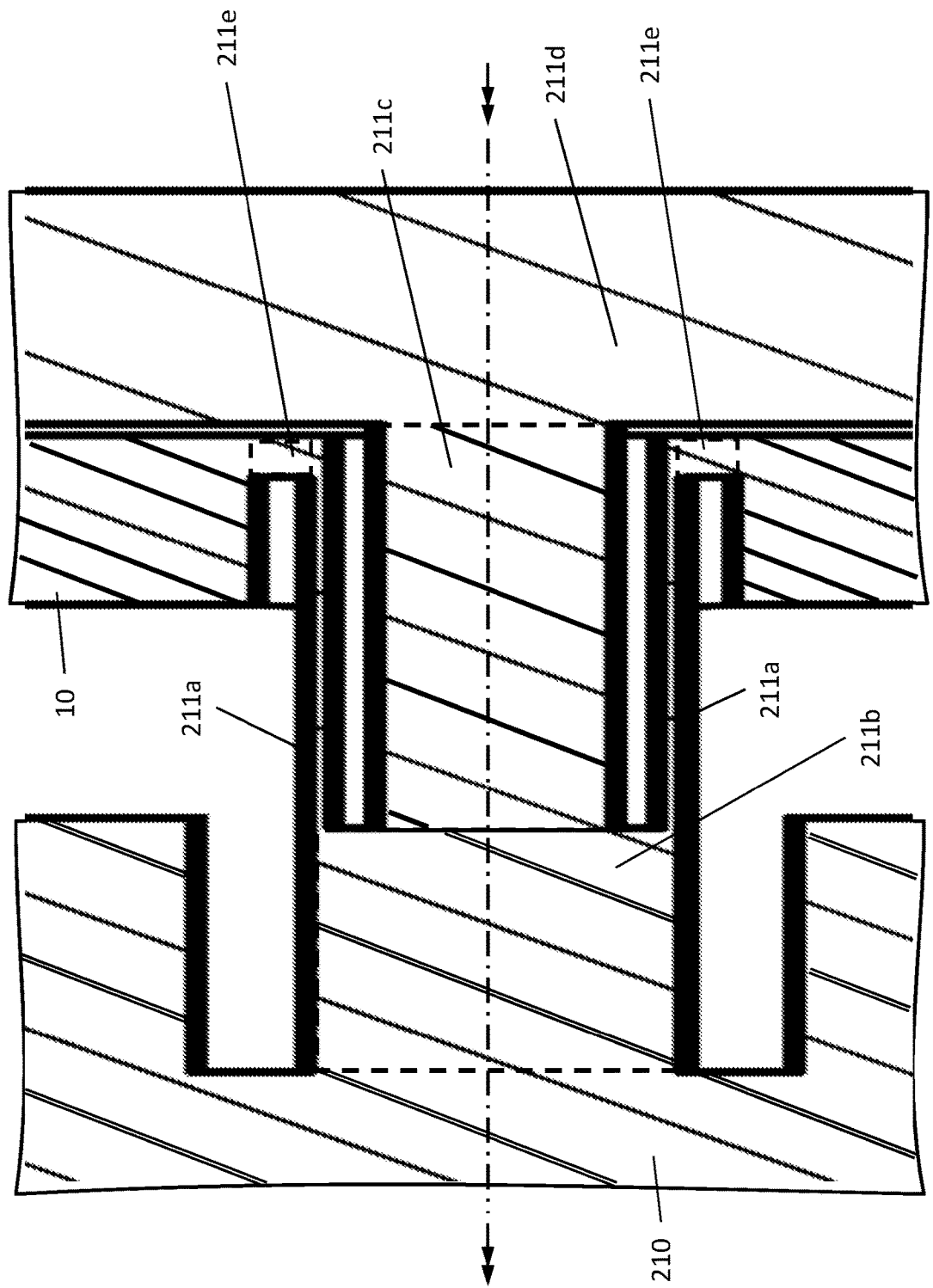
Figure 18:
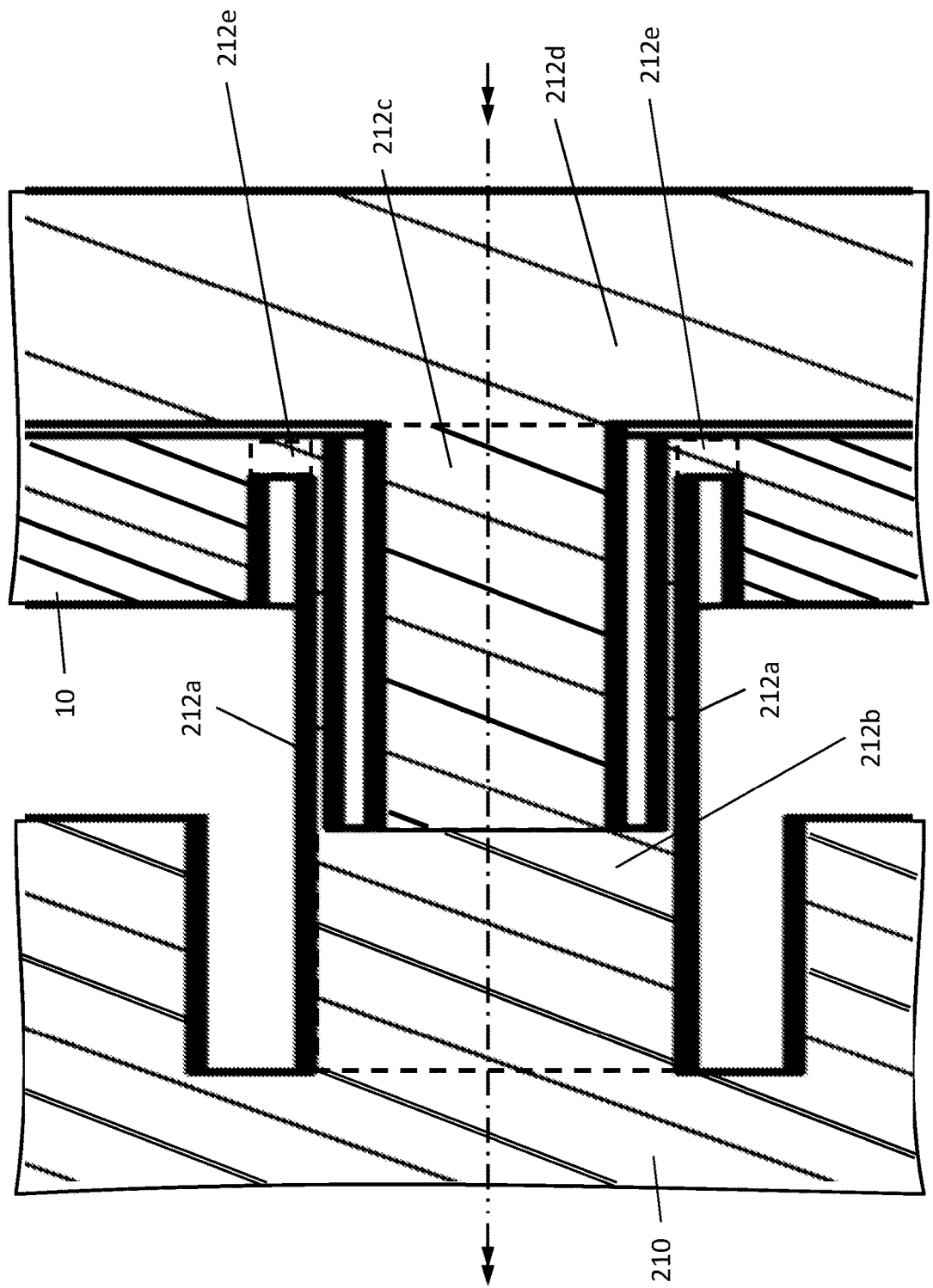
Figure 19:
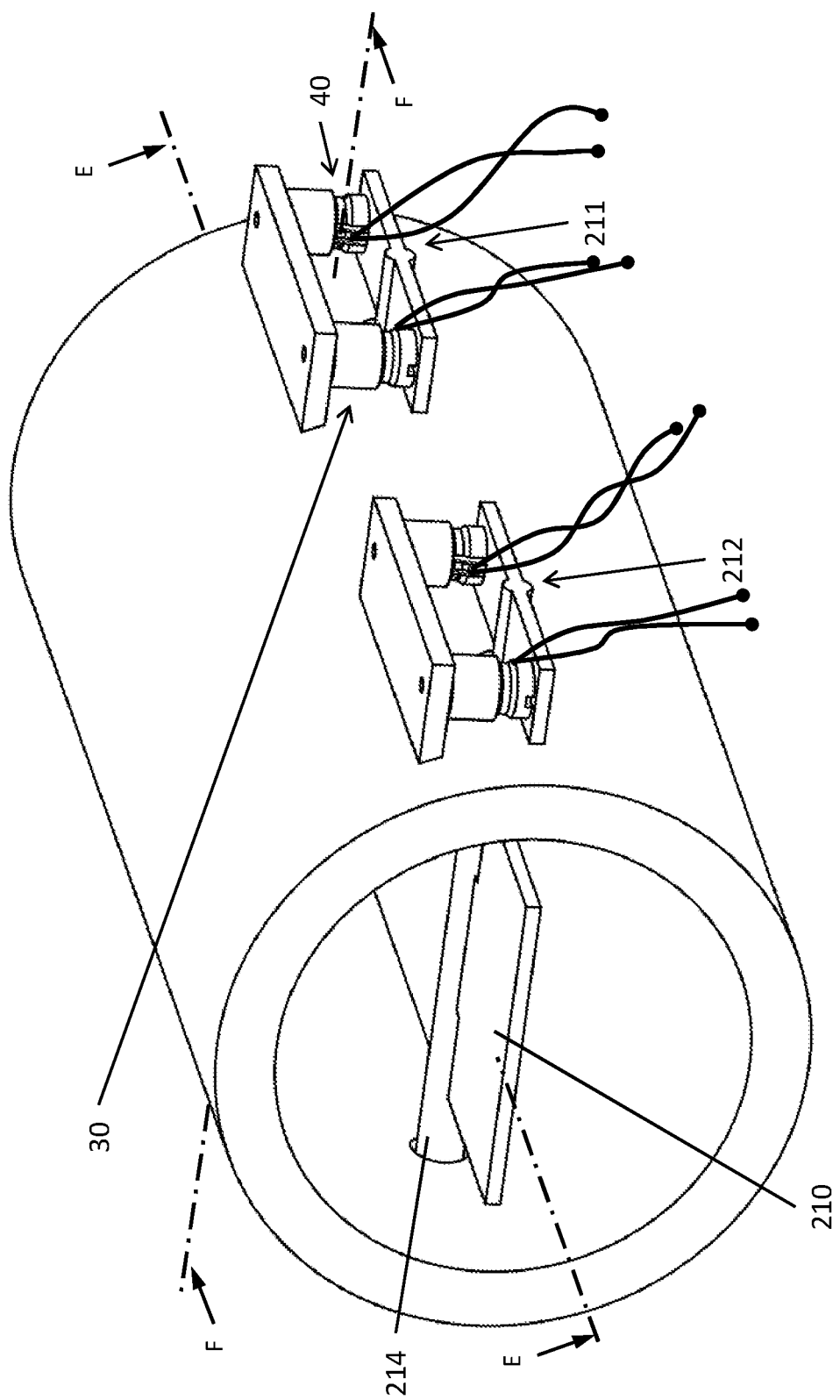
FIGS. 19-24 show schematic representations of various views of another exemplary embodiment of a vibration-type transducer suitable for a measuring system in accordance with the present disclosure.
Figure 20:
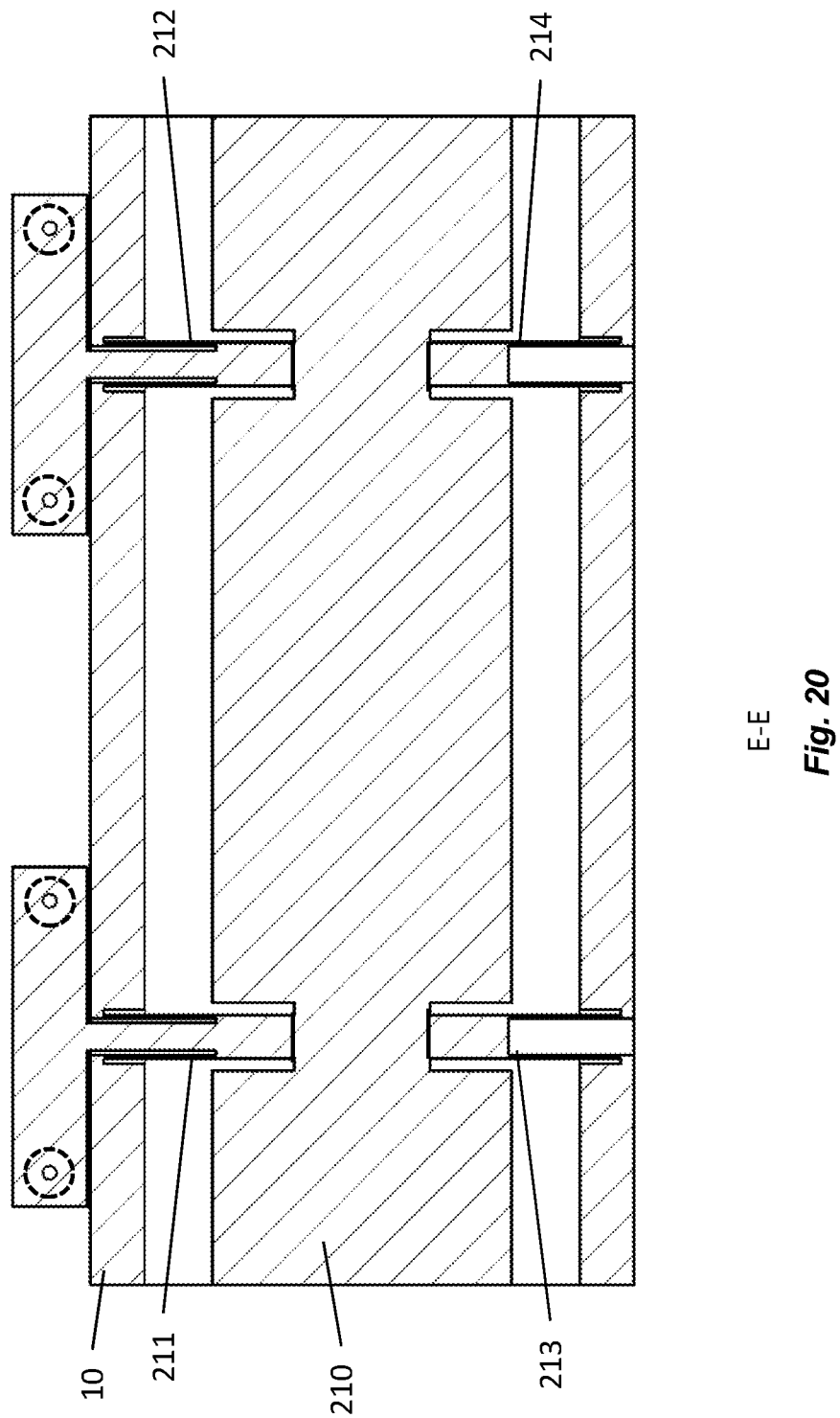

According to a further design of the invention, the connection element 211, as also indicated in FIG. 17, has a first subsegment 210a, which in particular forms its aforementioned first surface 211+ as well as the aforementioned second surface 211 # opposite thereto and/or is rotationally symmetrical with respect to a respective main axis of inertia. Said subsegment 211a can, as can be seen, for example, from a synopsis of FIGS. 4, 5, 6 and 17, advantageously be at least partially hollow-cylindrical or at least partially tube-shaped or sleeve-shaped, for example in such a way that a wall thickness of said subsegment 211a is less than 2 mm and/or is smaller than the wall thickness of the wall of the tube 10; alternatively or in addition, it can also be at least partially shell-shaped and/or at least partially disk-shaped. The subsegment 210a is in particular provided or configured to be at least partially elastically deformed, in particular to be twisted about an associated imaginary main axis of inertia parallel to or coincident with the first imaginary torsional vibration axis of the converter unit 21; in particular in such a way that in the case of converter unit 21 vibrating in use mode, said subsegment 210a—used here as a torsion spring that is therefore referred to here as torque-transmitting and occasionally as a torsion bar—makes a maximum contribution to twisting the connection element 211 about the first imaginary torsion vibration axis of the converter unit 21 compared with other subsegments of the connection element 211 and in the case of converter unit 21 vibrating in use mode, it has the largest torsion angle of all subsegments of the connection element 211. The connection element 211 is advantageously also arranged in such a way that the aforementioned imaginary main axis of inertia of the subsegment 211a runs parallel to the aforementioned first imaginary torsional vibration axis of the converter unit 21 or coincides therewith. In addition, the subsegment 211a can also serve, for example, as a bending spring, which allows bending forces and/or moments to be absorbed or lateral displacements of the displacer element 210 from an associated static rest position and counteracts these lateral displacements and/or limits them in regard to an amplitude. The spring constants effective by means of the torsion spring or the bending spring formed by the subsegment 211a can be determined by means of the modulus of elasticity or shear modulus of the material used for the subsegment 211a as well as the geometry of the subsegment 211a, in particular namely a length of the subsegment 211a, a shaping of the cross-section of the subsegment 211a defining the aforementioned main axis of inertia or the aforementioned wall thickness, are precisely determined, for example, calculated by means of Finite Element Method (FEM) computer based, or are adapted by their selection to the requirements to be fulfilled by the converter unit. Not least in the case described above, in which the connection element 212 is constructed in the same way as the connection element 211, said element 212, as schematically shown in FIG. 18, can also have a first subsegment 212a, which in particular forms its aforementioned surfaces 212+, 212 # in each case at least proportionately and/or serves as a torsion spring and/or is at least partially sleeve-shaped and/or at least partially shell-shaped and/or at least partially disk-shaped and/or at least partially hollow-cylindrical and/or identical in construction to subsegment 211a.

The connection element 211, as also shown in FIG. 17, has further a second subsegment 211b, which, in particular, forms its aforementioned surface 211+ at least proportionately, and which extends from a first end adjoining the subsegment 211a to a second end remote therefrom and adjoining the displacer element 210, for example being rotationally symmetrical relative to an associated main axis of inertia and/or cylindrical, in particular namely at least partially circular-cylindrical and/or rod shaped or bar shaped. Said subsegment 211b and the displacer element 210 can be connected with each other by means of material bonding, e.g. welded or soldered together.

As can be seen from a synopsis of FIGS. 5, 4, 6 and 17, the second end of subsegment 211b is also connected to a first end of subsegment 211a, in particular by a material bonding; in particular in such a way that said subsegment 211a—in this case hollow cylindrical or sleeve-shaped—is also sealed in a fluid-tight manner at its first end by subsegment 211b. Subsegment 211b is designed to transmit a rotational movement of a first subsegment of the displacer element 210 adjoining the second end of connection element 211—in this case the second end of subsegment 211b—about the aforementioned first imaginary torsional vibration axis of the converter unit 21 to subsegment 211a, in particular to convert said rotational movement of the first subsegment of the displacer element 210 into a twisting of subsegment 211a of the first connection element about the aforementioned first imaginary torsional vibration axis. Accordingly, as also indicated in FIG. 18, the connection element 212 may have a second subsegment 212b, which, in particular, forms its aforementioned surface 212+ at least proportionately, and which extends from a first end adjoining the subsegment 212a to a second end remote therefrom and adjoining the displacer element 210, that is cylindrical, for example, at least partially circular-cylindrical and/or rod-shaped and/or is structurally identical to subsegment 211b.

Furthermore, the connection element 211 has a third subsegment 211c in particular at least proportionately forming its aforementioned second surface 211 #, and extending from a first end adjoining the subsegment 211b, in particular its first end—in this case through the at least partially hollow-cylindrical subsegment 211a and further through the wall of the tube—to a second end remote from said first end—in this case located outside the tube. The said subsegment 211c is in particular provided or configured to guide a rotational movement of subsegment 211b about an associated imaginary main axis of inertia, in particular parallel to or coincident with the first imaginary torsional vibration axis, to the outside of the tube, in particular to the sensor arrangement and/or to convert a torque introduced from outside the tube into a rotary movement of the subsegment 211b or to transmit a rotary movement of said subsegment 211c caused by the exciter arrangement 40 about the aforementioned associated imaginary main axis of inertia to subsegment 211b. Subsegment 211c can, for example, be rotationally symmetrical and/or cylindrical with respect to an associated main axis of inertia, in particular at least partially circular-cylindrical and/or rod-shaped. As can readily be seen from a synopsis of FIGS. 5, 4, 6 and 17, at least subsegment 211a and subsegment 211c can also be arranged coaxially in an advantageous way. Subsegments 211b and 211c may be joined together by being firmly bonded by soldering or welding, for example; however, these two subsegments 211b, 211c may also be components of one and the same monolithic molded part, for example, in particular produced by an additive manufacturing process and/or involving at least sub-segment 211a. Similarly, the connection element 212—as indicated in FIG. 18—can also have a third segment 212c, which at least proportionately forms in particular its aforementioned surface 212 # extending from a first end adjoining the aforementioned subsegment 212b, in particular its first end, to a second end remote therefrom, and which is cylindrical, in particular at least partially circular-cylindrical and/or rod-shaped and/or structurally identical to subsegment 211c.

According to a further design of the invention, the connection element 211 also comprises a fourth subsegment 211d, which in particular forms a lever arm or serves as a force transducer, and which adjoins subsegment 211c of the connection element 211, in particular its second end, or which is connected to it, in particular by material bonding. In addition, the subsegment 211d, that is in particular at least partially rod-shaped and/or at least partially plate-shaped, is positioned outside the tube 10 as shown in FIG. 17 or, for example, as can be seen from a synopsis of FIGS. 5 and 17, in particular extending at least in sections parallel to the wall of the tube 10. Said subsegment 211d can, for example, be joined to subsegment 211c by being firmly bonded by soldering or welding, for example; however, the two subsegments 211c and 211d can, for example, also be components of one and the same monolithic molded part produced, in particular, by an additive manufacturing process and/or involving the aforementioned subsegment 211b and, if applicable, also the aforementioned subsegment 211a. According to a further design of the invention, the connection element 212 also has a fourth subsegment 212d which adjoins the aforementioned subsegment 212c, and in particular its second end, and is positioned outside the tube 10, and in particular extends at least in sections parallel to the wall of the tube. Said subsegment 212d may also be provided to form a lever arm or may also be at least partially rod-shaped and/or plate-shaped or identical in construction to subsegment 211e. Furthermore, at least said subsegment 212d and the aforementioned subsegment 211d, as indicated in FIGS. 3 and 5 and as can be seen from a synopsis of FIGS. 3, 5, 8, 17 and 18, can be components of one and the same monolithic molding.

According to a further design, it is further provided that the connection element 211 also has an annular disk-shaped fifth subsegment 211e, extending from a first edge adjoining the subsegment 211a, in particular its second end remote from the subsegment 211b, to a second edge remote from it and adjoining the tube wall 10, and in particular forming both the aforementioned first surface 211+ and the aforementioned second surface 211 # in each case at least proportionately. Said subsegment 211e can, for example, be joined to subsegment 210a by being firmly bonded by soldering or welding; the two subsegments 211a and 211e can, for example, also be components of one and the same monolithic molded part produced, in particular, by an additive manufacturing process and/or involving the aforementioned subsegment 211b and, if applicable, also the aforementioned subsegment 211c and 211d. Similarly, the connection element 212 may have an annular disk-shaped fifth subsegment 212e, which, in particular, at least proportionately forms at least its aforementioned surface 212+ and surface 212 #, and which extends, namely, from the first edge adjoining the first end of the first subsegment 212a to a second edge adjoining the wall of the tube and that is remote from the first edge.

The aforementioned subsegment 211b of the first connection element 211 is further provided or configured for transmitting a rotational movement of the subsegment 211c—for example initiated by the exciter arrangement 40 for the purpose of generating the usable vibrations—about its aforementioned imaginary main axis of inertia to the displacer element 210, in particular, for converting said rotational movement of the subsegment 211c into a twisting of a subsegment of the displacer element adjacent to the second end of the first connection element, causing a bending of the displacer element, and/or for transmitting said rotational movement of subsegment 211c to subsegment 211a, in particular, for converting said rotational movement of subsegment 211c into a twisting of subsegment 211a about the aforementioned first imaginary torsional vibration axis. In addition, subsegment 211b is further designed to transmit a rotational movement of the first subsegment of displacer element 210 adjacent to the second end of connection element 211b about the first imaginary torsional vibration axis to subsegment 211a and/or subsegment 211c, in particular to convert said rotational movement of the first subsegment of the displacer element 210 into a twisting of subsegment 211a about the aforementioned first imaginary torsional vibration axis and/or a rotational movement— detectable from outside the tube 10—of subsegment 211*c* about said torsional vibration axis. The aforementioned rotational movements of the subsegments 211*a*, 211*b*, 211*c* and 211*d* about their respective aforementioned imaginary main axes of inertia or the first imaginary torsional vibration axis can correspond, for example, at least proportionately to the aforementioned usable vibrations of the converter unit 21 or result therefrom. Accordingly, the aforementioned subsegment 211*a* of the connection element 211 is also designed in accordance with a further design of the invention to enable a twisting of both, subsegment 211*b* and subsegment 211*c*, about their respective aforementioned imaginary main axes of inertia, which twisting is at least sufficient for excitation of the usable vibrations and/or their detection, and for example, to counteract said twisting of the subsegments 211*b*, 211*c* with the lowest possible (torsional) spring force or a sufficiently low (torsional) spring constant. Similarly, the aforementioned subsegment 212*a* of the second connection element 212 may also be intended and designed to enable a twisting of both, subsegment 212*b* and subsegment 212*c*, about their respective aforementioned imaginary main axes of inertia, which twisting is at least sufficient for excitation of the usable vibrations and/or their detection, and for example, to counteract said twisting of the subsegments 212*b*, 212*c* with the lowest possible (torsional) spring force or a sufficiently low (torsional) spring constant. Furthermore, subsegment 211*a* may also be provided and configured to accommodate the aforementioned temperature sensor 610 or to be mechanically connected thereto, for example in such a way that said temperature sensor is arranged, as can be seen in a synopsis of FIGS. 12 and 17, within the subsegment 211*a* or in an intermediate space formed between the subsegment 211*a* and the subsegment 211*c*.

Figure 21:
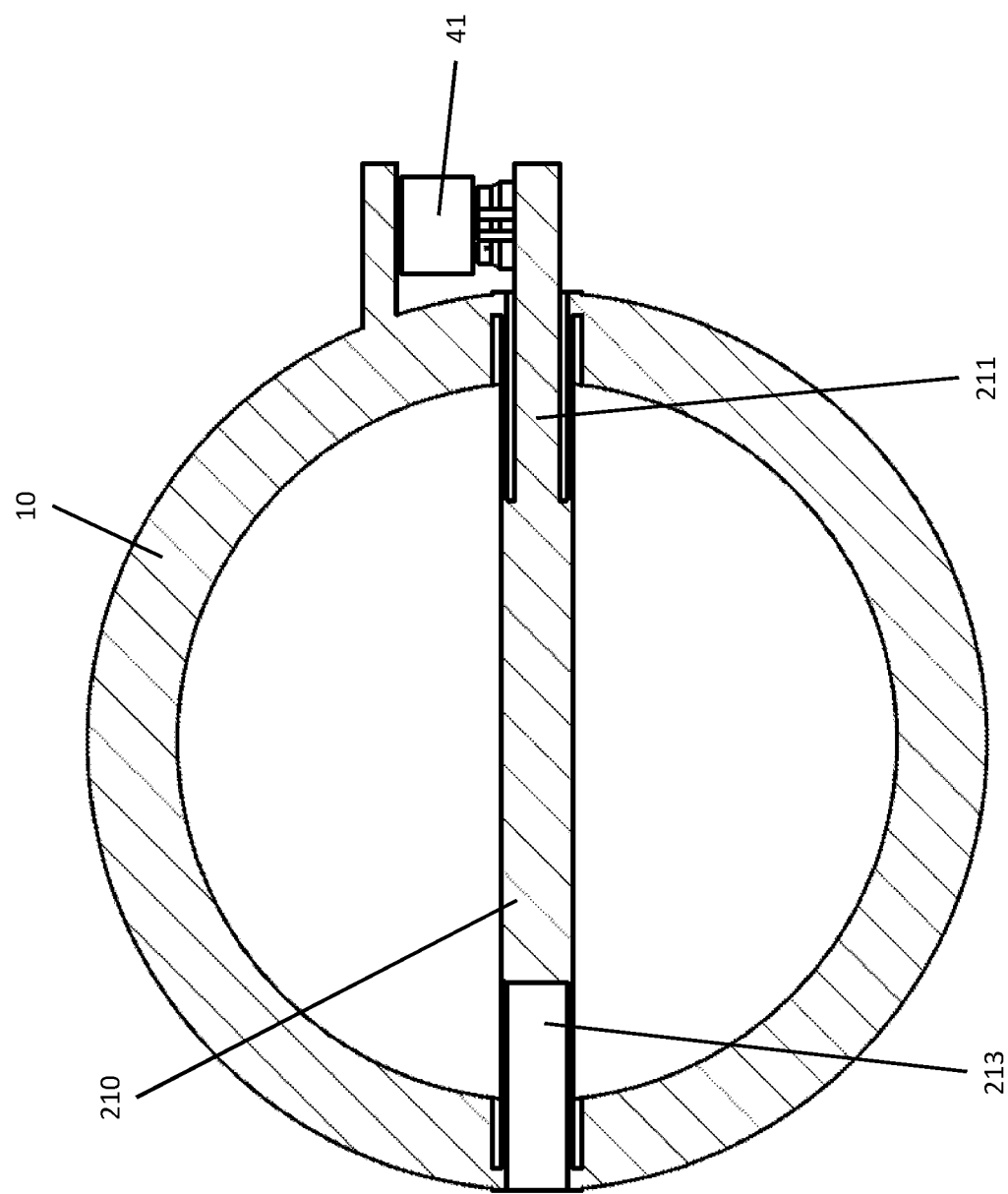
Figure 22:
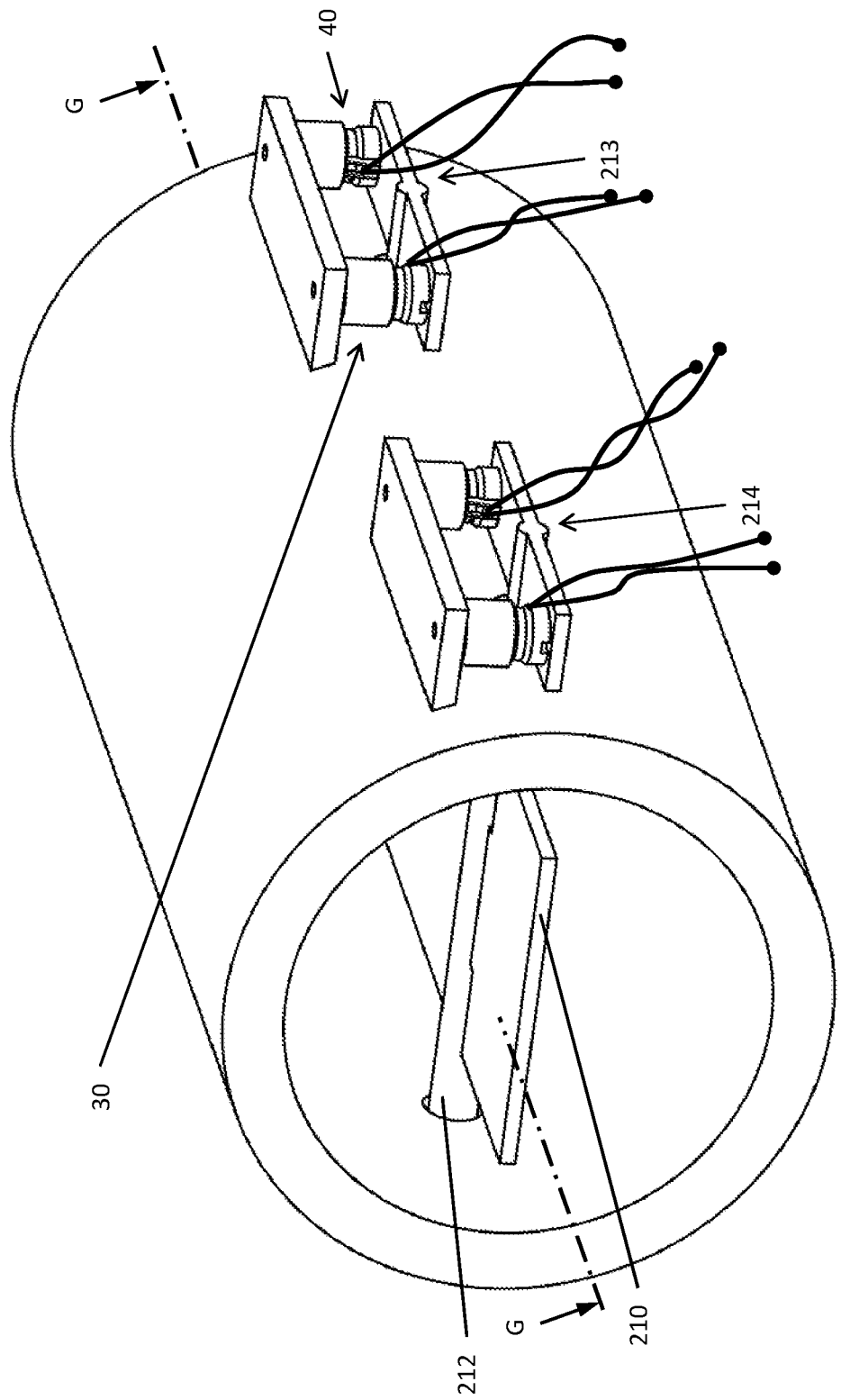
Figure 23:
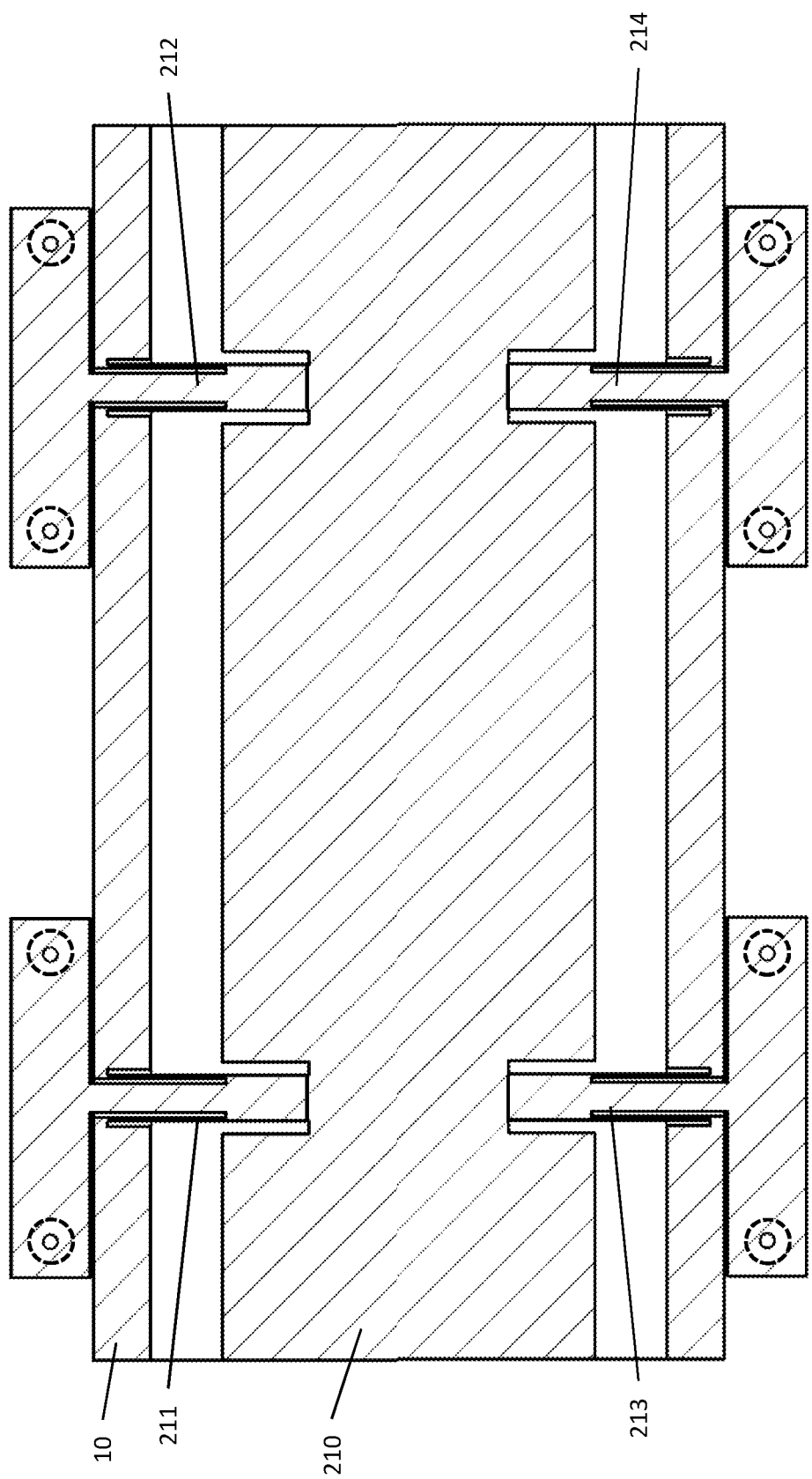
Figure 24:
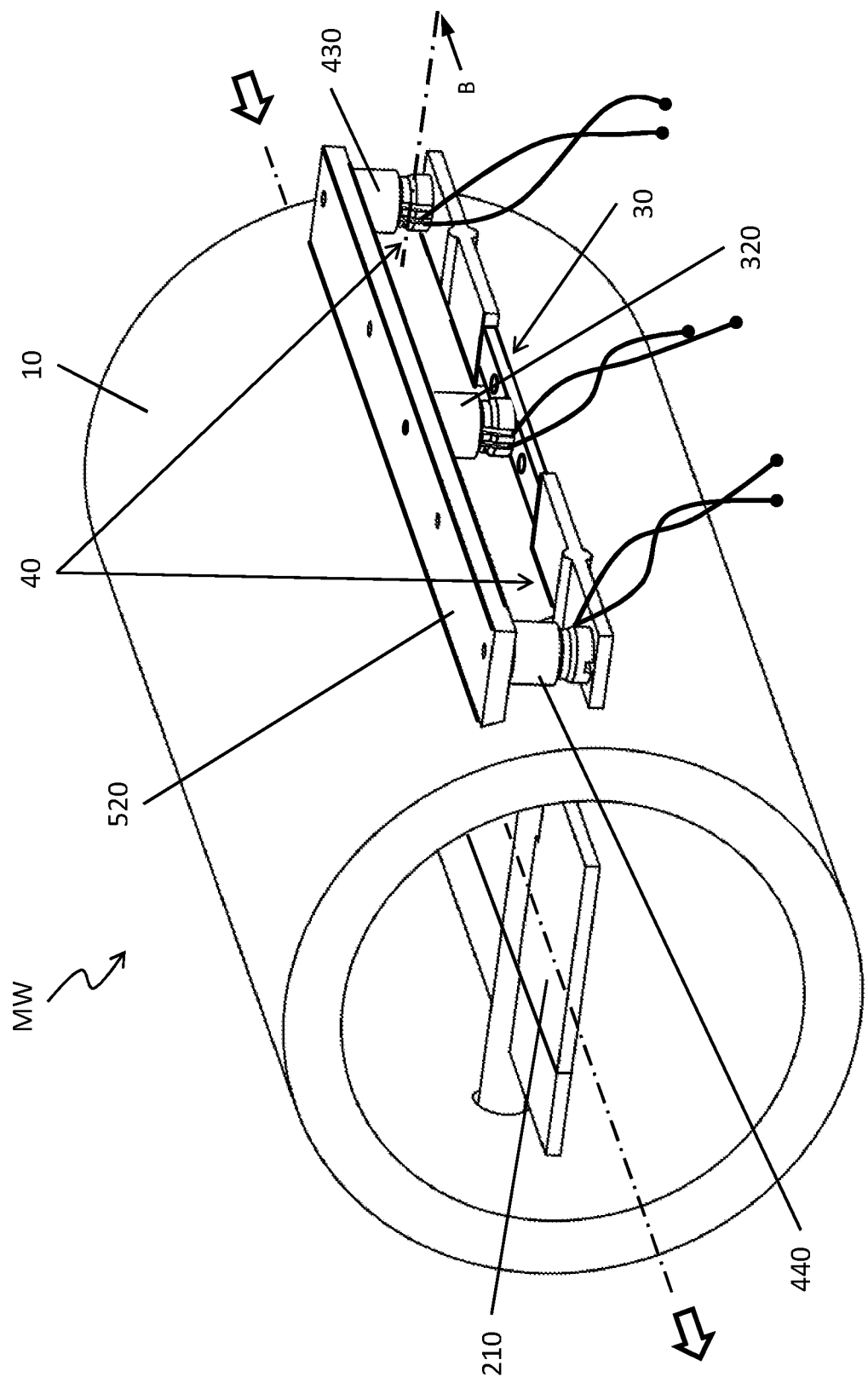

According to a further design of the invention, it is further provided that the converter unit 21 has—as shown in FIGS. 19, 20, 21, 22, 23 and 24 and as can be seen from their synopsis—in addition to the aforementioned connection elements 211, 212, a third connection element 213, which is for example structurally identical to the connection element 211, and at least one fourth connection element 214, which is for example, structurally identical to the connection element 213. Each of the two connection elements 213, 214 may be, for example, metallic and/or at least partially sleeve-shaped and/or at least partially rod-shaped and/or at least partially shell-shaped and/or at least partially disk-shaped. The connection element 213 is mechanically connected to the displacer element 210. In addition, the connection element 214 is also mechanically connected to the displacer element 210 and spaced apart from the connection element 213 in the direction of the mentioned imaginary longitudinal axis $L_{210}$ of said displacer element 210 and/or along an imaginary envelope line of the wall of the tube 10. According to a further design of the invention, the connection elements 211, 213 and/or 212, 214 are further arranged and mechanically connected to the displacer element 210 in such a way that the mentioned imaginary main axis of inertia of the connection element 211 and an imaginary main axis of inertia of the connection element 213 are aligned with one another and/or the mentioned imaginary main axis of inertia of the connection element 212 and an imaginary main axis of inertia of the connection element 214 are aligned with one another. According to a further design of the invention, the converter unit 21 is inserted into the tube 10 and mechanically connected thereto in such a way that—as indicated in FIGS. 21 and 23—each of the connection elements 211, 212, 213, 214 thereof is respectively placed at least partially inside the wall of the tube and mechanically connected thereto; and in such a way that the connection element 214 is connected to the wall of the tube at a distance from the connection element 213 in the direction of an imaginary longitudinal axis of the tube and/or arranged downstream in the flow direction of said connection element 213, or in that the connection element 213 is at a distance from the connection element 211 along a first circumferential line of the wall and the connection element 214 is mechanically connected to the wall of the tube at a distance from the connection element 212 along a second circumferential line of the wall. The converter unit 21 can be designed and arranged in the tube in such a way that the connection elements 211, 213 or the connection elements 212, 214 are each positioned diametrically opposite one another with respect to a diameter of the tube 10 coinciding with their aforementioned respective main axes of inertia. If the exciter arrangement 30 is formed by means of two vibration exciters 310, 320, the vibration exciter 320 can also be mechanically connected to one of the connection elements 213, 214 or—as shown in FIG. 24—to both the connection element 213 and the connection element 214.

According to a further design of the invention, it is further provided that the sensor arrangement 40 is formed by means of four vibration sensors, which are, for example, structurally identical in such a way that, in addition to the aforementioned vibration sensors 410, 420, said sensor arrangement 40 has a third vibration sensor 430 that is electrodynamic or piezoelectric and/or structurally identical to vibration sensor 410, and a fourth vibration sensor 440 that is electrodynamic or piezoelectric and/or structurally identical to vibration sensor 410. In the aforementioned case of the converter unit 21 having the connection elements 213, 214 in addition to the connection elements 211, 212, the vibration sensor 430 may, for example, be at least connected to the aforementioned connection element 213 and the vibration sensor 440 may, for example, be at least mechanically connected to the aforementioned connection element 214. In addition, if the transducer has both the carrier frame 510 and the carrier frame 520, the vibration sensors 430, 440 can also be mechanically connected to said carrier frame 520, as shown in FIG. 24. Accordingly, the carrier frame 520 can also be designed and positioned on the tube 10 in such a way that, as can be seen in a synopsis of FIGS. 3 and 24, it is diametrically opposed to the carrier frame 510 in the direction of at least one of the aforementioned main axes of inertia of the connection elements 211, 212 and/or the aforementioned first and second torsional vibration axes of the converter unit 21, namely it extends, for example—as can be seen in FIG. 24—at least from the aforementioned connection element 213 to the aforementioned connection element 214, in particular it is arranged parallel to the carrier frame 510 and/or to the displacer element 210.

Although the converter unit in accordance with the invention shown by way of example already provides very good measuring results, it has nevertheless been shown that measurement accuracy can be further improved with comparatively little additional effort by using another converter unit that is, for example, structurally identical to the aforementioned first converter unit. Accordingly, the converter unit according to a further design of the invention further comprises a second converter unit 22, in particular arranged together with converter unit 21 within the tube 10 and structurally identical to converter unit 21. As is shown in FIG. 25, 26, 27, 28, 29, 30 or 31 or as can be readily seen from the synopsis thereof, said converter unit 22 is formed by means of at least one displacer element 220, a first connection element 221—for example structurally identical to connection element 211—and at least one second connection element 222—for example structurally identical to connection element 212. Each of identical connection elements 221, 222 of the converter unit 22, which are possibly structurally identical and used namely as force traducers, is mechanically connected to displacer element 220 and namely in the direction of an imaginary longitudinal axis of said displacer element 220 with predetermined mutual spacing, for example at the same relative spacing as the connection elements 211, 212 of the converter unit 21. The displacer element 220 may, for example, be at least partially plate-shaped and/or at least partially rod-shaped and/or structurally identical to displacer element 210 and/or metallic. Furthermore, the connection element 221 and/or the connection element 222 can be at least partially sleeve-shaped and/or at least partially rod-shaped and/or at least partially shell-shaped and/or at least partially disk-shaped and/or at least partially circular-cylindrical and/or metallic.

Figure 25:
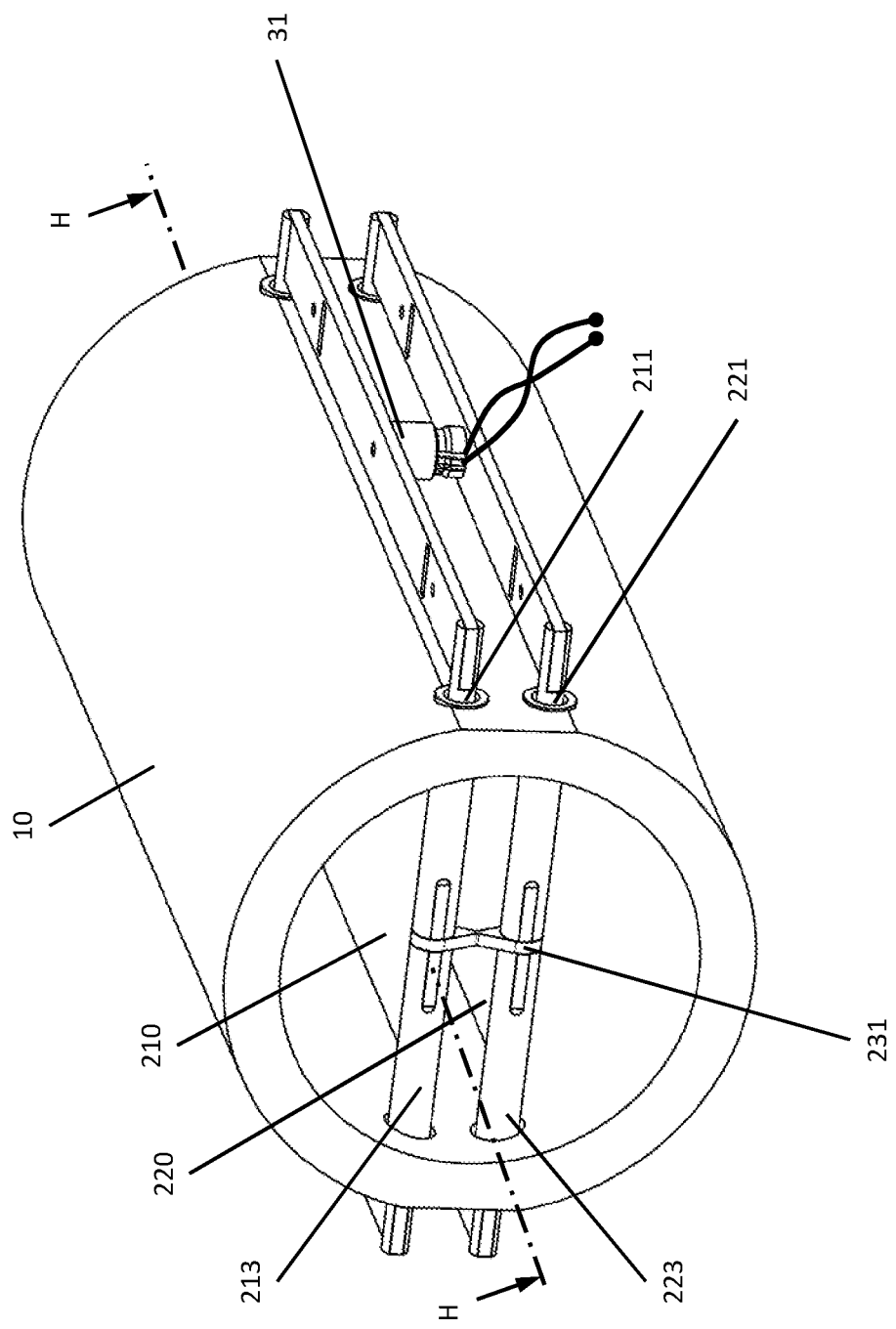
FIGS. 25-29 show schematic representations of various views of an exemplary embodiment of a transducer formed by means of two converter units in accordance with the present disclosure.

As can be readily seen in a synopsis of FIGS. 25, 26, 27, 28, 29, 30, 31, the converter unit 22 is also inserted into the tube 10 and mechanically connected thereto so that the displacer element 220 thereof is placed at a lateral distance from the displacer element 210 of the converter unit 21 within the lumen of said tube 10 and that each of the connection elements of the converter unit 22 is respectively placed at least partially within the wall of the tube 10 at a distance from each of the connection elements of the converter unit 21 and is mechanically connected thereto; and in such a way that the connection element 222 is mechanically connected to the wall of the tube at a distance from the connection element 221 in the direction of the imaginary longitudinal axis of the tube 10 and/or is arranged downstream of said connection element 221 in the direction of flow, or in such a way that the connection element 221 is at a distance from the connection element 211 along said first circumferential line of the wall and the connection element 222 is mechanically connected to the wall of the tube at a distance from the connection element 212 along said second circumferential line of the wall. Similar to connection elements 211 and 212 of converter unit 21, connection elements 221, 222 of converter unit 22, as indicated in FIG. 25, can also be a component part of one and the same molded part or one and the same assembly, in such a way that a subsegment of a connection element 221 located outside the tube merges into a subsegment of connection element 222 located equally outside the tube, or is connected to it mechanically, for example by a firm bonding.

Figure 26:
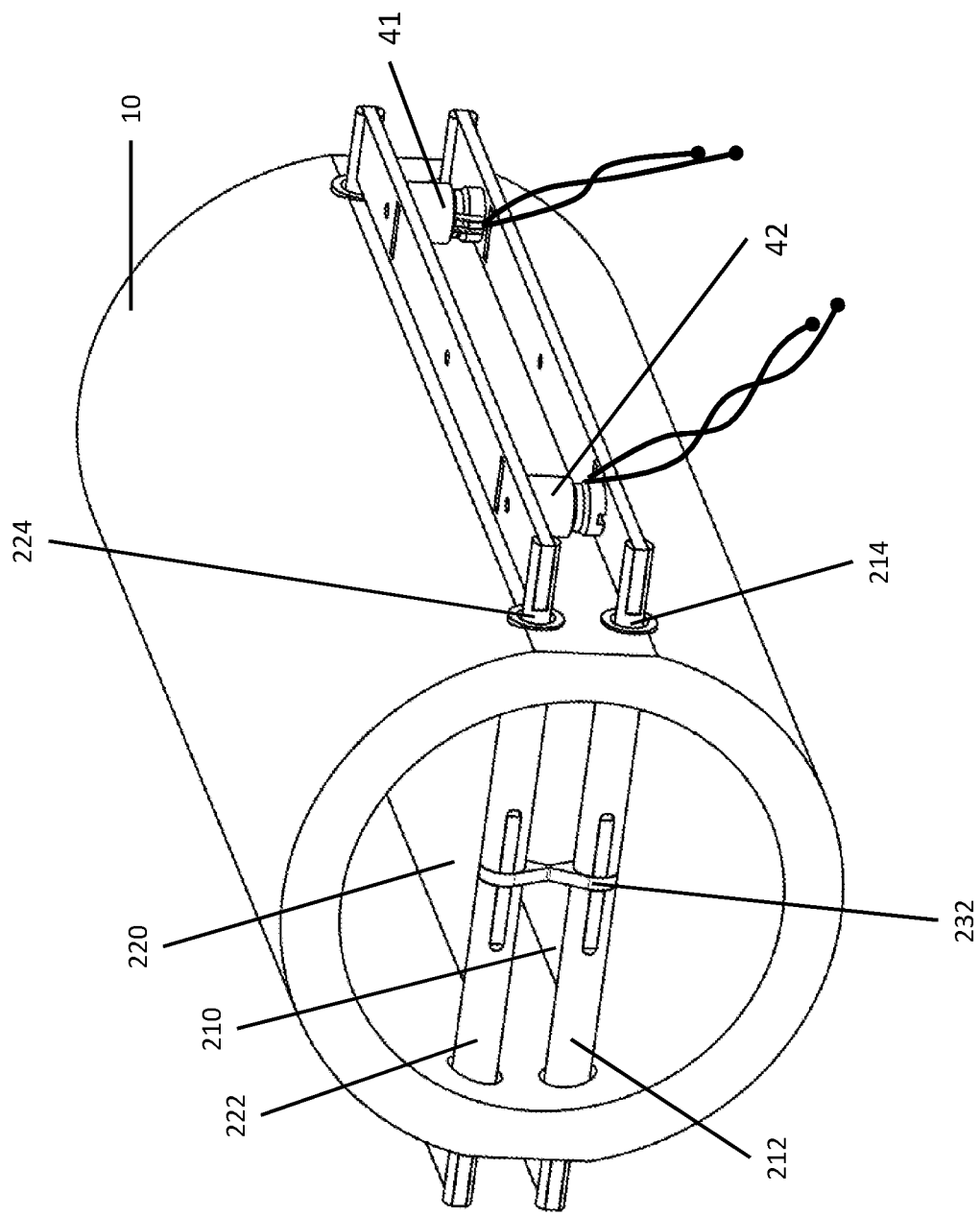
Figure 27:
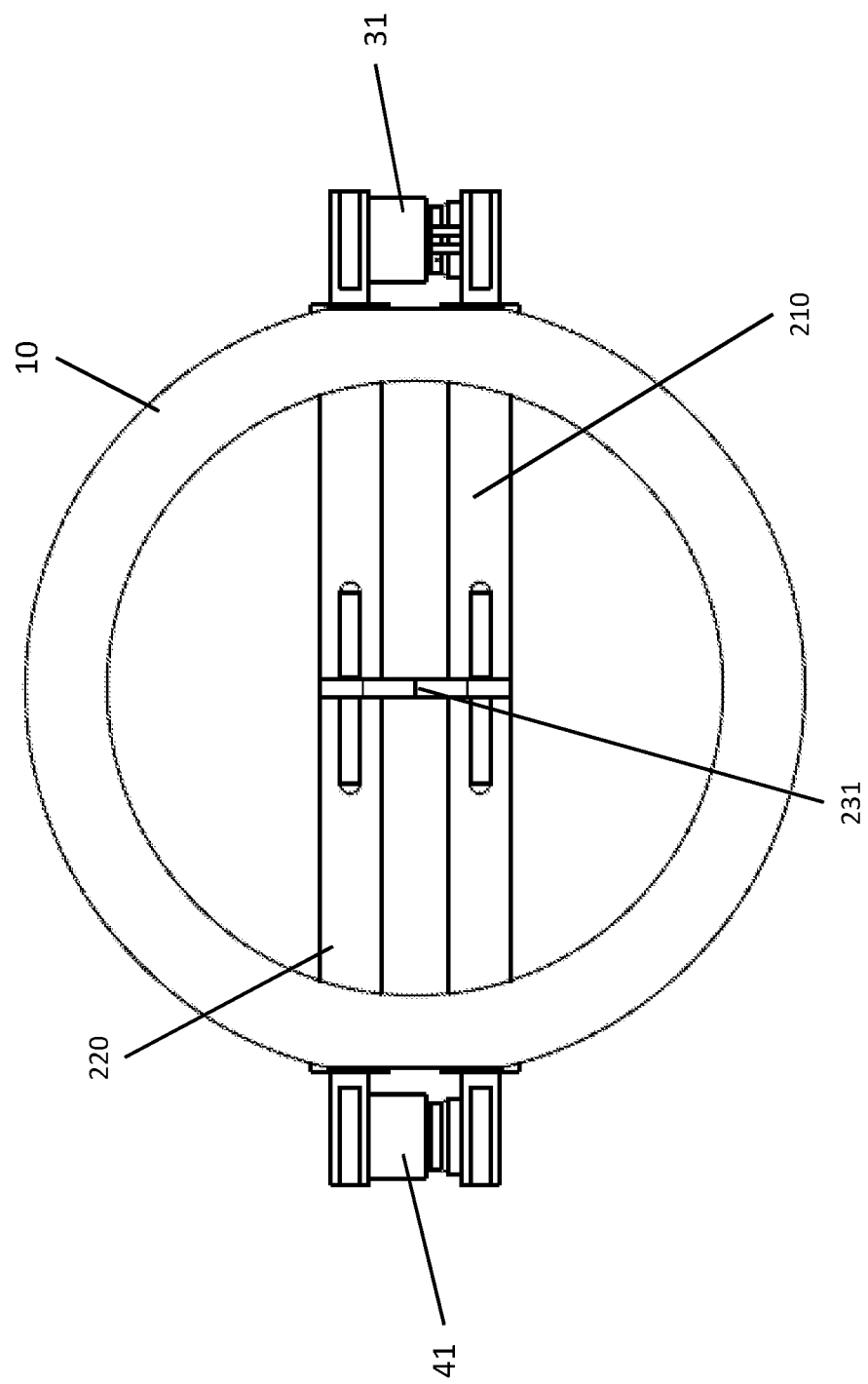
Figure 28:
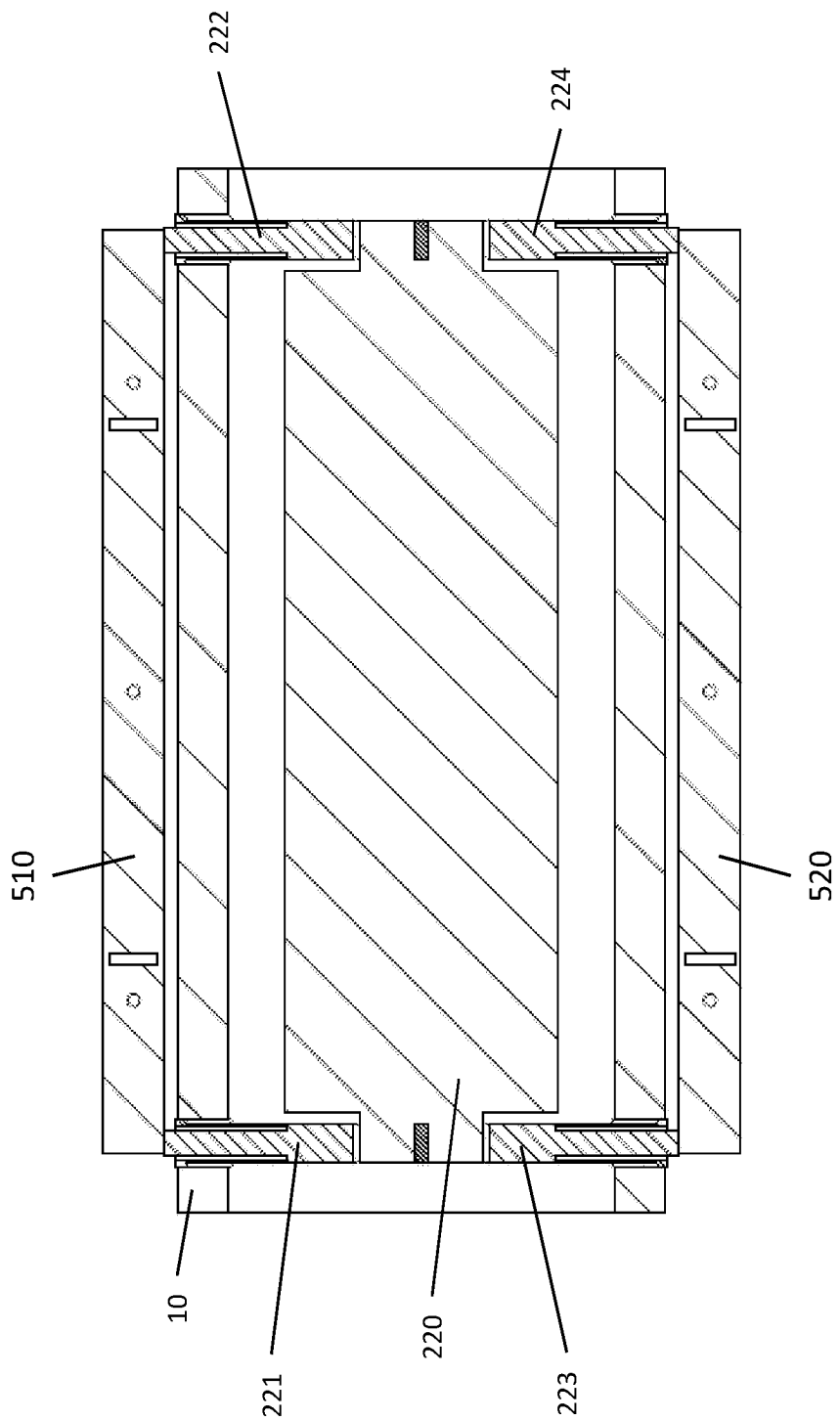
Figure 29:
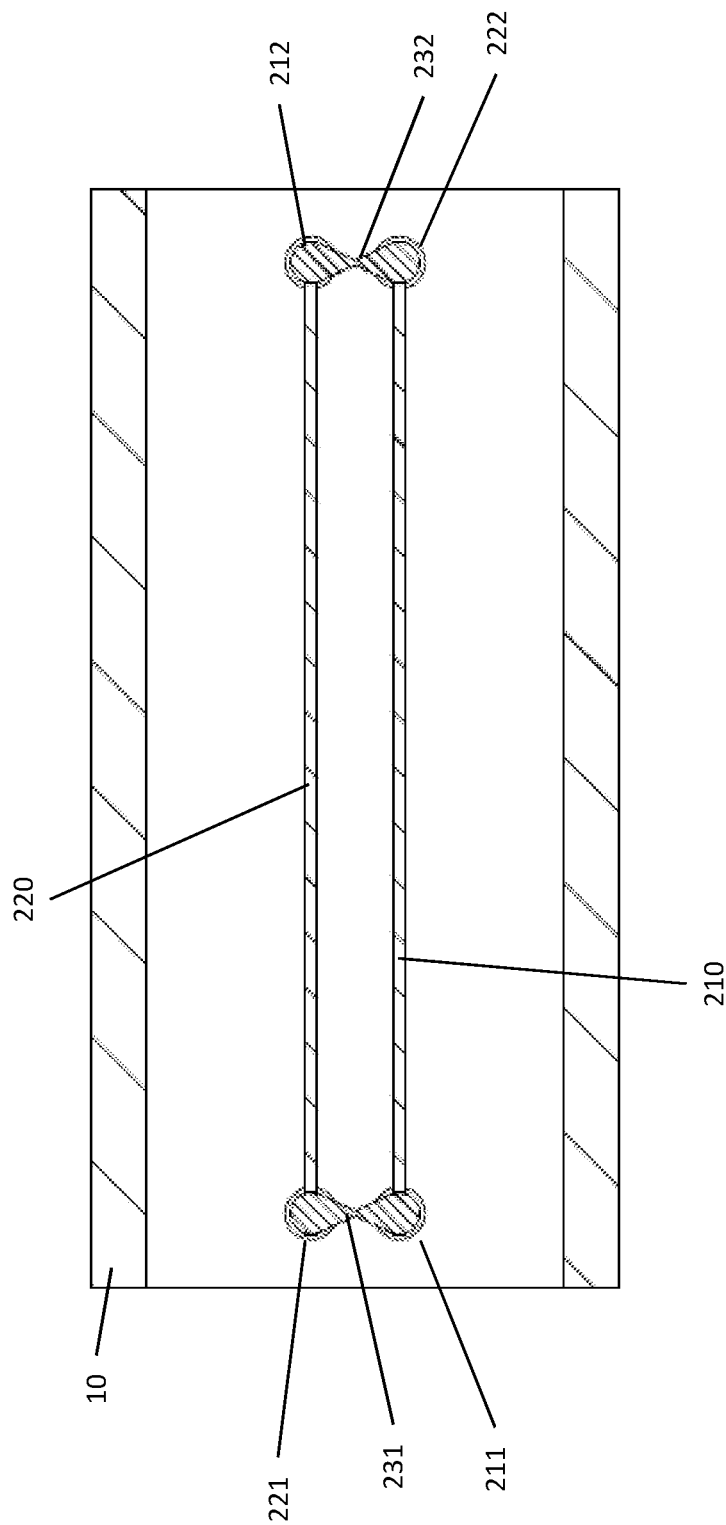
Figure 30:
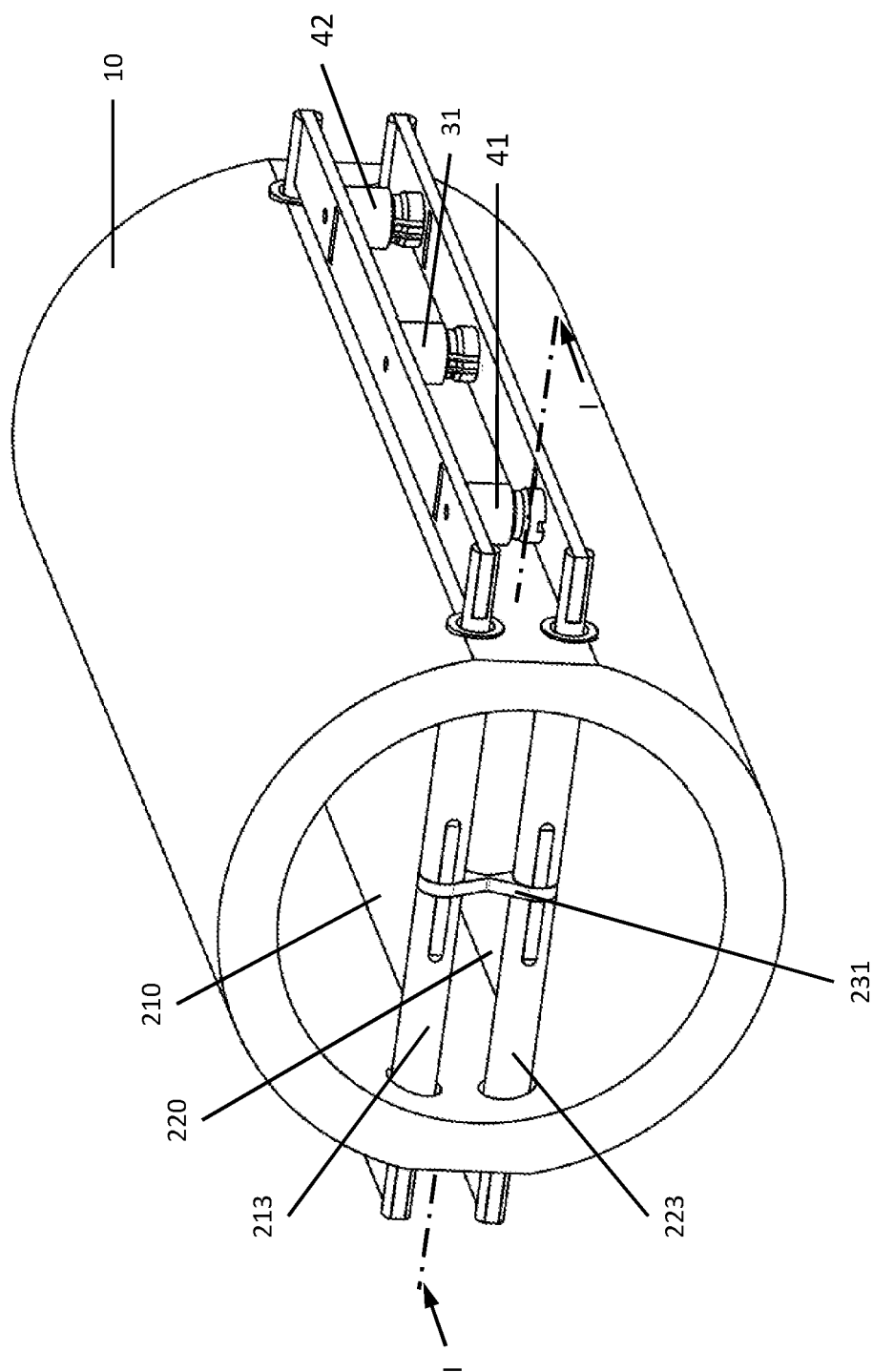
FIGS. 30 and 31 show schematic representations of another exemplary embodiment of a transducer formed by means of two converter units in accordance with the present disclosure.
Figure 31:
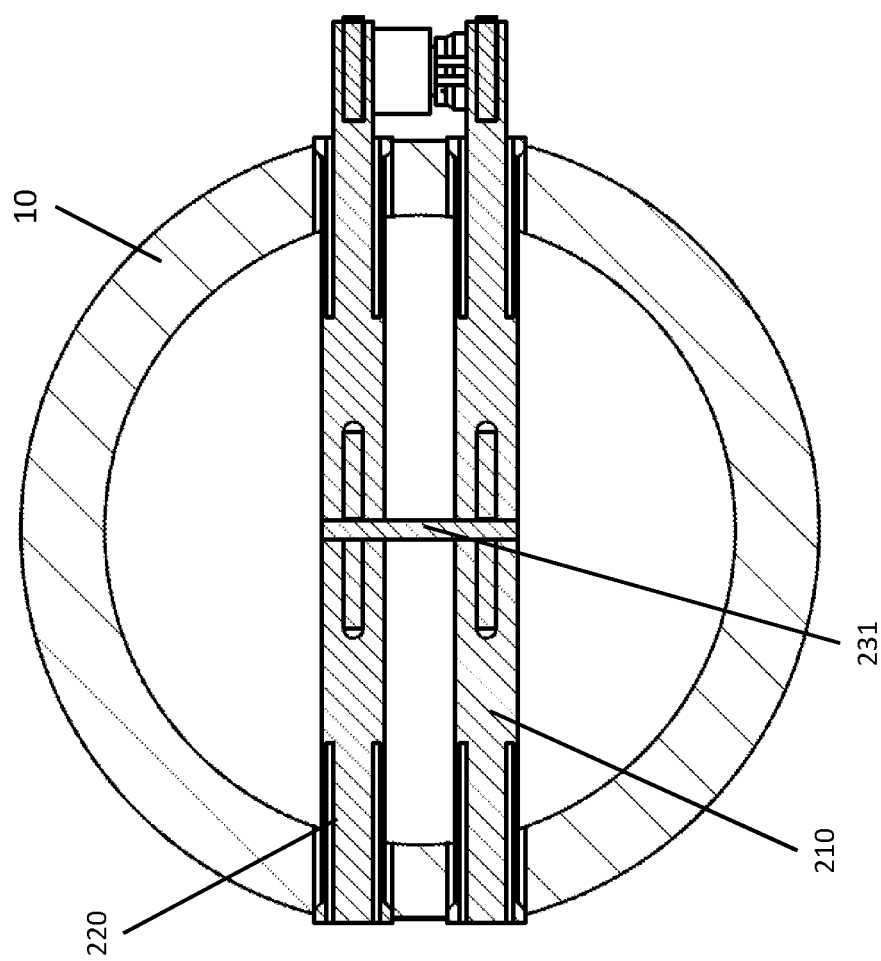

Not least in the aforementioned case, in which the converter unit 21 is formed by means of four connection elements, namely connection elements 211, 212, 213 and 214, the converter unit 22 may also have a third connection element 223 and a fourth connection element 224. Each of the two connection elements 223, 224 may be therefore, for example, also metallic and/or at least partially sleeve-shaped and/or at least partially rod-shaped and/or at least partially shell-shaped and/or at least partially disk-shaped. The connection element 223 is mechanically connected to the displacer element 220. In addition, the connection element 224 is also mechanically connected to displacer element 220, and namely from connection element 223 in the direction of aforementioned imaginary longitudinal axis of the displacer element 220 and/or along an imaginary envelope line of the wall of the tube 10. According to a further design of the invention, the connection elements 221, 223 and 222, 224 of the converter unit 22 are further arranged and mechanically connected to the displacer element 220 in such a way that an imaginary main axis of inertia of the connection element 221 and an imaginary main axis of inertia of the connection element 223 are aligned with one another and/or an imaginary main axis of inertia of the connection element 222 and an imaginary main axis of inertia of the connection element 224 are aligned with one another. According to a further design of the invention, the converter unit 22 is inserted into tube 10 and is thus mechanically connected thereto in such a way that—as indicated in FIGS. 25, 26, 28 and 29 respectively, or as can be readily seen in a synopsis of FIG. 25, 26, 27, 28 or 29—each of its connection elements 221, 222, 223, 224 is placed at a distance from each of the connection elements of the converter unit 21 at least partially within the wall of the tube 10 and mechanically connected thereto; and in such a way that the connection element 224 is mechanically connected to the wall of the tube at a distance from the connection element 223 in the direction of the imaginary longitudinal axis of the tube 10 and/or is arranged downstream of said connection element 223 in the flow direction in such a way that the connection element 223 is mechanically connected to the wall of the tube at a distance from both the connection element 221 and the connection element 213 along said first circumferential line of the wall, and the connection element 224 is mechanically connected to the wall of the tube at a distance from the connection element 222 along said second circumferential line of the wall. As is also indicated in FIG. 26, the connection elements 223, 224 of the converter unit 22 can also be components of one and the same molded part or one and the same assembly, in such a way that a subsegment of the connection element 223 located outside the tube merges into a subsegment of the connection element 224 located equally outside the tube, or is connected to it mechanically, for example by a firm bonding.

According to a further design of the invention, sensor arrangement 40 is further designed to generate the vibration signal s1 in such a way that it represents mechanical vibrations of the two converter units 21, 22, for example torsional vibrations of at least connection element 211 of the converter unit 21 and torsional vibrations of at least the aforementioned connection element 221 of the converter unit 22. In particular, sensor arrangement 40 can be namely designed to detect both the torsional vibrations of connection element 211—which possibly has a usable vibration frequency—and the torsional vibrations of connection element 221—which possibly also has a usable vibration frequency—and to generate the vibration signal s1 for example in such a way that its aforementioned measuring component represents at least said torsional vibrations of the connection elements 211, 221. Furthermore, according to a further design of the invention, sensor arrangement 40 is designed to generate the aforementioned vibration signal s2 in such a way that it represents mechanical vibrations of the two converter units 21, 22, for example, namely torsional vibrations of at least the connection element 212 of converter unit 21 and the torsional vibrations of at least the aforementioned connection element 222 of the converter unit 22. For example, sensor arrangement 40 can also be designed to detect the torsional vibrations of connection element 212—which possibly has a usable vibration frequency—and the torsional vibrations of connection element 222—which possibly also has a usable vibration frequency—and to generate the vibration signal s2, for example, in such a way that its aforementioned measuring component represents at least said torsional vibrations of connection elements 212, 222. In particular, the sensor arrangement is further provided and arranged to generate the aforementioned vibration signals s1 and s2 in such a way that a phase difference $\Delta\varphi$ exists between the measuring component of vibration signal s1 and the measuring component of vibration signal s2 depending on the mass flow rate, m, of the fluid to be measured or flowing through the tub 10.

Figure 32:
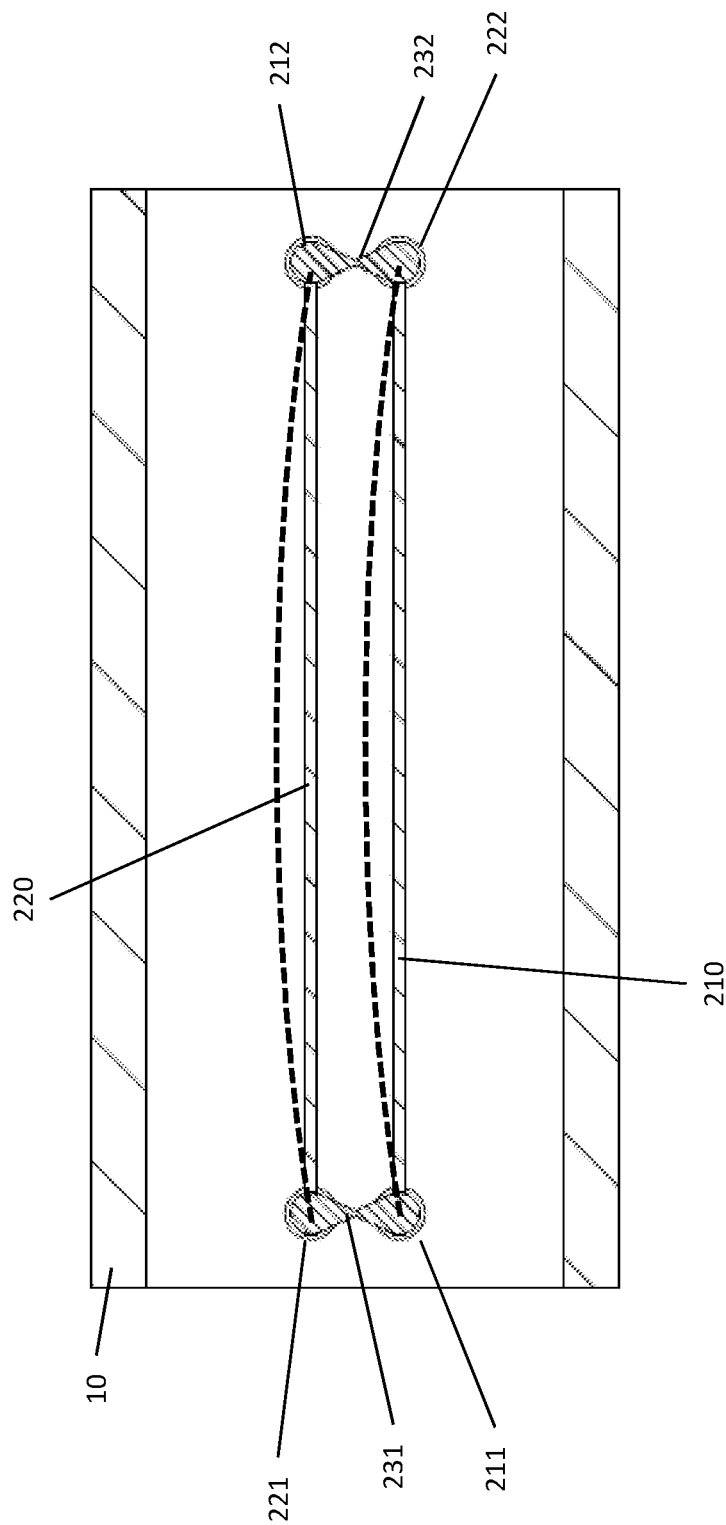
FIG. 32 shows a schematic representation of a parallel vibration mode inherent in a transducer formed by means of two converter units in accordance with the present disclosure.
Figure 33:
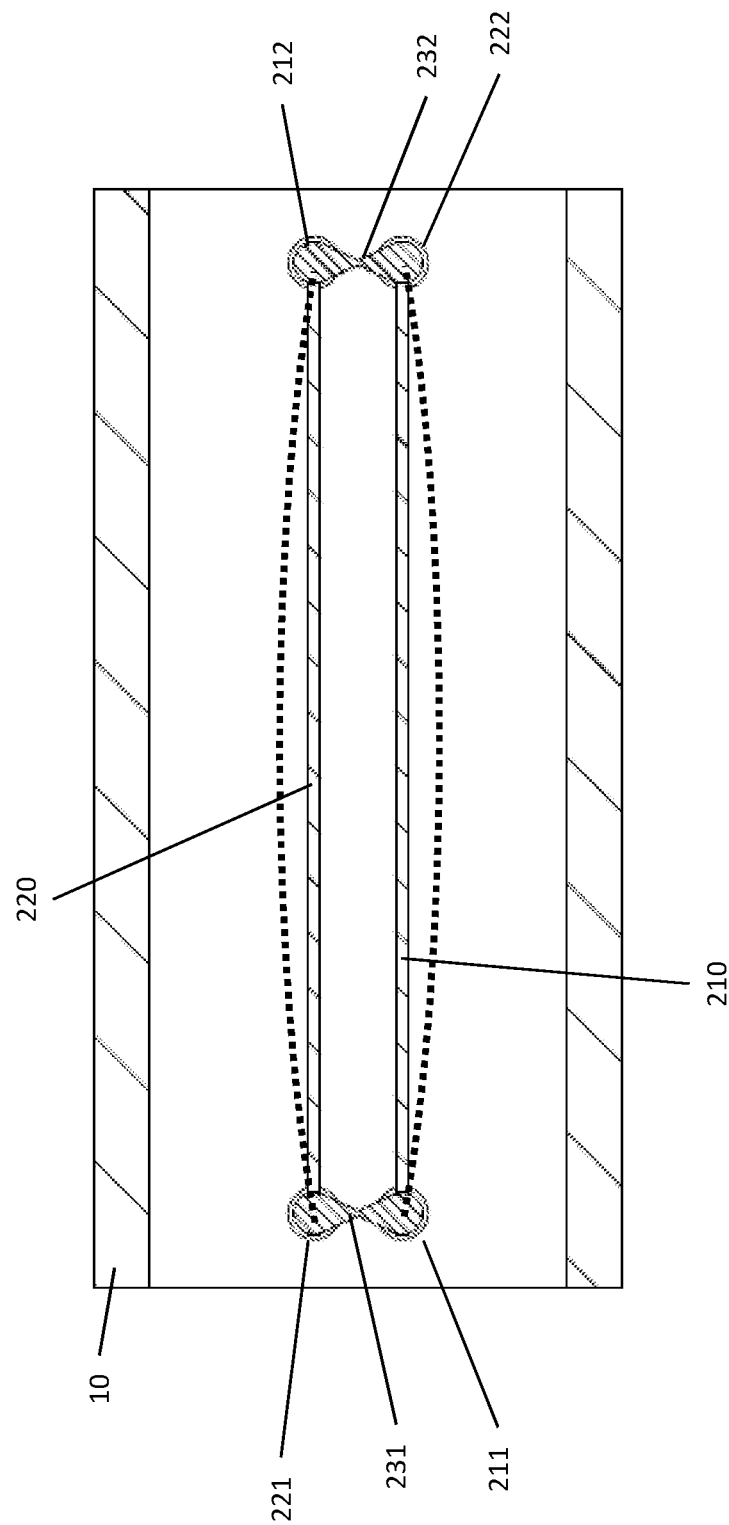
FIG. 33 shows a schematic representation of an anti-parallel resonance mode inherent in a transducer formed by means of two converter units in accordance with the present disclosure.

As schematically shown in FIG. 32, in the aforementioned case, in which the transducer is formed by means of two converter units 21, 22, said transducer may comprise parallel vibration modes having deviating normal modes and deviating natural frequencies, namely natural vibration modes, in which each of two converter units 21, 22 respectively execute vibrations synchronously with the other converter unit using identical vibration modes, for example—as shown in FIG. 32—vibrations in a respective basic flexural/torsional vibration mode or another respective flexural/torsional vibration mode. Moreover, as shown in FIG. 33, the transducer can also have at least one anti-parallel vibration mode inherent therein, in which converter unit 21 and converter unit 22 execute synchronous vibrations, for example in a respective flexural/torsional vibration mode, with mutually counter-equivalent vibration forms. According to a further design of the invention, it is intended to use the said anti-parallel vibration mode as a use mode, or the exciter arrangement 30 is configured accordingly to excite or sustain the aforementioned usable vibrations with a vibration frequency deviating from an instantaneous resonance frequency of the anti-parallel vibration mode by no more than 2 Hz, for example a matching vibration frequency. To avoid undesired excitation of one of the aforementioned parallel vibration modes by the exciter arrangement, according to a further design of the invention, the transducer is designed in such a way that a natural frequency of the anti-parallel vibration mode differs from the respective natural frequency of each of the aforementioned parallel vibration modes, for example being namely lower than the respective natural frequency of each of the parallel vibration modes. According to a further design of the invention, as shown, for example, in FIG. 25 or is readily apparent from a synopsis of FIGS. 25, 27, 29, 30, 31, 32 and 33, the transducer also comprises at least one rod-shaped or plate-shaped first coupling element 231, which mechanically connects the converter unit 21 and converter unit 22 and is nevertheless at a distance, for example, from the wall of the tube 10. Said coupling element 231 can advantageously be designed in such a way that a spring constant of the coupling element 231 contributing overall to the natural frequency of the anti-parallel vibration mode of the transducer is lower than a spring constant of said coupling element 231 that contributes overall respectively to each parallel vibration mode of the transducer. Alternatively or in addition, the coupling element 231 can be fixed to the displacer element 210 in the area of a nodal surface of a natural vibration mode inherent in the displacer element 210 as well as to the displacer element 220 in the area of a nodal surface of a natural vibration mode inherent in the displacer element 220. In order to further improve the aforementioned frequency separation between the anti-parallel vibration mode and the parallel vibration modes described above, additional coupling elements of this kind may also be provided in the transducer. Accordingly, the transducer, according to a further design of the invention, has at least one second coupling element 232, which also mechanically connects the converter unit 21 and converter unit 22 to one another and which, as shown in FIG. 26 or as can be readily seen in a synopsis of FIGS. 26, 29, 32 and 33, is at a distance from the wall of the tube 10, in particular to the same extent as the coupling element 231, and from the coupling element 231. Said coupling element 232 can be, for example, rod-shaped or plate-shaped and/or structurally identical to the aforementioned coupling element 231. In addition, coupling element 232 can be advantageously fixed to said displacer element 210 in the area of a nodal surface of the aforementioned natural vibration mode of the displacer element 210 and to said displacer element 220 in the area of the nodal surface of the aforementioned natural vibration mode of the displacer element 220.

The invention claimed is:

1. A transducer for a vibronic measuring system, the transducer comprising:
   a tube with a lumen covered by a wall, the tube extending from an inlet side first end to an outlet side second end, wherein the tube is configured to be traversed by a fluid in a flow direction from the inlet side first end toward the outlet side second end;
   a first converter unit, which comprises:
      a displacer element;
      a first connection element; and
      a second connection element,
      wherein the first connection element of the first converter unit is mechanically connected to the displacer element of the first converter unit, and wherein the second connection element of the first converter unit is mechanically connected to the displacer element of the first converter unit at a distance from the first connection element in a direction of an imaginary longitudinal axis of the displacer element;
   an electromechanical exciter arrangement configured to excite and sustain forced mechanical resonance vibrations of the first converter unit; and
   a sensor arrangement configured to detect mechanical vibrations of the first connection element and mechanical vibrations of the second connection element, wherein the sensor arrangement is configured to generate both a first vibration signal representing at least torsional vibrations of the first connection element and a second vibration signal representing at least torsional vibrations of the second connection element,
   wherein the first converter unit is disposed within the tube and is thus mechanically connected to the tube such that:
      the displacer element is disposed inside the lumen of the tube; and
      each of the first and second connection elements is at least partially arranged inside the wall of the tube and mechanically connected to the tube such that the second connection element is at a distance from the first connection element in a direction of an imaginary longitudinal axis of the tube and/or an imaginary envelope line of the wall of the tube and/or is arranged downstream of the first connection element in the flow direction, and
   wherein the first converter unit is configured to be contacted by the fluid inside the lumen of the tube and to be enabled to vibrate such that both of the first and second connection elements and the displacer element are being elastically deformed at least proportionately in each case such that each of the first and second connection elements is at least proportionately twisted about a respective imaginary main axis of inertia and/or that the displacer element is bent out of a static rest position at least proportionately in a direction of a diameter of the tube that is perpendicular to an imaginary main axis of inertia of the first connection element and/or to an imaginary main axis of inertia of the second connection element.

2. The transducer of claim 1, wherein:
the first connection element has a first surface and a second surface opposite thereto and at least partially parallel to the first surface, and the second connection element has a first surface and a second surface opposite thereto and partially parallel to the first surface the second connection element; and
the first converter unit is disposed within the tube and mechanically connected to the tube such that the respective first surface of each of the first and second connection elements each faces the lumen of the tube and the respective second surface of each of the first and second connection elements faces away from the lumen of the tube.

3. The transducer of claim 1, wherein the first connection element includes a first subsegment, which defines in each case at least proportionately the first surface and the second surface of the first connection element opposite thereto and/or is at least partially sleeve-shaped and/or at least partially shell-shaped and/or at least partially disc-shaped and/or at least partially hollow-cylindrical.

4. The transducer of claim 3, wherein the first subsegment is at least partially hollow-cylindrical such that a wall thickness of the first subsegment is less than 2 mm and/or is less than a wall thickness of the wall of the tube.

5. The transducer of claim 3, wherein the first connection element includes a second subsegment, which extends from a first end adjoining the first subsegment to a second end remote therefrom adjoining the displacer element, wherein the second subsegment is at least partially cylindrical and/or rod-shaped or bar-shaped, and defines at least proportionally the first surface of the first connection element.

6. The transducer of claim 5, wherein the second subsegment and the displacer element are firmly bonded to each other by welding or soldering.

7. The transducer of claim 3, wherein the first subsegment of the first connection element is configured to be at least proportionately elastically deformed by twisting about an associated imaginary main axis of inertia parallel to or coinciding with the first imaginary torsional vibration axis of the first converter unit.

8. The transducer of claim 5, wherein:
the second subsegment is configured to transmit a rotational movement of a third subsegment of the first connection element about an associated imaginary main axis of inertia parallel to or coinciding with a first imaginary torsional vibration axis, to the displacer element and/or to the first subsegment as to convert the rotational movement of the third subsegment into a twisting of a subsegment of the displacer element adjoining the second end of the first connection element, which twisting causes a bending of the displacer element and/or into a twisting of the first subsegment; and/or
the second subsegment is configured to transmit a rotational movement of a first subsegment of the displacer element adjoining the second end of the first connection element about the first imaginary torsional vibration axis to the first subsegment and/or to the third subsegment of the first connection element to convert the rotational movement of the first subsegment of the displacer element into a twisting of the first subsegment of the first connection element about the first imaginary torsional vibration axis and/or a rotational movement of the third subsegment about the first imaginary torsional vibration axis; and/or
the third subsegment of the first connection element is configured to transmit a rotational movement of the second subsegment of the first connection element about an associated imaginary main axis of inertia parallel to or coincident with the first imaginary torsional vibration axis to the sensor arrangement; and/or
the third subsegment of the first connection element is configured to transmit a rotational movement of the third subsegment, caused by the exciter arrangement, about an associated imaginary main axis of inertia parallel to or coincident with the first imaginary torsional vibration axis to the second subsegment of the first connection element.

9. The transducer of claim 1, further comprising a first carrier frame configured to hold components of the sensor arrangement and/or components of the exciter arrangement, which carrier frame is fixed to the tube wall and extends at least from the first connection element to the second connection element and/or extends parallel to the displacer element of the first converter unit.

10. The transducer of claim 9, wherein the sensor arrangement comprises a first vibration sensor, the first vibration sensor including an electrodynamic, piezoelectric or capacitive sensor.

11. The transducer of claim 10, wherein the first vibration sensor is mechanically connected at least to the first connection element of the first converter unit.

12. The transducer of claim 10, wherein the sensor arrangement comprises a second vibration sensor, the second vibration sensor including an electrodynamic, piezoelectric or capacitive sensor.

13. The transducer of claim 12, wherein the second vibration sensor is mechanically connected at least to the second connection element of the first converter unit.

14. The transducer of claim 1, wherein the exciter arrangement comprises at least one electrodynamic or piezoelectric first vibration exciter configured to generate mechanical vibrations of the first converter unit, including time-varying and/or at least intermittently periodic first exciter force.

15. The transducer of claim 14, wherein the first vibration exciter is mechanically connected at least to the first connection element of the first converter unit and is mechanically connected to both the first connection element of the first converter unit and the second connection element of the first converter unit.

16. The transducer of claim 14, wherein the exciter arrangement comprises at least one second vibration exciter configured to generate a second exciter force that is time-varying and/or at least intermittently periodical and that causes mechanical vibrations of the first converter unit, wherein the at least one second vibration exciter includes an electrodynamic or piezoelectric sensor and/or is structurally identical to the first vibration exciter.

17. The transducer of claim 16, wherein the second vibration exciter is mechanically connected at least to the second connection element of the first converter unit.

18. The transducer of claim 14, wherein the first connection element of the first converter unit is arranged such that an imaginary main axis of inertia of the first subsegment extends parallel to or coincides with the first imaginary torsional vibration axis.

19. Use of a transducer according to claim 1 for measuring and/or monitoring fluid flowing in a pipeline, wherein the pipeline has a nominal diameter of more than 100 mm, wherein the fluid has a temperature of more than 100° C. and/or a static pressure of more than 100 bar, and wherein the fluid is a gas flowing at a mass flow rate of more than 500 t/h.

20. The transducer of claim 1, wherein the first connection element of the first converter unit has an at least partially circular-cylindrical and/or rod-shaped third subsegment extending from a first end adjoining the second subsegment through the partially hollow-cylindrical first subsegment to a second end remote from the first end, thereby defining at least proportionately a second surface of the first connection element.

21. The transducer of claim 20, wherein the first connection element of the first converter unit comprises a fourth subsegment, forming a lever arm and/or being at least partially rod-shaped and/or at least partially plate-shaped, adjoining the second end of the third subsegment, positioned outside the tube, extending at least in sections parallel to the wall of the tube.

22. The transducer of claim 21, wherein at least the first subsegment, the second subsegment, the third subsegment and the fourth subsegment of the first connection element are components of one and the same monolithic molding produced by an additive production method.

23. The transducer of claim 21, wherein the third subsegment and the fourth subsegment of the first connection element are firmly bonded to each other by welded or soldered.

24. The transducer of claim 21, wherein the first connection element of the converter unit comprises an annular disk-shaped fifth subsegment that defines both a first surface of the first connection element and a second surface of the first connection element, in each case at least proportionately, and extends from a first edge adjoining the first end of the first subsegment to a second edge remote therefrom and adjoining the wall of the tube.

25. The transducer of claim 24, wherein at least the first subsegment, the second subsegment, the third subsegment and the fifth subsegment of the first connection element are components of one and the same monolithic molding produced by an additive production method.

26. The transducer of claim 1, wherein at least the first subsegment, the second subsegment and the third subsegment of the first connection element are components of one and the same monolithic molding produced by an additive production method; and/or
wherein at least the first subsegment and the third subsegment of the first connection element are arranged coaxially to one another.

27. The transducer of claim 1, wherein:
the first connection element of the first converter unit is at least partially hollow-cylindrical; and/or
the second connection element of the first converter unit is at least partially hollow-cylindrical; and/or
the first connection element of the first converter unit and the second connection element of the first converter unit are structurally identical.

28. The transducer of claim 1, wherein the second connection element of the first connection unit comprises:
a first subsegment, which defines at least proportionally a first surface of the second connection element and a second surface of the second connection element and/or which is at least partially sleeve-shaped and/or at least partially shell-shaped and/or at least partially disk-shaped and/or at least partially hollow-cylindrical;
a second subsegment, which defines at least proportionately a first surface of the second connection element, which extends from a first end adjoining the first subsegment to a second end remote therefrom and adjoining the displacer element, and which is at least partially circular-cylindrical and/or rod-shaped;
a third subsegment, which defines at least proportionately a second surface of the second connection element, which extends from a first end adjoining the first end of the second subsegment to a second end remote therefrom, and which is at least partially circular-cylindrical and/or rod shaped; and
a fourth subsegment, which defines a lever arm and/or is at least partially rod-shaped and/or at least partially plate-shaped, and which adjoins the second end of the third subsegment and is disposed outside the tube, extending parallel to the wall of the tube.

29. The transducer of claim 28, wherein the second connection element of the first converter unit comprises an annular disk-shaped fifth subsegment, which defines both a first surface of the second connection element and a second surface of the second connection element, in each case at least proportionately, and extends from a first edge adjoining the first end of the first subsegment to a second edge remote therefrom and adjoining the wall of the tube; and/or
wherein at least the fourth subsegment of the first connection element of the first converter unit and the fourth subsegment of the second connection element of the first converter unit are components of one and the same monolithic molding.

30. The transducer of claim 1, wherein the exciter arrangement is configured to convert electrical power into mechanical power and, in converting electrical power into mechanical power, to excite and/or sustain forced mechanical vibrations of the transducer in a use mode with a usable vibration frequency dependent on a density of the fluid and/or variable during operation and/or corresponding to a momentary resonance frequency of the first converter unit.

31. The transducer of claim 30, wherein the exciter arrangement is configured to excite or maintain the basic flexural/torsional vibration mode of the first converter unit with an instantaneous resonant frequency of the first converter unit.

32. The transducer of claim 30, wherein the flexural vibrations of the displacer element of the first converter unit in use mode are suitable for inducing Coriolis forces in the fluid flowing through the tube, which Coriolis forces are dependent on a mass flow rate of the fluid and cause mechanical vibrations of the transducer in a Coriolis mode superimposed on and/or coupled to the flexural vibrations, in which Coriolis mode:
the displacer element of the first converter unit executes flexural vibrations about the imaginary flexural vibration axis of the first converter unit extending in the direction of flow, which deviate at least proportionately from its flexural vibrations in use mode and which are coupled to the flexural vibrations in use mode and/or comprise usable vibration frequency; and
the first connection element of the first converter unit executes torsional vibrations about the first imaginary torsional vibration axis of the first converter unit that are at least proportionately superimposed on the torsional vibrations of the first converter unit in the use mode or that have the usable vibration frequency thereof, and that are coupled to the flexural vibrations of the displacer element in the Coriolis mode, and the second connection element of the first converter unit executes torsional vibrations about the second imaginary torsional vibration axis of the first converter unit that are at least proportionately superimposed on the torsional vibrations of the first converter unit in the use mode and that are coupled with the flexural vibrations of the displacer element in the Coriolis mode or having a usable vibration frequency such that there is a phase difference between the torsional vibrations of the first connection element with usable vibration frequency and the torsional vibrations of the second connection element with usable vibration frequency, the phase difference being dependent on the mass flow rate of the fluid.

33. A vibronic measuring system for measuring and/or monitoring at least one time-variable flow parameter, including a mass flow rate, a volume flow rate and/or a flow velocity, and/or for measuring and/or monitoring at least one time-varying substance parameter, including a density and/or a viscosity of a flowing fluid including a gas, a liquid or a dispersion, which measuring system comprises:
   a transducer according to claim 1; and
   an electronic measuring and operating system electrically coupled both to the exciter arrangement and to the sensor arrangement via electrical connecting lines, the measuring and operating system including at least one microprocessor and/or at least one digital signal processor.

34. The vibronic measuring system of claim 33, wherein the electronic measuring and operating system is configured to receive and/or process both the first vibration signal and the second vibration signal to determine, based on the first vibration signal and the second vibration signal, a flow parameter value representing at least one flow parameter, the at least one flow parameter including a mass flow measured value representing a mass flow rate of the fluid and/or a substance parameter value representing at least one substance parameter, the at least one substance parameter including a measured density value representing a density of the fluid and/or a measured viscosity value representing a viscosity of the fluid.

* * * * *